US010519688B2

(12) United States Patent
Gharabegian

(10) Patent No.: US 10,519,688 B2
(45) Date of Patent: Dec. 31, 2019

(54) APPARATUS AND METHOD FOR IDENTIFYING OPERATIONAL STATUS OF UMBRELLA, PARASOL OR SHADING SYSTEM UTILIZING LIGHTING ELEMENTS

(71) Applicant: Shadecraft, Inc., Pasadena, CA (US)

(72) Inventor: Armen Sevada Gharabegian, Glendale, CA (US)

(73) Assignee: Shadecraft, Inc., Pasadena, CA (US)

( * ) Notice: Subject to any disclaimer, the term of this patent is extended or adjusted under 35 U.S.C. 154(b) by 58 days.

(21) Appl. No.: 15/911,110

(22) Filed: Mar. 3, 2018

(65) Prior Publication Data
US 2019/0211577 A1 Jul. 11, 2019

Related U.S. Application Data

(60) Provisional application No. 62/614,403, filed on Jan. 6, 2018.

(51) Int. Cl.
*H02K 11/00* (2016.01)
*H02K 11/35* (2016.01)
(Continued)

(52) U.S. Cl.
CPC ............ *E04H 15/02* (2013.01); *A45B 25/02* (2013.01); *A45B 25/143* (2013.01); *A45B 25/18* (2013.01);
(Continued)

(58) Field of Classification Search
None
See application file for complete search history.

(56) References Cited

U.S. PATENT DOCUMENTS

| 2,070,045 A | 2/1937 | Gilpin |
| 2,087,537 A | 7/1937 | Finkel |

(Continued)

FOREIGN PATENT DOCUMENTS

| CA | 2324851 | 5/2001 |
| CH | 203073199 | 7/2013 |

(Continued)

OTHER PUBLICATIONS

Written Opinion and International Search Report for PCT International Application No. PCT/US2018/028281, Federal Institute of Industrial Property, International Filing Date Apr. 19, 2018, dated Sep. 13, 2018.

(Continued)

*Primary Examiner* — Britt D Hanley

(57) ABSTRACT

An umbrella includes a first lighting element, a second lighting element, a first electrical component associated with the first lighting element, a second electrical component associated with the second lighting element, and a computing device. The computing device includes one or more processors, one or more physical memory devices and computer-readable instructions being executable by the one or more processors to 1) receive first status message or signals from the first electrical component; 2) receive second status message or signals from the second electrical component; 3) generate first light element commands based, at least in part, on the received first status messages and communicate the generated first light element commands to the first light element; and 4) generate second light element commands based, at least in part, on the received second status messages and communicate the generated second light element commands to the second light element.

13 Claims, 27 Drawing Sheets

(51) Int. Cl.

| | | |
|---|---|---|
| F21V 33/00 | (2006.01) | |
| G05B 19/4155 | (2006.01) | |
| E04H 15/28 | (2006.01) | |
| A45B 25/02 | (2006.01) | |
| A45B 25/14 | (2006.01) | |
| A45B 25/18 | (2006.01) | |
| E04H 12/22 | (2006.01) | |
| F16H 25/20 | (2006.01) | |
| F16H 19/00 | (2006.01) | |
| F16H 19/04 | (2006.01) | |
| F04D 25/08 | (2006.01) | |
| F04D 25/16 | (2006.01) | |
| H02S 30/20 | (2014.01) | |
| H02S 40/38 | (2014.01) | |
| H02K 7/116 | (2006.01) | |
| H02J 7/02 | (2016.01) | |
| H02J 7/35 | (2006.01) | |
| A45B 17/00 | (2006.01) | |
| E04H 15/02 | (2006.01) | |

(52) U.S. Cl.
CPC ......... *E04H 15/28* (2013.01); *F21V 33/0004* (2013.01); *G05B 19/4155* (2013.01); *H02K 11/0094* (2013.01); *H02K 11/35* (2016.01); *A45B 2017/005* (2013.01); *A45B 2200/1018* (2013.01); *A45B 2200/1027* (2013.01); *E04H 12/2223* (2013.01); *F04D 25/08* (2013.01); *F04D 25/166* (2013.01); *F16H 19/001* (2013.01); *F16H 19/04* (2013.01); *F16H 25/20* (2013.01); *G05B 2219/23154* (2013.01); *H02J 7/025* (2013.01); *H02J 7/355* (2013.01); *H02K 7/1166* (2013.01); *H02S 30/20* (2014.12); *H02S 40/38* (2014.12)

(56) References Cited

U.S. PATENT DOCUMENTS

| | | |
|---|---|---|
| 2,960,094 A | 11/1960 | Small |
| 4,174,532 A | 11/1979 | Kelley |
| 4,684,230 A | 8/1987 | Smith |
| 4,787,019 A | 11/1988 | Van den Broeke |
| 4,915,670 A | 4/1990 | Nesbit |
| 5,007,811 A | 4/1991 | Hopkins |
| 5,029,239 A | 7/1991 | Nesbit |
| 5,275,364 A | 1/1994 | Burger et al. |
| 5,321,579 A | 6/1994 | Brown et al. |
| 5,349,975 A | 9/1994 | Valdner |
| 5,683,064 A | 11/1997 | Copeland et al. |
| 5,979,793 A | 11/1999 | Louis |
| 5,996,511 A | 11/1999 | Swoger |
| 6,017,188 A | 1/2000 | Benton |
| 6,027,309 A | 2/2000 | Rawls et al. |
| 6,113,054 A | 9/2000 | Ma |
| 6,134,103 A | 10/2000 | Ghanma |
| 6,138,970 A | 10/2000 | Sohrt et al. |
| 6,158,701 A | 12/2000 | Deshler |
| 6,199,570 B1 | 3/2001 | Patarra |
| 6,298,866 B1 | 10/2001 | Molnar, IV |
| 6,302,560 B1 | 10/2001 | Lai |
| 6,347,776 B1 | 2/2002 | Chuang |
| 6,374,840 B1 | 4/2002 | Ma |
| 6,412,889 B1 | 7/2002 | Hummell et al. |
| 6,439,249 B1 | 8/2002 | Spatafora et al. |
| 6,446,650 B1 | 9/2002 | Ma |
| 6,488,254 B2 | 12/2002 | Li |
| 6,511,033 B2 | 2/2003 | Henrie et al. |
| 6,565,060 B2 | 5/2003 | Li |
| 6,585,219 B2 | 7/2003 | Li |
| 6,598,990 B2 | 7/2003 | Li |
| 6,636,918 B1 | 10/2003 | Aguilar et al. |
| 6,666,284 B2 | 12/2003 | Stirm |
| 6,785,789 B1 | 8/2004 | Kekre et al. |
| 6,840,657 B2 | 1/2005 | Tung |
| 6,959,996 B2 | 7/2005 | Ip |
| 6,961,237 B2 | 11/2005 | Dickie |
| 7,017,598 B2 | 3/2006 | Nipke |
| D518,629 S | 4/2006 | Ma |
| 7,034,902 B2 | 4/2006 | Tajima |
| 7,128,076 B2 | 10/2006 | Freedman |
| 7,134,442 B2 | 11/2006 | Ma |
| 7,134,762 B2 | 11/2006 | Ma |
| 7,143,501 B2 | 12/2006 | Bramson et al. |
| D539,632 S | 4/2007 | Ma |
| D558,444 S | 1/2008 | Ma |
| 7,412,985 B2 | 8/2008 | Ma |
| 7,493,909 B2 | 2/2009 | Ma |
| 7,497,225 B1 | 3/2009 | Klein, Jr. et al. |
| 7,497,583 B2 | 3/2009 | Ma |
| 7,533,680 B2 | 5/2009 | Ma |
| 7,559,520 B2 | 7/2009 | Quitjano et al. |
| 7,593,220 B2 | 9/2009 | Proctor et al. |
| 7,604,215 B1 | 10/2009 | Fraser |
| 7,628,164 B2 | 12/2009 | Ma et al. |
| 7,650,230 B1 | 1/2010 | Laverick et al. |
| 7,703,464 B2 | 4/2010 | Ma |
| 7,708,022 B2 | 5/2010 | Ma |
| 7,755,970 B2 | 7/2010 | Welker et al. |
| 7,778,624 B2 | 8/2010 | Li |
| 7,784,761 B2 | 8/2010 | Ma |
| 7,798,161 B2 | 9/2010 | Ma |
| D626,324 S | 11/2010 | Ma |
| 7,856,996 B2 | 12/2010 | Ma |
| 7,861,734 B2 | 1/2011 | Ma |
| 7,891,367 B2 | 2/2011 | Ma |
| 7,900,643 B2 | 3/2011 | Ma |
| 7,963,263 B2 | 6/2011 | Ma |
| 8,020,572 B2 | 9/2011 | Ma |
| 8,025,071 B2 | 9/2011 | Ma |
| 8,061,375 B2 | 11/2011 | Ma |
| 8,066,021 B2 | 11/2011 | Ma |
| 8,082,935 B2 | 12/2011 | Ma |
| D660,137 S | 5/2012 | Ma |
| 8,166,986 B2 | 5/2012 | Ma |
| 8,205,696 B2 | 6/2012 | Ma |
| 8,251,078 B2 | 8/2012 | Ma |
| 8,356,613 B2 | 1/2013 | Ma |
| 8,555,905 B2 | 10/2013 | Ma |
| 8,555,906 B2 | 10/2013 | Ma |
| 8,616,226 B2 | 12/2013 | Ma et al. |
| D697,705 S | 1/2014 | Ma |
| 8,632,045 B2 | 1/2014 | Ma |
| 8,657,246 B2 | 2/2014 | Ma |
| 8,919,722 B2 | 6/2014 | Ma |
| D719,342 S | 12/2014 | Ma |
| D719,343 S | 12/2014 | Tung |
| 8,919,361 B2 | 12/2014 | Ma |
| 8,960,625 B2 | 2/2015 | Ma |
| D724,309 S | 3/2015 | Ma |
| 9,030,829 B2 | 5/2015 | Ma |
| D731,166 S | 6/2015 | Ma |
| 9,078,497 B2 | 7/2015 | Ma |
| 9,113,683 B2 | 8/2015 | Ma |
| D738,609 S | 9/2015 | Ma |
| D738,610 S | 9/2015 | Ma |
| 9,125,462 B2 | 9/2015 | Akin et al. |
| 9,192,215 B2 | 11/2015 | Ma |
| 9,220,325 B2 | 12/2015 | Ma |
| 9,237,785 B2 | 1/2016 | Ma |
| 9,241,549 B2 | 1/2016 | Ma |
| 9,289,039 B2 | 3/2016 | Akin |
| 9,510,653 B2 | 12/2016 | Akin |
| 9,629,426 B1 | 4/2017 | Fan |
| 9,839,267 B1 | 12/2017 | Gharabegian |
| 2001/0001083 A1 | 5/2001 | Helot |
| 2002/0074027 A1 | 6/2002 | Maidment |
| 2004/0240167 A1 | 12/2004 | Ledbetter et al. |
| 2005/0016571 A1 | 1/2005 | Wu |
| 2005/0072451 A1 | 4/2005 | Vivian et al. |
| 2005/0161067 A1 | 7/2005 | Hollins |
| 2006/0124122 A1 | 6/2006 | Young et al. |

(56) References Cited

U.S. PATENT DOCUMENTS

| | | |
|---|---|---|
| 2006/0127034 A1 | 6/2006 | Brooking et al. |
| 2006/0196532 A1 | 9/2006 | Tung |
| 2007/0040647 A1 | 2/2007 | Saenz |
| 2007/0070588 A1 | 3/2007 | Lin |
| 2007/0126208 A1 | 6/2007 | Freedman |
| 2007/0242450 A1 | 10/2007 | Blatecky |
| 2007/0279856 A1 | 12/2007 | Bragg |
| 2007/0286463 A1 | 12/2007 | Ritzau et al. |
| 2008/0092936 A1 | 4/2008 | Carabillo |
| 2008/0262657 A1 | 10/2008 | Howell et al. |
| 2009/0056775 A1 | 3/2009 | Kuelbs |
| 2009/0071516 A1 | 3/2009 | Li |
| 2009/0188537 A1 | 7/2009 | Bacik |
| 2009/0193578 A1 | 8/2009 | Jang et al. |
| 2009/0250982 A1 | 10/2009 | Cohen |
| 2009/0277486 A1 | 12/2009 | Stepaniuk et al. |
| 2010/0012164 A1 | 1/2010 | Stoelinga |
| 2010/0097441 A1 | 4/2010 | Trachtenberg et al. |
| 2010/0204481 A1 | 8/2010 | Chemel et al. |
| 2010/0245503 A1 | 9/2010 | Li |
| 2010/0295456 A1 | 11/2010 | Ko |
| 2010/0320819 A1 | 12/2010 | Cohen et al. |
| 2011/0157801 A1 | 6/2011 | Satterfield |
| 2012/0029704 A1 | 2/2012 | Ackerman |
| 2012/0038279 A1 | 2/2012 | Chang |
| 2013/0073283 A1 | 3/2013 | Kenwood |
| 2014/0167624 A1 | 6/2014 | Sheu |
| 2014/0317168 A1 | 10/2014 | Suresh |
| 2015/0043202 A1 | 2/2015 | Kosedag |
| 2015/0116485 A1 | 4/2015 | Subramanian |
| 2015/0255853 A1 | 9/2015 | Apple |
| 2015/0362137 A1 | 12/2015 | Izardel |
| 2016/0153650 A1 | 6/2016 | Chien |
| 2016/0184993 A1 | 6/2016 | Brandwijk |
| 2016/0326765 A1 | 11/2016 | Barbret |
| 2016/0338457 A1* | 11/2016 | Gharabegian .......... G05B 15/02 |
| 2018/0020530 A1 | 1/2018 | Scordato |
| 2019/0177029 A1 | 6/2019 | Lopez Masague |

FOREIGN PATENT DOCUMENTS

| | | |
|---|---|---|
| CN | 102258250 | 11/2011 |
| CN | 103405009 | 11/2013 |
| CN | 104469162 | 3/2015 |
| CN | 104835334 | 8/2015 |
| CN | 105193034 | 12/2015 |
| CN | 205089186 | 3/2016 |
| CN | 201580588 | 4/2016 |
| CN | 202974544 | 6/2016 |
| CN | 106163041 | 11/2016 |
| EP | 1731055 | 12/2006 |
| EP | 2479375 | 7/2012 |
| FR | 2977457 | 1/2013 |
| GB | WO2005092140 | 6/2013 |
| GR | 20060100244 | 11/2007 |
| JP | 2008212421 | 9/2008 |
| RU | 12174 | 12/1999 |
| WO | WO2003073884 | 9/2003 |
| WO | WO2004103113 | 12/2004 |
| WO | WO2006059334 | 6/2006 |
| WO | WO2008102403 | 8/2008 |
| WO | WO2009124384 | 10/2009 |
| WO | WO20100098735 | 9/2010 |
| WO | WO2011/115418 | 9/2011 |
| WO | WO2011/140557 | 11/2011 |
| WO | WO2016/174312 | 11/2016 |
| WO | WO2017/127845 | 7/2017 |
| WO | WO2018057672 | 3/2018 |

OTHER PUBLICATIONS

Written Opinion and International Search Report for PCT International Application No. PCT/US2018/030169, Federal Institute of Industrial Property, International Filing Date Apr. 30, 2018, dated Aug. 9, 2018.

International Search Report and Written Opinion of International Searching Authority, International Application No. PCT/US2017/031625, dated Aug. 24, 2017.

International Search Report and Written Opinion of International Searching Authority, International Application No. PCT/US2017/043789, dated Nov. 23, 2017.

International Search Report and Written Opinion of International Searching Authority, International Application No. PCT/US2017/045059, dated Jan. 25, 2018.

International Search Report and Written Opinion of International Searching Authority Application No. PCT/US2017/052595, dated Feb. 21, 2018.

International Search Report, PCT Application No. PCT/US2017/068771, dated May 10, 2018, Federal Institute of Industrial Property, Authorized Officer, A. Chekalkina.

Written Opinion and International Search Report for PCT International Application No. PCT/US2018/041080, Federal Institute of Industrial Property, International Filing Date Jul. 6, 2018, dated Oct. 11, 2018.

Written Opinion and International Search Report for PCT International Application No. PCTUS2018/045435, International Filing Date Aug. 6, 2018, dated Nov. 22, 2018.

International Search Report and Written Opinion of International Searching Authority Application No. PCT/US2017/052595, dated Feb. 21, 2018, dated Nov. 22, 2018.

International Search Report, PCT Application No. PCT/US2017/068771, dated May 10, 2018, Federal Institute of Industrial Property, Authorized Officer, A. Chekalkina, dated Nov. 22, 2018.

GPS Sun Tracking Solar Panel; Alyammahi et al., published May 7, 2015, accessed Jun. 21, 2017 from https:repository.lib.fit.edu/handle/11141/628?show=full.

International Search Report, PCT Aplication No. PCT/US2019/031903; dated Sep. 26, 2019.

International Preliminary Report on Patentability, PCT Application PCT/US2018/030169, dated Nov. 5, 2019.

* cited by examiner

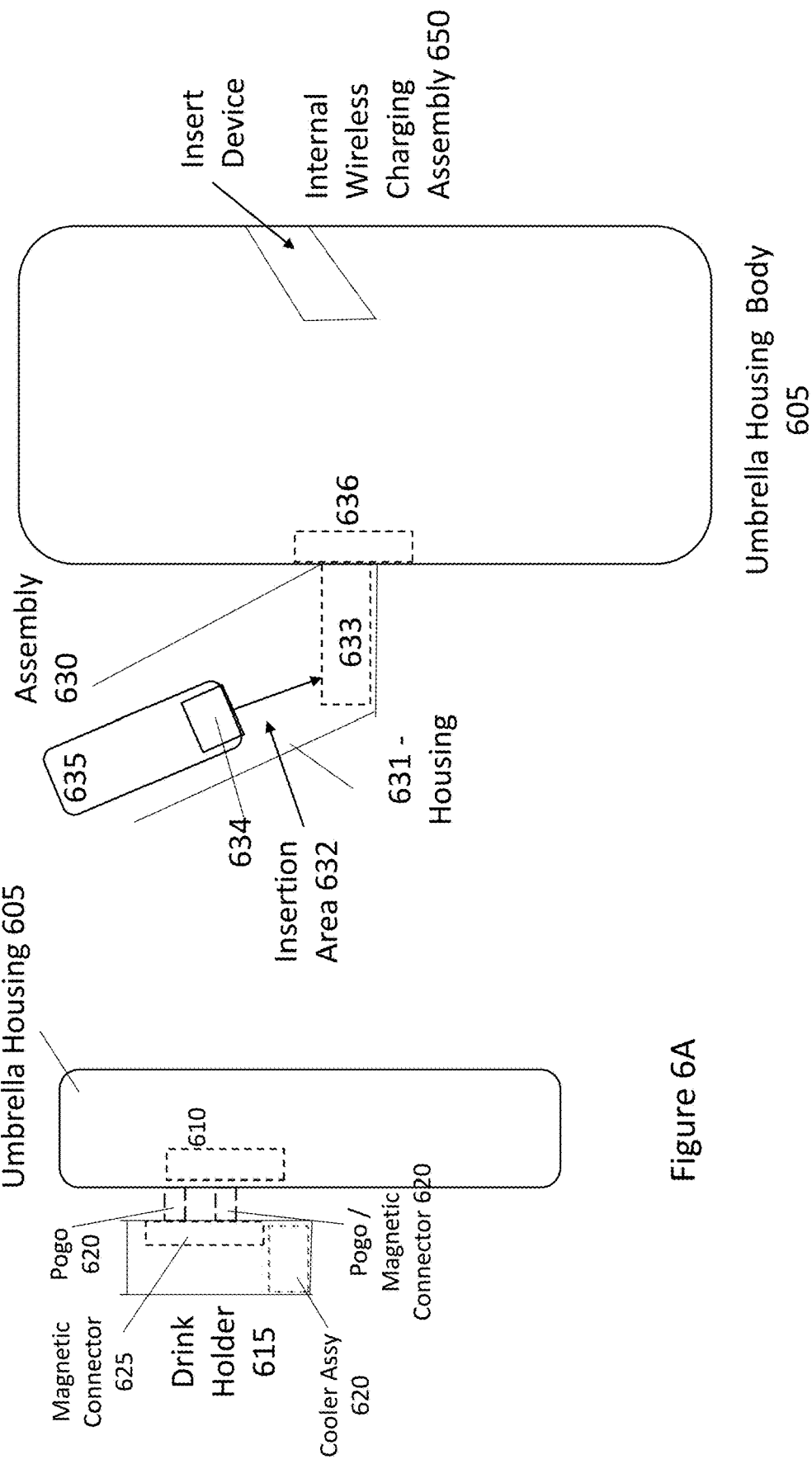

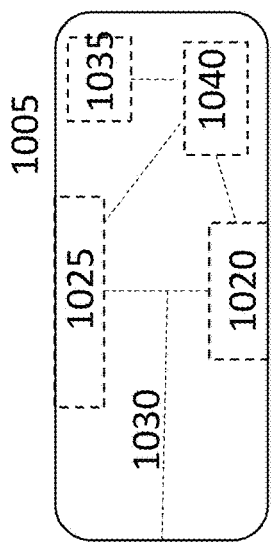
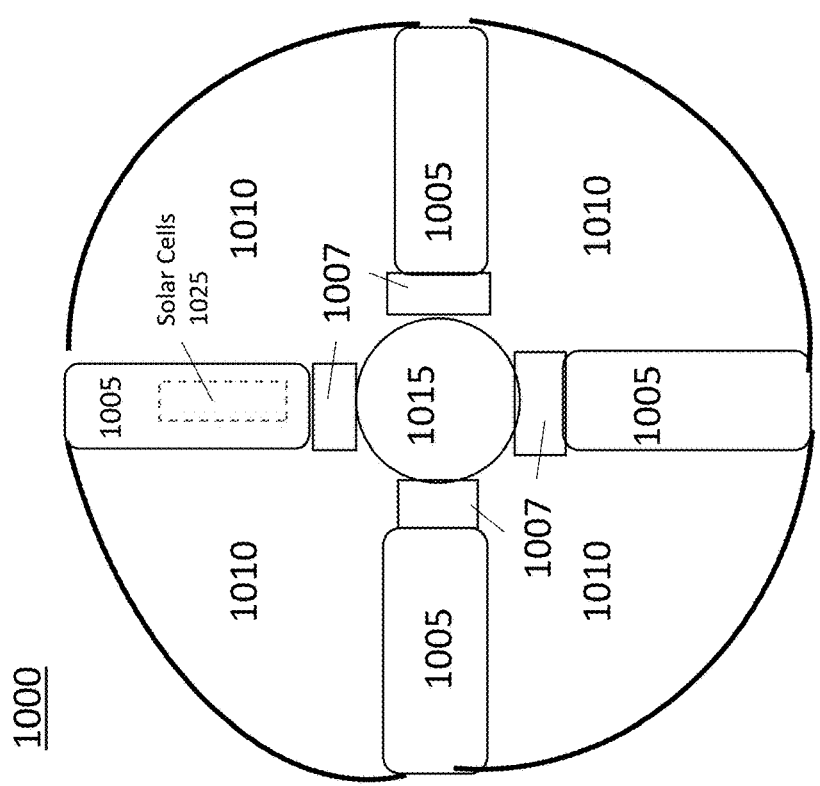
Figure 10B
Figure 10A

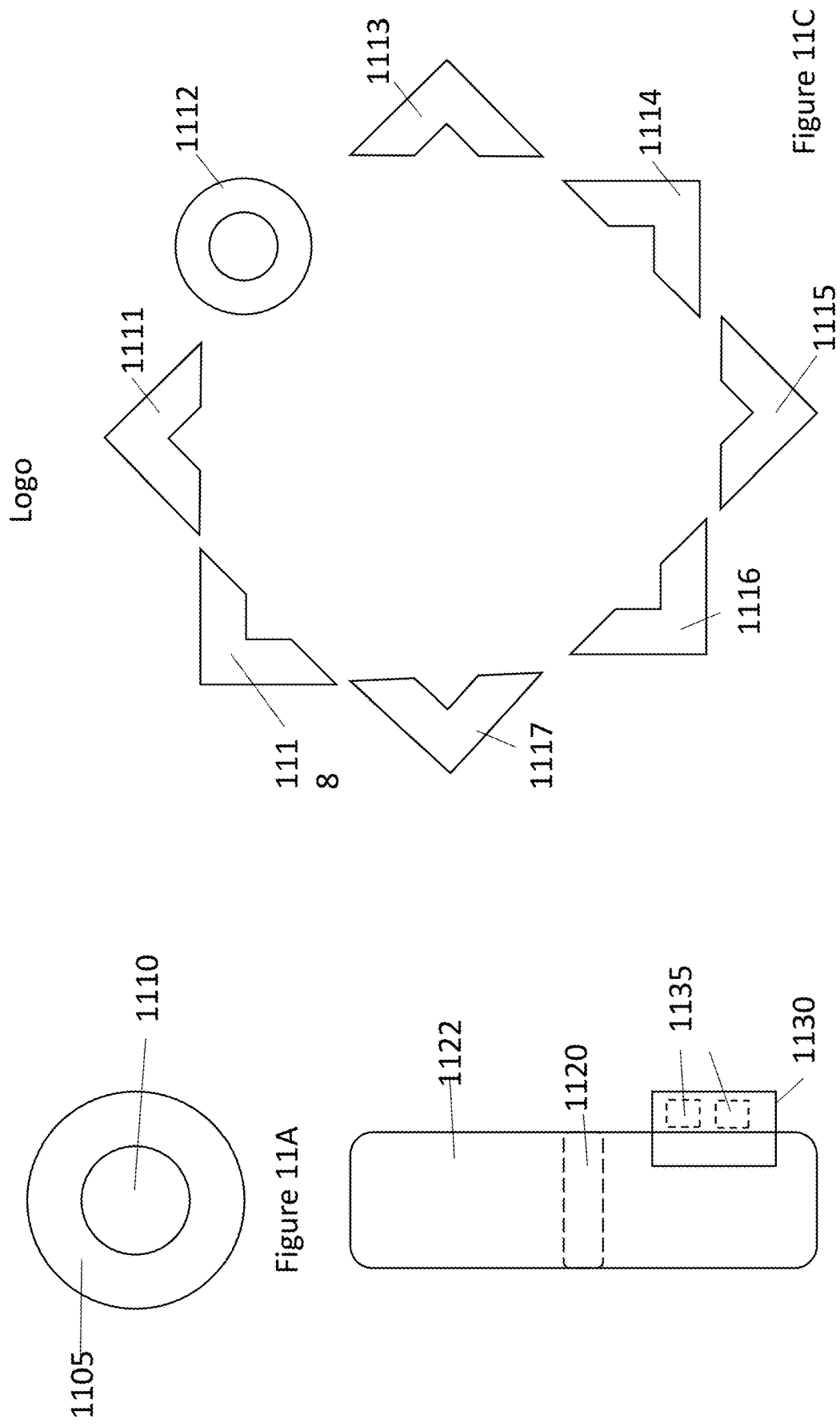

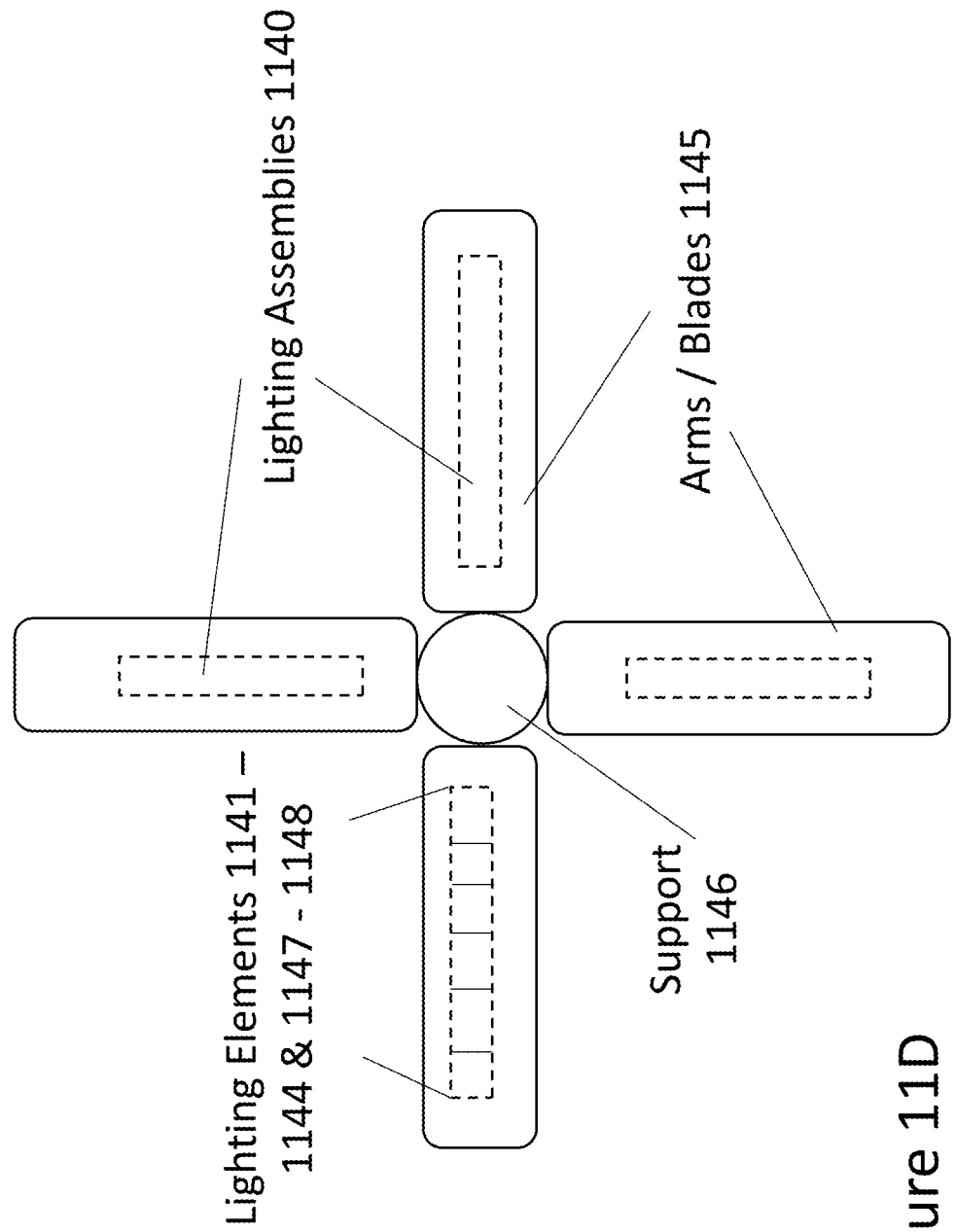

Fig. 13A

| Hardware | | | Function |
|---|---|---|---|
| 1305: Telemetry Board With Slave Processor | GPS/GNSS | 1306 | Provide Location and Orientation Information |
| | Digital Compass | 1307 | |
| 1310: Weather Variables Board With Slave Processor | Air Quality Sensor | 1311 | Sense Weather Variables Surrounding the Shade. Detect High Winds and Close Shade's Arms |
| | UV Radiation Sensor | 1312 | |
| | Digital Barometer | 1313 | |
| | Temperature | 1314 | |
| | Humidity | 1316 | |
| | Wind Speed | 1317 | |
| 1315: Voice Recognition Board With Slave Processor | | | Enable Control Via Voice Commands. Provide Audible Warnings |
| 1320: Rechargable Battery | | | Store Electricity Collected Through Solar Panel/AC Charger. Provide Electricity for All Shade Components |
| 1325: Solar Panel | | | Generate Electricity To Charge the Battery |
| 1330: Power Tracking Solar Charger | | | Regulate and Balance the Charging Process. Provide Data Regarding Charging State |
| 1335: AC Adapter Input | | | Charge the Battery/Run System in Absence of Sun |
| 1340: Proximity Sensor | | | Identify the Location of A Person Relative to Moving Components |
| 1345: Motion Sensor | | | Detect Presence of Person Around Shade |

Fig. 13B

| Hardware | | Function |
|---|---|---|
| 1350 | Code Based Obstacle Detector | Detect Presence of Person/Object Within Shade's Path of Travel |
| 1355 | Tilt Sensor | Detect movement/relocation of Shade and Reorient to Correct Position |
| 1360 | Linux Based Computer With Integrated Wifi And 5xIP Cameras | Collect Video Feed along with Sensor data Communicate Through Wifi. |
| 1365 | Bluetooth | Provides Short Distance Communication for App Based Control, Audio Transmission, and Data Retrieval. |
| 1370 | LED Lighting | Provides Light During Night Operation |
| 1375 | Class D Stereo Amplifier With Speakers | Provides Audio Playback Through Mobile App or Wifi Stream |
| 1380 | Azimuth Servo Motor With Controller | Rotates Shade to Predetermined Azimuth Angle |
| 1385 | Elevation Servo Motor With Controller | Rotates Shade to Predetermined Elevation Angle |
| 1390 | Actuator Servo Motor With Controller | Extend/Retract Shade Blades |
| 1395 | Motion Control PCB | |
| 1357 | Digital Cameras | |
| 1366 | Wind Turbine | |
| 1377 | USB Device | |

APPARATUS AND METHOD FOR IDENTIFYING OPERATIONAL STATUS OF UMBRELLA, PARASOL OR SHADING SYSTEM UTILIZING LIGHTING ELEMENTS

RELATED APPLICATIONS

This application claims priority to U.S. patent application Ser. No. 62/614,403, filed Jan. 6, 2018, entitled "Umbrella Parasol or Shading System Mechanical Improvements and Artificial Intelligence Methods," the disclosure of which is hereby incorporated by reference.

BACKGROUND

Parasols, umbrellas and shading systems have limited functionality. Outdoor connectivity is important.

BRIEF DESCRIPTION OF DRAWINGS

FIG. 6A (magnetic coolers) illustrates a parasol, umbrella or shading system with a magnetic attachment connector or a POGO connector according to embodiments;

FIG. 6B illustrates an umbrella, parasol or shading system with a wireless charging assembly according to embodiments

FIG. 10A illustrates an umbrella, parasol or shading system with multiple arms or blades and/or one or more shading fabrics according to embodiments;

FIG. 10B illustrates a side cross-section view of one of the arms or blades according to embodiments FIG. 11A illustrates a power button with a lighting element encircling the power button according to embodiments;

FIG. 11B illustrates a lighting element in a core assembly or support, where the lighting element goes around or encircles a core assembly or central support according to embodiments;

FIG. 11C illustrates a plurality of lighting elements for an umbrella, parasol or shading system according to embodiments;

FIG. 11D illustrates one or more arms/blades comprising one or more lighting elements or assemblies according to embodiments;

FIGS. 13A and 13B illustrates a block diagram of a modular umbrella system according to embodiments.

DETAILED DESCRIPTION

Figure 1A:
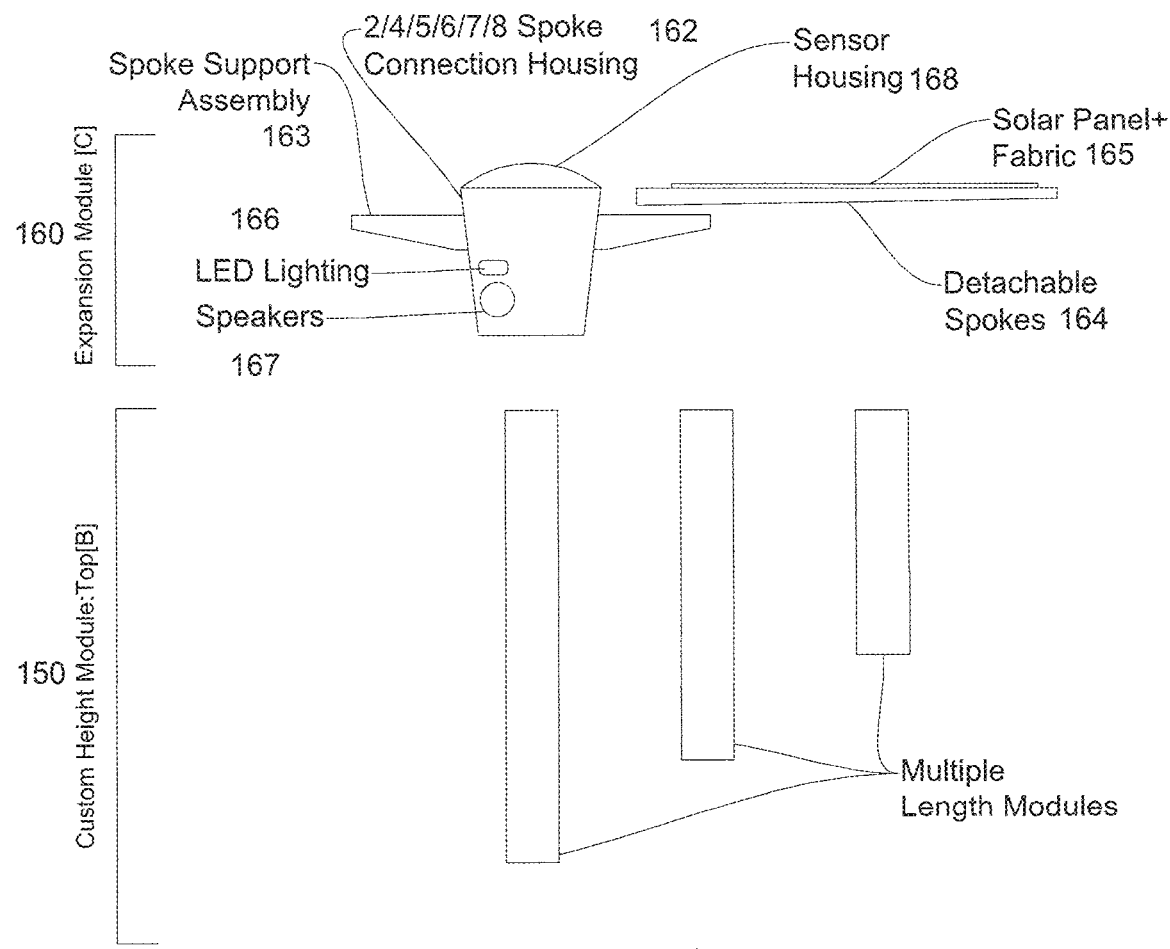
FIGS. 1A, 1B and 1C illustrate a modular umbrella shading system according to embodiments.

In the following detailed description, numerous specific details are set forth to provide a thorough understanding of claimed subject matter. For purposes of explanation, specific numbers, systems and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes and/or equivalents may occur to those skilled in the art. It is, therefore, to be understood that appended claims are intended to cover any and all modifications and/or changes as fall within claimed subject matter.

References throughout this specification to one implementation, an implementation, one embodiment, embodiments, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term "coupled" is also understood generically to mean indirectly connected, for example, in an appropriate context. In a context of this application, if signals, instructions, and/or commands are transmitted from one component (e.g., a controller or processor) to another component (or assembly), it is understood that messages, signals, instructions, and/or commands may be transmitted directly to a component, or may pass through a number of other components on a way to a destination component. For example, a signal transmitted from a motor controller or processor to a motor (or other driving assembly) may pass through glue logic, an amplifier, an analog-to-digital converter, a digital-to-analog converter, another controller and/or processor, and/or an interface. Similarly, a signal communicated through a misting system may pass through an air conditioning and/or a heating module, and a signal communicated from any one or a number of sensors to a controller and/or processor may pass through a conditioning module, an analog-to-digital controller, and/or a comparison module, and/or a number of other electrical assemblies and/or components.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics.

Likewise, the term "based on," "based, at least in part on," and/or similar terms (e.g., based at least in part on) are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

Also as used herein, one or more parameters may be descriptive of a collection of signal samples, such as one or more electronic documents, and exist in the form of physical signals and/or physical states, such as memory states. For example, one or more parameters may include parameters, such as 1) how much an assembly (e.g., motor assembly) may move or be requested to move; 2) a time of day at which an image was captured, a latitude and longitude of an image capture device, such as a camera; 3) time and day of when a sensor reading (e.g., humidity, temperature, air quality, UV radiation) may be received and/or measurements or values of sensor readings; and/or 4) operating conditions of one or more motors or other components or assemblies in a balcony shading and power system. Claimed subject matter is intended to embrace meaningful, descriptive parameters in any format, so long as the one or more parameters comprise physical signals and/or states.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In embodiments, a modular umbrella shading system may comprise a computing device installed within or as part of a modular umbrella system, intelligent umbrella and/or intelligent shading charging system. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, numbers, numerals or the like, and that these are conventional labels. Unless specifically stated otherwise, it is appreciated that throughout this specification discussions utilizing terms such as "processing," "computing," "calculating," "determining" or the like may refer to actions or processes of a specific apparatus, such as a special purpose computer or a similar special purpose electronic computing device (e.g., such as a balcony shading and power system processor, controller and/or computing device). In the context of this specification, therefore, a special purpose computer or a similar special purpose electronic computing device (e.g., a balcony shading and power system processor, controller and/or computing device) is capable of manipulating or transforming signals (electronic and/or magnetic) in memories (or components thereof), other storage devices, transmission devices sound reproduction devices, and/or display devices.

In an embodiment, a controller and/or a processor typically performs a series of instructions resulting in data manipulation. In an embodiment, a microcontroller or microprocessor may be a compact microcomputer designed to govern the operation of embedded systems in electronic devices, e.g., a balcony shading and power system processor, controller and/or computing device or single board computers, and various other electronic and mechanical devices coupled thereto or installed thereon. Microcontrollers may include processors, microprocessors, and other electronic components. Controller may be a commercially available processor such as an Intel Pentium, Raspberry Pi, other Linux-based computers, Motorola PowerPC, SGI MIPS, Sun UltraSPARC, or Hewlett-Packard PA-RISC processor, but may be any type of application-specific and/or specifically designed processor or controller. In an embodiment, a processor and/or controller may be connected to other system elements, including one or more memory devices, by a bus, a mesh network or other mesh components. In embodiments, a processor and/or controller may be connected to other power devices also via power buses from either a rechargeable power source and/or a solar charging assembly. Usually, a processor or controller, may execute an operating system which may be, for example, a Windows-based operating system (Microsoft), a MAC OS System X operating system (Apple Computer), one of many Linux-based operating system distributions, a portable electronic device operating system (e.g., mobile phone operating systems), microcomputer operating systems, and/or a UNIX operating systems. Embodiments are not limited to any particular implementation and/or operating system.

Figure 1B:
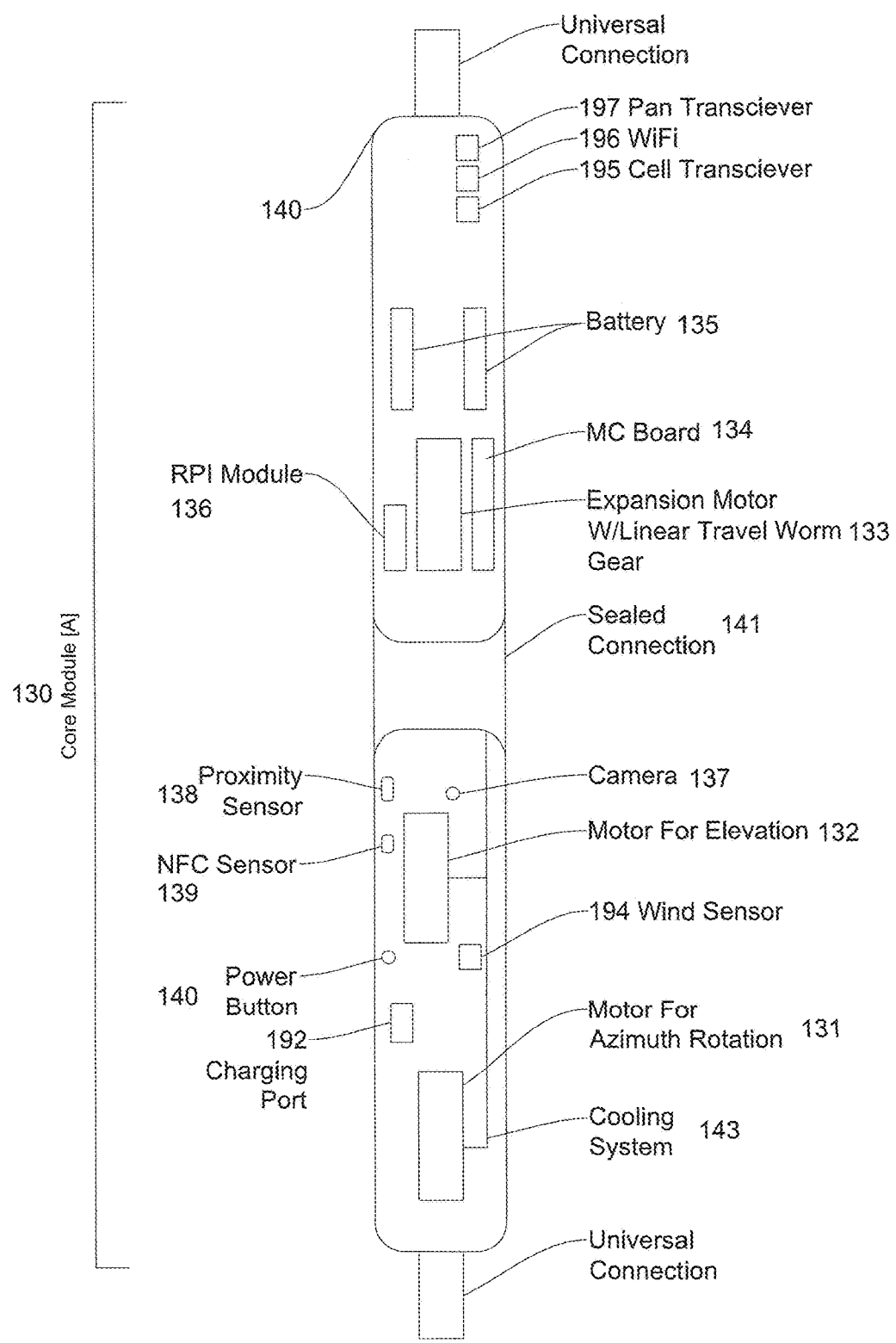
Figure 1C:
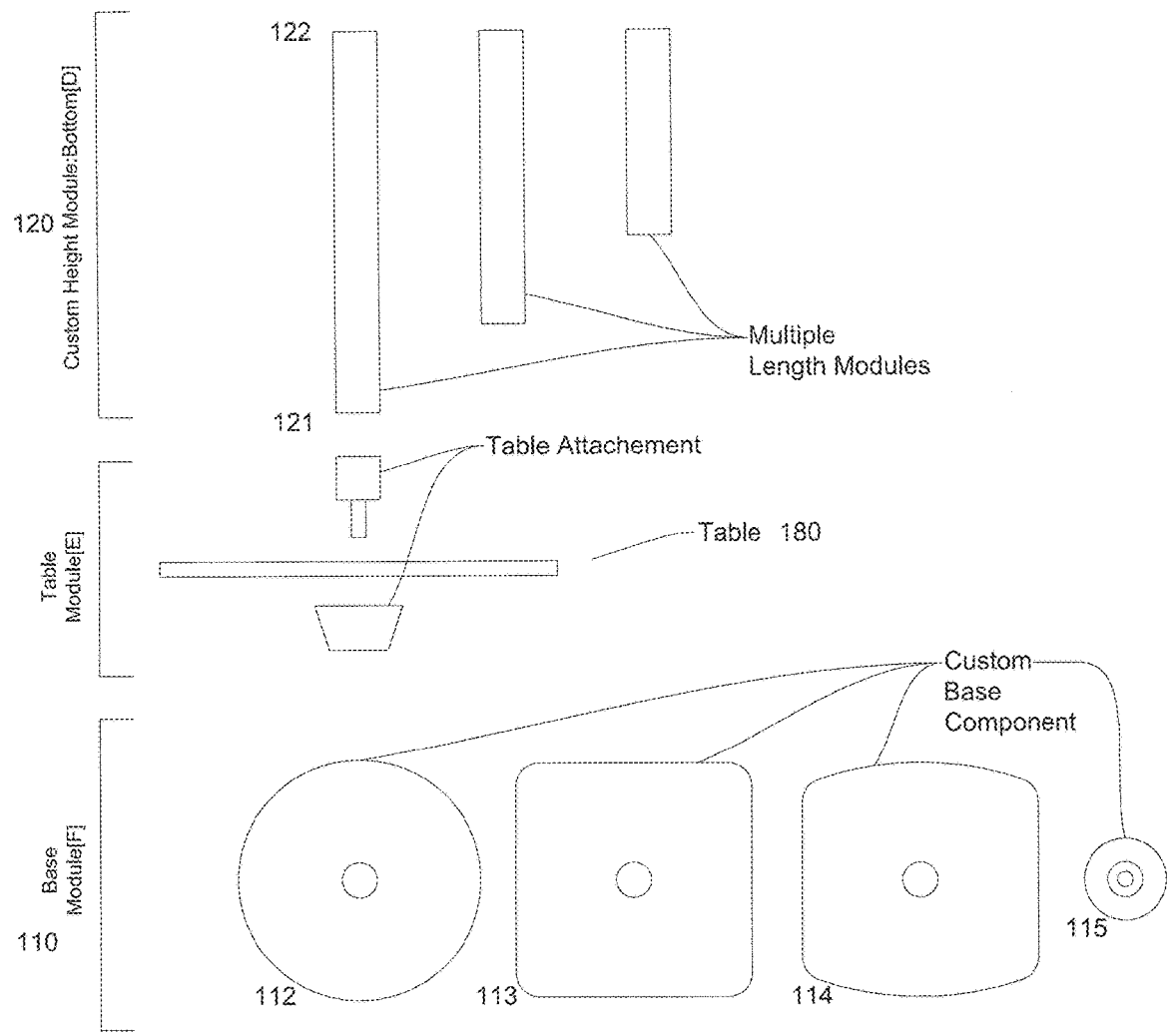

The specification may refer to an umbrella, a robotic shading system, or a parasol. In embodiments, each of these devices may be intelligent and/or automated. In embodiments, an umbrella, robotic shading system or a parasol may provide shade and/or coverage to a user from weather elements such as sun, wind, rain, and/or hail in an outdoor environment or outdoor portions of a structure (whether building, office and/or sports complexes). In embodiments, an umbrella, a robotic shading system or a parasol may be an automated, intelligent and/or employ artificial intelligence and/or machine learning. The device and/or apparatus may also be referred to as a sun shade, outdoor shade furniture, sun screen, sun shelter, awning, sun cover, sun marquee, brolly and other similar names, which may all be utilized interchangeably in this application FIG. 1A, 1B or 1C illustrates a modular umbrella or shading system according to embodiments. In embodiments, a modular umbrella system 100 comprises a base assembly or module 110, a first extension assembly or module 120, a core assembly module housing (or core umbrella assembly) 130, a second extension assembly or module 150, and an expansion sensor assembly or module (or an arm extension assembly or module) 160. In embodiments, a modular umbrella shading system 100 may not comprise a base assembly or module 110 and may comprise a table assembly or module 180 to connect to table tops, such as patio tables and/or other outdoor furniture. In embodiments, a table assembly or module 180 may comprise a table attachment and/or a table receptacle. In embodiments, a base module or assembly 110 may comprise a circular base component 112, a square or rectangular base component 113, a rounded edges base component 114, and/or a beach or sand base component 115. In embodiments, base components 112, 113, 114, and/or 115 may be interchangeable based upon a configuration required by an umbrella system and/or user. In embodiments, each of the different options for the base components 112, 113, 114, 115, and/or 180 may have a universal connector and/or receptacle to allow for easy interchangeability.

In embodiments, a first extension assembly or module 120 may comprise a shaft assembly having a first end 121 and a second end 122. In embodiments, a first end 121 may be detachably connectable and/or connected to a base assembly or module 110. In embodiments, a second end 122 may be detachably connected and/or connectable to a first end of a core umbrella assembly or module 130. In embodiments, a first end 121 and a second end 122 may have a universal umbrella connector. In other words, a connector may be universal within all modules and/or assemblies of a modular umbrella system to provide a benefit of allowing backwards capabilities with new versions of different modules and/or assemblies of a modular umbrella shading system. In embodiments, a first extension assembly or module 120 may have different lengths. In embodiments, different length first extension assemblies may allow a modular umbrella shading system to have different clearance heights between a base assembly or module 110 and/or a core umbrella assembly or module 130. In embodiments, a first extension assembly or module 110 may be a tube and/or a shell with channels, grooves and/or pathways for electrical wires and/or components and/or mechanical components. In embodiments, a first extension assembly 110 may be a shaft assembly having an inner core comprising channels, grooves and/or pathways for electrical wires, connectors and/or components and/or mechanical components.

In embodiments, a universal umbrella connector or connection assembly 124 may refer to a connection pair and/or connection assembly that may be uniform for all modules, components and/or assemblies of a modular umbrella system 100. In embodiments, having a universal umbrella connector or connection assembly 124 may allow interchangeability and/or backward compatibility of the various assemblies and/or modules of the modular umbrella system 100. In embodiments, for example, a diameter of all or most of universal connectors 124 utilized in a modular umbrella system may be the same. In embodiments, a universal connector or connection assembly 124 may be a twist-on connector. In embodiments, a universal connector 124 may be a drop in connector and/or a locking connector, having a male and female connector. In embodiments, a universal connector or connection assembly 124 may be a plug with another connector being a receptacle. In embodiments, universal connector 124 may be an interlocking plug receptacle combination. For example, universal connector 124 may be a plug and receptacle, jack and plug, flanges for connection, threaded plugs and threaded receptacles, snap fit connectors, adhesive or friction connectors. In embodiments, for example, universal connector or connection assembly 124 may be external connectors engaged with threaded internal connections, snap-fit connectors, push fit couplers. In embodiments, by having a universal connector or connection assembly 124 for joints or connections between a base module or assembly 110 and a first extension module or assembly 120, a first extension module or assembly 120 and a core assembly module or assembly 130, a core assembly module or assembly 130 and a second extension module or assembly 150, and/or a second extension module or assembly 150 and an expansion sensor module or assembly 160, an umbrella or shading object manufacturer may not need to provide additional parts for additional connectors for attaching, coupling or connecting different modules or assemblies of a modular umbrella shading system. In addition, modules and/or assemblies may be upgraded easily because one module and/or assembly may be switched out of a modular umbrella system without having to purchase or procure additional modules because of the interoperability and/or interchangeability.

In embodiments, a core umbrella assembly or module 130 may be positioned between a first extension assembly or module 120 and a second extension assembly or module 150. In embodiments, core umbrella assembly or module 130 may be positioned between a base assembly or module 110 and/or an expansion and sensor module or assembly 160. In embodiments, a core umbrella assembly or module 130 may comprise an upper core assembly 140, a core assembly connector or mid-section 141 and/or a lower core assembly 142. In embodiments, a core assembly connector 141 may be a sealer or sealed connection to protect a modular umbrella system from environmental conditions. In embodiments, a core umbrella assembly or module 130 may comprise two or more motors or motor assemblies. Although the specification may refer to a motor, a motor may be a motor assembly with a motor controller, a motor, a stator, a rotor and/or a drive/output shaft. In embodiments, a core umbrella assembly 130 may comprise an azimuth rotation motor 131, an elevation motor 132, and/or a spoke expansion/retraction motor 133. In embodiments, an azimuth rotation motor 131 may cause a core umbrella assembly 130 to rotate clockwise or counterclockwise about a base assembly or module 110 or a table connection assembly 180. In embodiments, an azimuth rotation motor 131 may cause a core umbrella assembly 130 to rotate about an azimuth axis. In embodiments, a core umbrella assembly or module 130 may rotate up to 360 degrees with respect to a base assembly or module 130.

In embodiments, an elevation motor 132 may cause an upper core assembly 140 to rotate with respect to a lower core assembly 142. In embodiments, an elevation motor 130 may rotate an upper core assembly 140 between 0 to 90 degrees with respect to the lower core assembly 142. In embodiments, an elevation motor 130 may rotate an upper module or assembly 140 between 0 to 30 degrees with respect to a lower assembly or module 142. In embodiments, an original position may be where an upper core assembly 140 is positioned in line and above the lower core assembly 142, as is illustrated in FIG. 1B.

In embodiments, a spoke expansion motor 133 may be connected to an expansion and sensor assembly module 160 via a second extension assembly or module 150 and cause spoke or arm support assemblies in a spoke expansion sensor assembly module 160 to deploy or retract outward and/or upward from an expansion sensor assembly module 160. In embodiments, an expansion extension assembly module 160 may comprise a rack gear and spoke connector assemblies (or arms). In embodiments, a spoke expansion motor 133 may be coupled and/or connected to a hollow tube via a gearing assembly, and may cause a hollow tube to move up or down (e.g., in a vertical direction). In embodiments, a hollow tube may be connected and/or coupled to a rack gear, which may be connected and/or coupled to spoke connector assemblies. In embodiments, movement of a hollow tube in a vertical direction may cause spoke assemblies and/or arms to be deployed and/or retracted. In embodiments, spoke connector assemblies and/or arms may have a corresponding and/or associated gear at a vertical rack gear.

In embodiments, a core assembly or module 130 may comprise motor control circuitry 134 (e.g., a motion control board 134) that controls operation of an azimuth motor 131, an elevation motor 132 and/or an expansion motor 133, along with other components and/or assemblies. In embodiments, the core assembly module 130 may comprise one or more batteries 135 (e.g., rechargeable batteries) for providing power to electrical and mechanical components in the modular umbrella system 100. For example, one or more batteries 135 may provide power to motion control circuitry 134, an azimuth motor 131, an expansion motor 133, an elevation motor 132, a camera 137, a proximity sensor 138, a near field communication (NFC) sensor 138. In embodiments, one or more batteries 135 may provide power to an integrated computing device 136, although in other embodiments, an integrated computing device 136 may also comprise its own battery (e.g., rechargeable battery).

In embodiments, the core assembly 130 may comprise a separate and/or integrated computing device 136. In embodiments, a separate computing device 136 may comprise a Raspberry Pi computing device, other single-board computers and/or single-board computing device. Because a modular umbrella shading system has a limited amount of space, a single-board computing device is a solution that allows for increased functionality without taking up too much space in an interior of a modular umbrella shading system. In embodiments, a separate computing device 136 may handle video, audio and/or image editing, processing, and/or storage for a modular umbrella shading system 100 (which are more data intensive functions and thus require more processing bandwidth and/or power). In embodiments, an upper core assembly 140 may comprise one or more rechargeable batteries 135, a motion control board (or motion control circuitry) 134, a spoke expansion motor 133 and/or a separate and/or integrated computing device 136.

In embodiments, a core assembly connector/cover 141 may cover and/or secure a connector between an upper core assembly 140 and a lower core assembly 142. In embodiments, a core assembly connector and/or cover 141 may provide protection from water and/or other environmental conditions. In other words, a core assembly connector and/or cover 141 may make a core assembly 130 waterproof and/or water resistant and in other environments, may protect an interior of a core assembly from sunlight, cold or hot temperatures, humidity and/or smoke. In embodiments, a core assembly connector/cover 141 may be comprised of a rubber material, although a plastic and/or fiberglass material may be utilized. In embodiments, a core assembly connector/cover 141 may be comprised of a flexible material, silicone, and/or a membrane In embodiments, a core assembly connector/cover 141 may be circular and/or oval in shape and may have an opening in a middle to allow assemblies and/or components to pass freely through an interior of a core assembly connector or cover 141. In embodiments, a core assembly connector/cover 141 may adhere to an outside surface of an upper core assembly 140 and a lower core assembly 142. In embodiments, a core assembly connector/cover 141 may be connected, coupled, fastened and/or have a grip or to an outside surface of the upper core assembly 140 and the lower core assembly 142. In embodiments, a core assembly connector and/or cover 141 may be connected, coupled, adhered and/or fastened to a surface (e.g., top or bottom surface) of an upper core assembly and/or lower core assembly 142. In embodiments, a core assembly connector/cover 141 may cover a hinging assembly and/or reparation point, springs, and wires that are present between an upper core assembly 140 and/or a lower core assembly 142.

In embodiments, a core assembly or module 130 may comprise one or more cameras 137. In embodiments, one or more cameras 137 may be capture images, videos and/or sound of an area and/or environment surrounding a modular umbrella system 100. In embodiments, a lower core assembly 142 may comprise one or more cameras 137. In embodiments, a camera 137 may only capture sound if a user selects a sound capture mode on a modular umbrella system 100 (e.g., via a button and/or switch) or via a software application controlling operation of a modular umbrella system (e.g., a microphone or recording icon is selected in a modular umbrella system software application).

In embodiments, a core assembly 130 may comprise a power button to manually turn on or off power to components of a modular umbrella system. In embodiments, a core assembly or module 130 may comprise one or more proximity sensors 138. In embodiments, one or more proximity sensors 138 may detect whether or not an individual and/or subject may be within a known distance from a modular umbrella system 100. In embodiments, in response to a detection of proximity of an individual and/or subject, a proximity sensor 138 may communicate a signal, instruction, message and/or command to motion control circuitry (e.g., a motion control PCB 134) and/or a computing device 136 to activate and/or deactivate assemblies and components of a modular umbrella system 100. In embodiments, a lower core assembly 142 may comprise a proximity sensor 138 and a power button. For example, a proximity sensor 138 may detect whether an object is within proximity of a modular umbrella system and may communicate a message to a motion control PCB 134 to instruct an azimuth motor 131 to stop rotating a base assembly or module.

In embodiments, a core assembly or module 130 may comprise a near-field communication (NFC) sensor 139. In embodiments, a NFC sensor 139 may be utilized to identify authorized users of a modular umbrella shading system 100. In embodiments, for example, a user may have a mobile computing device with a NFC sensor which may communicate, pair and/or authenticate in combination with a modular umbrella system NFC sensor 139 to provide user identification information. In embodiments, a NFC sensor 139 may communicate and/or transmit a signal, message, command and/or instruction based on a user's identification information to computer-readable instructions resident within a computing device and/or other memory of a modular umbrella system to verify a user is authenticated and/or authorized to utilize a modular umbrella system 100.

In embodiments, a core assembly or module 130 may comprise a cooling system and/or heat dissipation system 143. In embodiments, a cooling system 143 may be one or more channels in an interior of a core assembly or module 130 that direct air flow from outside a modular umbrella system across components, motors, circuits and/or assembles inside a core assembly 130. For example, one or more channels and/or fins may be coupled and/or attached to components, motors and/or circuits, and air may flow through channels to fins and/or components, motors and/or circuits. In embodiments, a cooling system 143 may lower operating temperatures of components, motors, circuits and/or assemblies of a modular umbrella system 100. In embodiments, a cooling system 143 may also comprise one or more plates and/or fins attached to circuits, components and/or assemblies and also attached to channels to lower internal operating temperatures. In embodiments, a cooling system 143 may also move hot air from electrical and/or mechanical assemblies to outside a core assembly. In embodiments, a cooling system 143 may be fins attached to or vents in a body of a core assembly 130. In embodiments, fins and/or vents of a cooling system 143 may dissipate heat from electrical and mechanical components and/or assemblies of the core module or assembly 130.

In embodiments, a separate, detachable and/or connectable skin may be attached, coupled, adhered and/or connected to a core module assembly 130. In embodiments, a detachable and/or connectable skin may provide additional protection for a core assembly module against water, smoke, wind and/or other environmental conditions and/or factors. In embodiments, a skin may adhere to an outer surface of a core assembly 130. In embodiments, a skin may have a connector on an inside surface of the skin and core assembly 130 may have a mating receptacle on an outside surface. In embodiments, a skin may magnetically couple to a core assembly 130. In embodiments, a skin may be detachable and removable from a core assembly so that a skin may be changed for different environmental conditions and/or factors. In embodiments, a skin may connect to an entire core assembly. In embodiments, a skin may connect to portions of an upper core assembly 140 and/or a lower core assembly 142. In embodiments, a skin may not connect to a middle portion of a core assembly 130 (or a core assembly cover connector 141). In embodiments, a skin may be made of a flexible material to allow for bending of a modular umbrella system 100. In embodiments, a base assembly 110, a first extension assembly 120, a core module assembly 130, a second extension assembly 140 and/or an arm extension and sensor assembly 160 may also comprise one or more skin assemblies. In embodiments, a skin assembly may provide a cover for a majority of all of a surface area one or more of the base assembly, first extension assembly 120, core module assembly 130, second extension assembly 150 and/or arm extension sensor assembly 160. In embodiments, a core assembly module 130 may further comprise channels on an outside surface. In embodiments, a skin assembly may comprise two pieces. In embodiments, a skin assembly may comprise edges and/or ledges. In embodiments, edges and/or ledges of a skin assembly may be slid into channels of a core assembly module 130. In embodiments, a base assembly 110, a first extension assembly 120, a second extension assembly 140 and/or an arm expansion sensor assembly 160 may also comprise an outer skin assembly. In embodiments, skin assemblies for these assemblies may be uniform to present a common industrial design. In embodiments, skin assemblies may be different if such as a configuration is desired by a user. In embodiments, skin assemblies may be comprise of a plastic, a hard plastic, fiberglass, aluminum, other light metals (including aluminum), and/or composite materials including metals, plastic, wood. In embodiments, a core assembly module 130, a first extension assembly 120, a second extension assembly 150, an arm expansion sensor assembly 160, and/or a base assembly 110 may be comprised of aluminum, light metals, plastic, hard plastics, foam materials, and/or composite materials including metals, plastic, wood. In embodiments, a skin assembly may be provide protection from environmental conditions (such as sun, rain, and/or wind).

In embodiments, a second extension assembly 150 connects and/or couples a core assembly module 130 to an expansion assembly sensor module (and/or arm extension assembly module) 160. In embodiments, an expansion sensor assembly module 160 may have universal connectors and/or receptacles on both ends to connect or couple to universal receptacles and/or connectors, on the core assembly 130 and/or expansion sensor assembly module 160. FIG. 1 illustrates that a second extension assembly or module 150 may have three lengths. In embodiments, a second extension assembly 150 may have one of a plurality of lengths depending on how much clearance a user and/or owner may like to have between a core assembly module 130 and spokes of an expansion sensor assembly or module 160. In embodiments, a second extension assembly or module 150 may comprise a hollow tube and/or channels for wires and/or other components that pass through the second extension assembly or module 150. In embodiments, a hollow tube 249 (see FIG. 2A) may be coupled, connected and/or fixed to a nut that is connected to, for example, a threaded rod (which is part of an expansion motor assembly). In embodiments, a hollow tube 249 may be moved up and down based on movement of the threaded rod. In embodiments, a hollow tube in a second extension assembly may be replaced by a shaft and/or rod assembly.

In embodiments, an expansion and sensor module 160 may be connected and/or coupled to a second extension assembly or module 150. In embodiments, an expansion and sensor assembly or module 160 may be connected and/or coupled to a second extension assembly or module 150 via a universal connector. In embodiments, an expansion and sensor assembly or module 160 may comprise an arm or spoke expansion sensor assembly 162 and a sensor assembly housing 168. In embodiments, an expansion and sensor assembly or module 160 may be connected to a hollow tube 249 and thus coupled to a threaded rod. In embodiments, when a hollow tube moves up and down, an arm or spoke expansion assembly 162 opens and/or retracts, which causes spokes/blades 164 of an arm extension assembly 163. In embodiments, arms, spokes and/or blades 164 may detachably connected to the arm or spoke support assemblies 163.

In embodiments, an expansion and sensor assembly module 160 may have a plurality of arms, spokes or blades 164 (which may be detachable or removable). Because the umbrella system is modular and/or adjustable to meet needs of user and/or environment, an arm or spoke expansion assembly 162 may not have a set number of arm, blade or spoke support assemblies 163. In embodiments, a user and/or owner may determine and/or configure a modular umbrella system 100 with a number or arms, spokes, or blades extensions 163 (and thus detachable spokes, arms and/or blades 164) necessary for a certain function and attach, couple and/or connect an expansion sensor assembly or module 160 with a spoke expansion assembly 162 with a desired number of blades, arms or spoke connections to a second extension module or assembly 150 and/or a core module assembly or housing 130. Prior umbrellas or shading systems utilize a set or established number of ribs and were not adjustable or configurable. In contrast, a modular umbrella system 100 described herein has an ability to have a detachable and adjustable expansion sensor module 162 comprising an adjustable number of arm/spoke/blade support assemblies or connections 163 (and therefore a flexible and adjustable number of arms/spokes/blades 164), which provides a user with multiple options in providing shade and/or protection. In embodiments, expansion and sensor expansion module 160 may be detachable or removable from a second extension module 150 and/or a core assembly module 130 and also one or more spokes, arms and/or assemblies 164 may be detachable or removable from arm or spoke support assemblies 163. Therefore, depending on the application or use, a user, operator and/or owner may detachably remove an expansion and sensor module or assembly 160 having a first number of arm/blade/spoke support assemblies 163 and replace it with a different expansion sensor module or assembly 160 having a different number of arm/blade/spoke support assemblies 163.

In embodiments, arms, blades and/or spokes 164 may be detachably connected or removable from one or more arm support assemblies 163. In embodiments, arms, blades, and/or spokes 164 may be snapped, adhered, coupled and/or connected to associated arm support assemblies 163. In embodiments, arms, blades and/or spokes 164 may be detached, attached and/or removed before deployment of the arm extension assemblies 163.

In embodiments, a shading fabric 165 may be connected, attached and/or adhered to one or more arm extension assemblies 163 and provide shade for an area surrounding, below and/or adjacent to a modular umbrella system 100. In embodiments, a shading fabric (or multiple shading fabrics) may be connected, attached, and/or adhered to one or more spokes, arms and/or blades 164. In embodiments, a shading fabric or covering 165 may have integrated therein, one or more solar panels and/or cells (not shown). In embodiments, solar panels and/or cells may generate electricity and convert the energy from a solar power source to electricity. In embodiments, solar panels may be coupled to a shading power charging system (not shown). In embodiments, one or more solar panels and/or cells may be positioned on top of a shading fabric 165. In embodiments, one or more solar panels and/or cells may be connected, adhered, positioned, attached on and/or placed on a shading fabric 165.

In embodiments, an expansion sensor assembly or module 160 may comprise one or more audio speakers 167. In embodiments, an expansion sensor assembly or module 160 may further comprise an audio/video transceiver. In embodiments, a core assembly 130 may comprise and/or house an audio/video transceiver (e.g., a Bluetooth or other PAN transceiver, such as Bluetooth transceiver 197). In embodiments, an expansion sensor assembly or module 160 may comprise an audio/video transceiver (e.g., a Bluetooth and/or PAN transceiver) In embodiments, an audio/video transceiver in an expansion sensor assembly or module 160 may receive audio signals from an audio/video transceiver 197 in a core assembly 130, convert to an electrical audio signal and reproduce the sound on one or more audio speakers 167, which projects sound in an outward and/or downward fashion from a modular umbrella system 100. In embodiments, one or more audio speakers 167 may be positioned and/or integrated around a circumference of an expansion sensor assembly or module 160.

In embodiments, an expansion sensor assembly or module 160 may comprise one or more LED lighting assemblies 166. In embodiments, one or more LED lighting assemblies 166 may comprise bulbs and/or LED lights and/or a light driver and/or ballast. In embodiments, an expansion sensor assembly or module 160 may comprise one or more LED lighting assemblies positioned around an outer surface of the expansion sensor assembly or module 160. In embodiments, one or more LED lighting assemblies 166 may drive one or more lights. In embodiments, a light driver may receive a signal from a controller or a processor in a modular umbrella system 100 to activate/deactivate LED lights. The LED lights may project light into an area surrounding a modular umbrella system 100. In embodiments, one or more lighting assemblies 166 may be recessed into an expansion or sensor module or assembly 160.

In embodiments, an arm expansion sensor housing or module 160 may also comprise a sensor housing 168. In embodiments, a sensor housing 168 may comprise one or more environmental sensors, one or more telemetry sensors, and/or a sensor housing cover. In embodiments, one or more environmental sensors may comprise one or more air quality sensors, one or more UV radiation sensors, one or more digital barometer sensors, one or more temperature sensors, one or more humidity sensors, one or more carbon monoxide sensors, one or more carbon dioxide sensors, one or more gas sensors, one or more radiation sensors, one or more interference sensors, one or more lightning sensors, one or more and/or one or more wind speed sensors. In embodiments, one or more telemetry sensors may comprise a GPS/GNSS sensor and/or one or more digital compass sensors. In embodiments, a sensor housing 168 may also comprise one or more accelerometers and/or one or more gyroscopes. In embodiments, a sensor housing 168 may comprise sensor printed circuit boards and/or a sensor cover (which may or may not be transparent). In embodiments, a sensor printed circuit board may communicate with one or more environmental sensors and/or one or more telemetry sensors (e.g., receive measurements and/or raw data), process the measurements and/or raw data and communicate sensor measurements and/or data to a motion control printed circuit board (e.g., controller) and/or a computing device (e.g., controller and/or processor). In embodiments, a sensor housing 168 may be detachably connected to an arm connection housing/spoke connection housing to allow for different combinations of sensors to be utilized for different umbrellas. In embodiments, a sensor cover of a sensor housing 168 may be clear and/or transparent to allow for sensors to be protected from an environment around a modular umbrella system. In embodiments, a sensor cover may be moved and/or opened to allow for sensors (e.g., air quality sensors to obtain more accurate measurements and/or readings). In embodiments, a sensor printed circuit board may comprise environmental sensors, telemetry sensors, accelerometers, gyroscopes, processors, memory, and/or controllers in order to allow a sensor printed circuit board to receive measurements and/or readings from sensors, process received sensor measurements and/or readings, analyze sensor measurements and/or readings and/or communicate sensor measurements and/or readings to processors and/or controllers in a core assembly or module 130 of a modular umbrella system 100.

In embodiments, a modular umbrella shading system 100 may comprise a lightning sensor. In embodiments, a lightning sensor may be installed on a base assembly 110. In embodiments, a lightning sensor may be installed on a core module or core assembly 130. In embodiments, a lightning sensor may be installed on a sensor and/or expansion assembly or module 160. In embodiments, a lightning sensor may be installed, attached, fastened and/or positioned on a shading fabric, an arm, and/or a blade of an intelligent shading system. In embodiments, a lightning sensor may be installed on and/or within a sensor housing 168. In embodiments, a lightning sensor may be installed on and/or connected, adhered or coupled to a skin of an intelligent umbrella and/or shading system. In embodiments, a lightning sensor may detect lightning conditions around an area or in a vicinity of an intelligent umbrella and/or shading system. In embodiments, a lightning sensor may detect an interference signal strength and/or pattern in an atmosphere that corresponds to either intra-cloud lightning conditions and/or occurrences, and/or to cloud-to-ground lightning conditions and/or occurrences. In embodiments, a lightning sensor may have tolerance conditions set. In embodiments, a lightning sensor may also able to measure and/or calculate a distance from a location with an intelligent shading system and/or intelligent umbrella to a location where a lightning event and/or condition has occurred. In embodiments, a lightning sensor may be an Austria Microsystems Franklin AS3935 digital lightning sensor. In embodiments, a lightning sensor may calculate signal measurements, signal strengths, other conditions (e.g., based at least on interference received with respect to lightning conditions) and/or distances, and may communicate signal measurements, signal strengths, other conditions and/or distances to a memory in an intelligent umbrella for storage. In embodiments, lightning sensor signal measurements, strengths, conditions and/or distances may be communicated to a computing device 136 where one or more processors may execute computer-readable instructions to 1) receive lightning sensor signal measurements, strength measurements, conditions and/or distances, 2) process such measurements and/or conditions; and 3) generate commands, instructions, messages and/or signals to cause actions by other components and/or assemblies in an intelligent umbrella and/or robotic shading system in response to measurements and/or conditions captured and/or received by a lightning sensor. In embodiments, computer-readable instructions fetched from one or more memory modules and executed by a processor of a computing device 136 may generate and communicate commands to a motion control board 134 to cause different motor assemblies to move assemblies (e.g., an upper portion of a core assembly and/or are support assemblies to extend arms) of an intelligent umbrella and/or shading system. In embodiments, because portions of an intelligent umbrella and/or shading system are metallic, computer-readable instructions executed by one or more processors may generate and communicate commands, messages, signals or instructions to cause an expansion and sensor assembly 160 to retract arms and/or spokes 164 to a rest or closed position and/or to turn off other sensors in a sensor housing to protect sensors from lightning strikes. In embodiments, because portions of an intelligent umbrella and/or shading system are metallic and conductive, computer-readable instructions executed by one or more processors may generate and communicate commands, messages, signals or instructions to cause an expansion and sensor assembly 160, a core assembly 130 and/or a base assembly to turn off or deactivate other components, motors, processors and/or sensors to prevent damage from electrical (voltage and/or current surges) in a sensor housing to protect sensors from lightning strikes. In embodiments, computer-readable instructions executed by a processor of a computing device 136 (or other processor/controller) may generate and communicate commands, messages, signals and/or instructions to a sound reproduction system (e.g., an audio receiver and/or speaker) to cause an alarm to be activated and/or a warning message to be reproduced and/or generate and communicate commands, messages, signals and/or instructions to a lighting system 166 to generate lights and/or rays indicating a dangerous situation is occurring or going to occur. In addition, because lightning strikes can damage electrical components, a lightning sensor's measurements, conditions and/or distances may be communicated to a processor and computer-readable instructions executed by one or more processors may generate and communicate commands to a power subsystem (e.g., a rechargeable battery and/or power charging assembly) to power off an intelligent umbrella and/or shading system 100 and/or to power off and/or deactivate components and/or assemblies susceptible to lightning strikes and large voltage and/or current surges associated therewith. Advantages of having a lightning sensor integrated within an intelligent umbrella and/or shading system 100 and/or attached, connected or coupled thereto, are that a lightning sensor may identify dangerous conditions, shut down portions of an intelligent umbrella and/or shading system and warn users of a potentially damaging and dangerous situation when a user or operator may not be aware such dangerous conditions are present.

In embodiments, a modular umbrella shading system 100 may comprise an interference sensor (e.g., a noise sensor and/or a wireless noise or interference sensor or scanner). In embodiments, such an interference sensor may identify sources and strengths of noise and/or interference in a vicinity of an intelligent umbrella and/or robotic shading system 100. For example, interference and/or noise may be radio frequency interference, electromagnetic interference, randomly generated noise, impulse noise, acoustic noise, thermal noise, etc. For example, noise and/or interference may be present in certain wireless communication spectrum bands. In embodiments, an interference sensor may be installed or located on a base assembly 110. In embodiments, an interference sensor may be installed or located on a core module or core assembly 130. In embodiments, an interference sensor may be installed or located on a sensor and/or expansion assembly or module 160. In embodiments, an interference sensor may be installed, position, attached, and/or connected to a shading fabric, an arm support assembly and/or an arm or blade of an intelligent umbrella. In embodiments, an interference sensor may be installed on and/or within a sensor housing 168. In embodiments, a lightning sensor may be installed on and/or connected, adhered or coupled to a skin of an intelligent umbrella and/or shading system. In embodiments, an interference sensor may detect noise and/or interference conditions around or in a vicinity of an intelligent umbrella and/or shading system. In embodiments, an interference sensor may detect and/or measure an interference signal strength (e.g., interference that may impact operations of wireless transceivers) and/or an interference type that corresponds to noise sources generating noise and interference in an environment or that is projected and/or communicated into an area around an intelligent umbrella and/or shading system. In embodiments, the noise and/or interference may be from natural sources (e.g., electromagnetic waves, sound waves, impulse waves), from mechanical devices, from acoustic devices, and/or other electronic devices (e.g., home security systems, other routers, wireless printers, wireless transmitters and/or receivers, and/or ICs). In embodiments, an interference sensor may have tolerance conditions established and may identify different type of noise and/or interference. In embodiments, an interference sensor may also able to measure and/or calculate a type of noise and/or interference, where a source may be located and how often the noise and/or interference may be detected and/or measured. In embodiments, an interference sensor may calculate signal measurements, signal strengths, and/or other conditions (e.g., is it repetitive and/or randomly occurring and is it based at least on other conditions associated with measured interference). In embodiments, an interference sensor may communicate signal measurements, signal strengths, other conditions and/or locations to a memory for storage. In embodiments, interference sensor signal measurements, strengths, conditions and/or distances may be communicated to a computing device 136 where one or more processors may execute computer-readable instructions to 1) receive interference sensor signal measurements, strength measurements, and/or conditions; and/or 2) process such measurements and/or conditions. In embodiments, one or more processors (e.g., in a computing device 136) in conjunction with computer-readable instructions executed by the one or more processors may generate commands, instructions, messages and/or signals to cause actions by other components and/or assemblies in response to measurements and/or conditions captured and/or received by an interference sensor. In embodiments, computer-readable instructions fetched from one or more memory modules and executed by a processor (e.g., of a computing device 136) may generate and communicate commands to a motion control board 134 (or other circuits or circuit assemblies) to cause different motor assemblies to move assemblies of an intelligent umbrella and/or shading system to different locations and/or positions. In embodiments, interference sensor measurements may identify that cellular communications may not be reliable in an area around an intelligent umbrella because of a high level of interference in a cellular communications frequency band and computer-readable instructions executable by one or more processors may communicate commands and/or signals to a cellular transceiver to deactivate a cellular transceiver 195. In embodiments, computer-readable instructions executable by a processor may also not communicate any commands, signals, instructions and/or messages to a cellular transceiver 195 until interference and/or noise conditions have improved. In embodiments, computer-readable instructions executed by a processor of a computing device 136 (or other processor/controller) may generate and communicate commands, messages, signals and/or instructions to a sound reproduction system (e.g., an audio receiver and/or speaker) to cause an alarm to be activated and/or a warning message to be reproduced and/or generate and communicate commands, messages, signals and/or instructions to a lighting system and/or sound communication system to generate lights and/or audible alerts indicating a dangerous or problematic situation is occurring or going to occur (e.g., high level of impulse noise or EMI). In addition, because high levels of different types of noise can impact performance of specific electrical components, an interference sensor's measurements, conditions and/or distances may be communicated to a processor and computer-readable instructions executed by one or more processors may generate and communicate commands to a power subsystem (e.g., a rechargeable battery and/or power charging assembly) to power to power off and/or deactivate components and/or assemblies susceptible to noise and/or interference. Advantages of having an interference sensor integrated within an intelligent umbrella and/or shading system 100 and/or attached, connected or coupled thereto, are that an interference sensor may identify problematic conditions, shut down portions of an intelligent umbrella and/or shading system in response thereto, and/or warn users of a potentially problematic and dangerous situation. In addition, an intelligent umbrella with an interference sensor may operate more efficiently by avoiding certain communication frequency bands having large levels of noise which could impact accuracy of wireless communications.

Figure 2A:
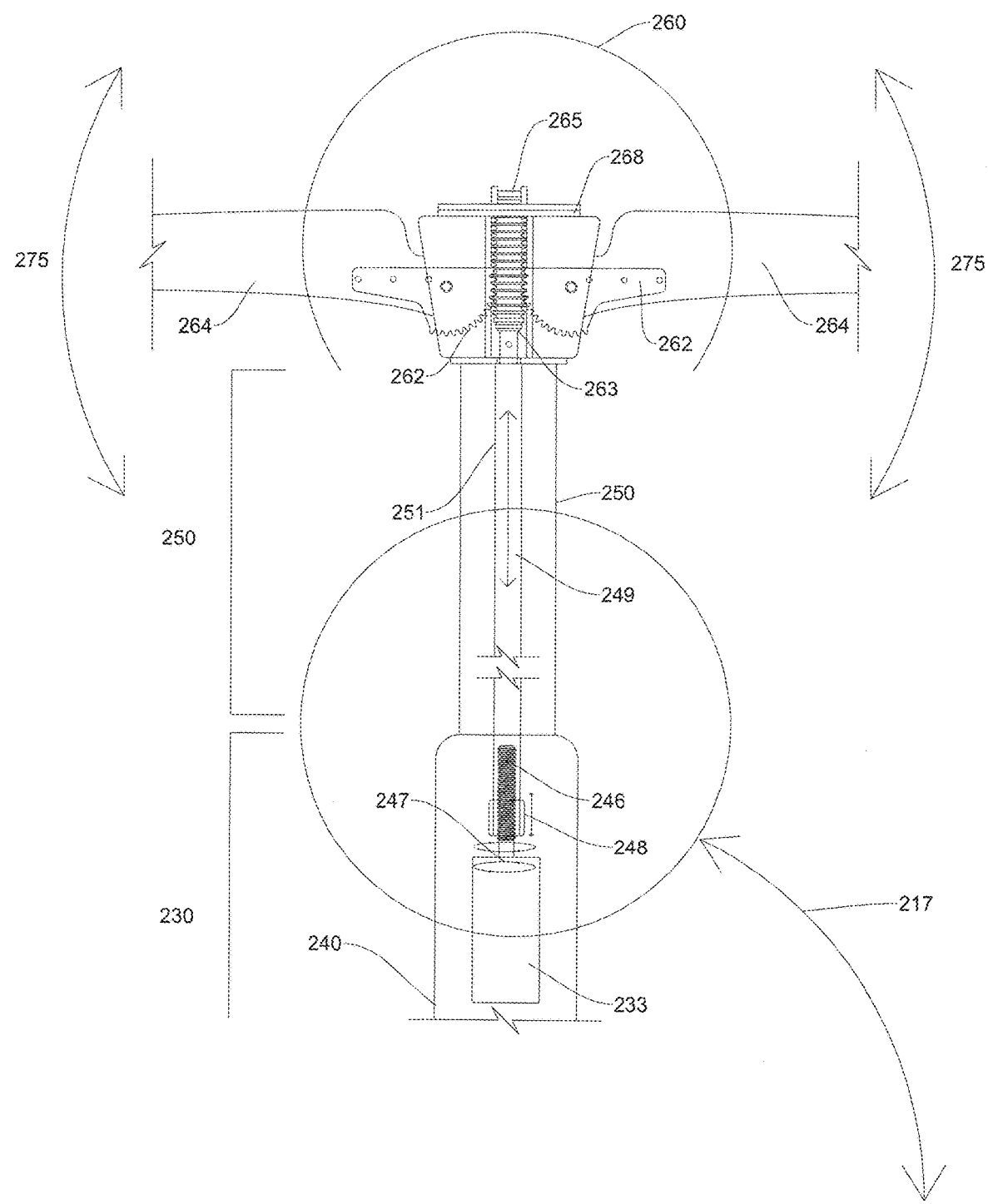
FIGS. 2A, 2B and 2C illustrate a cut-away drawing of mechanical assemblies in a modular umbrella system according to embodiments.
Figure 2B:
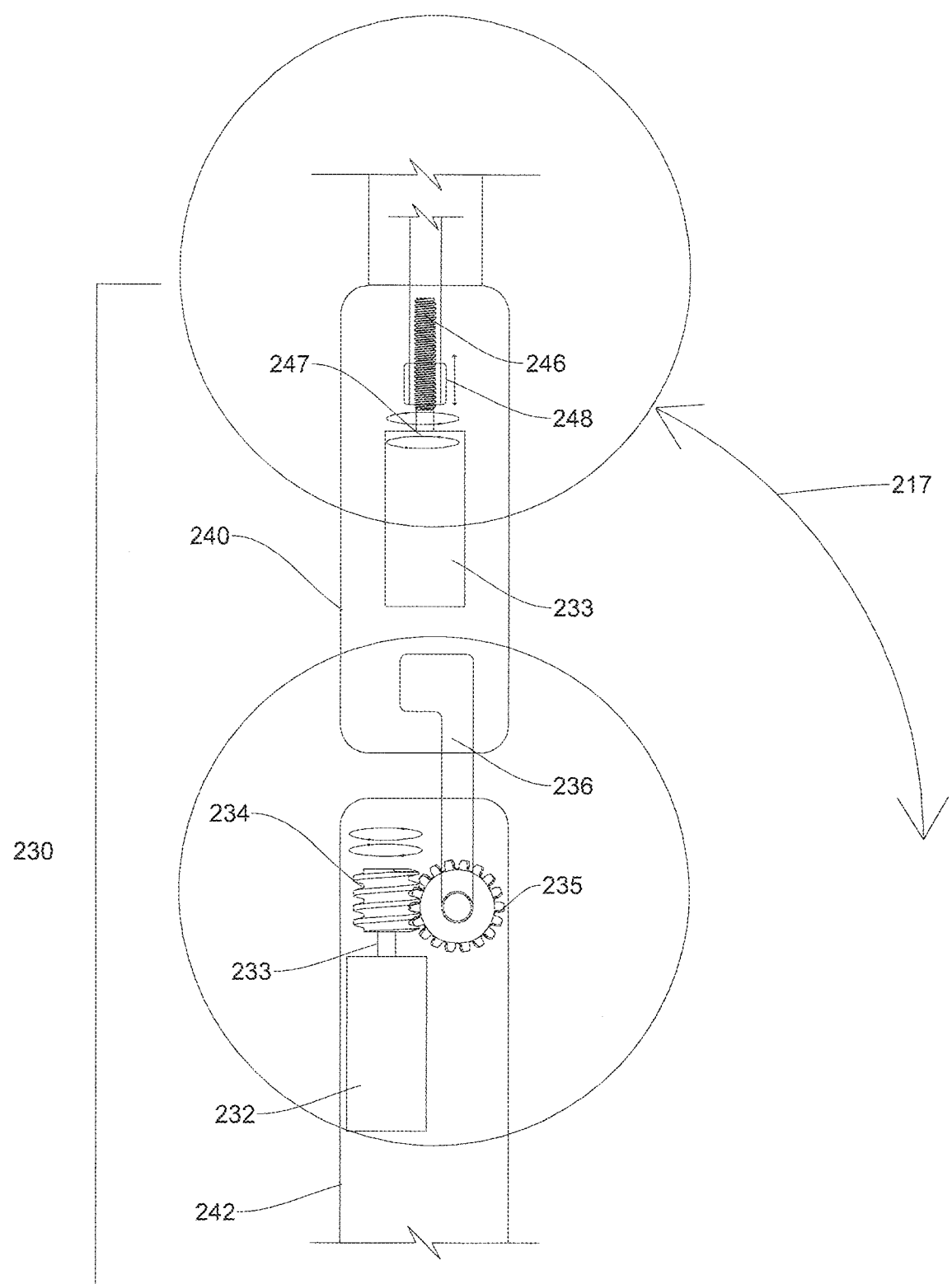
Figure 2C:
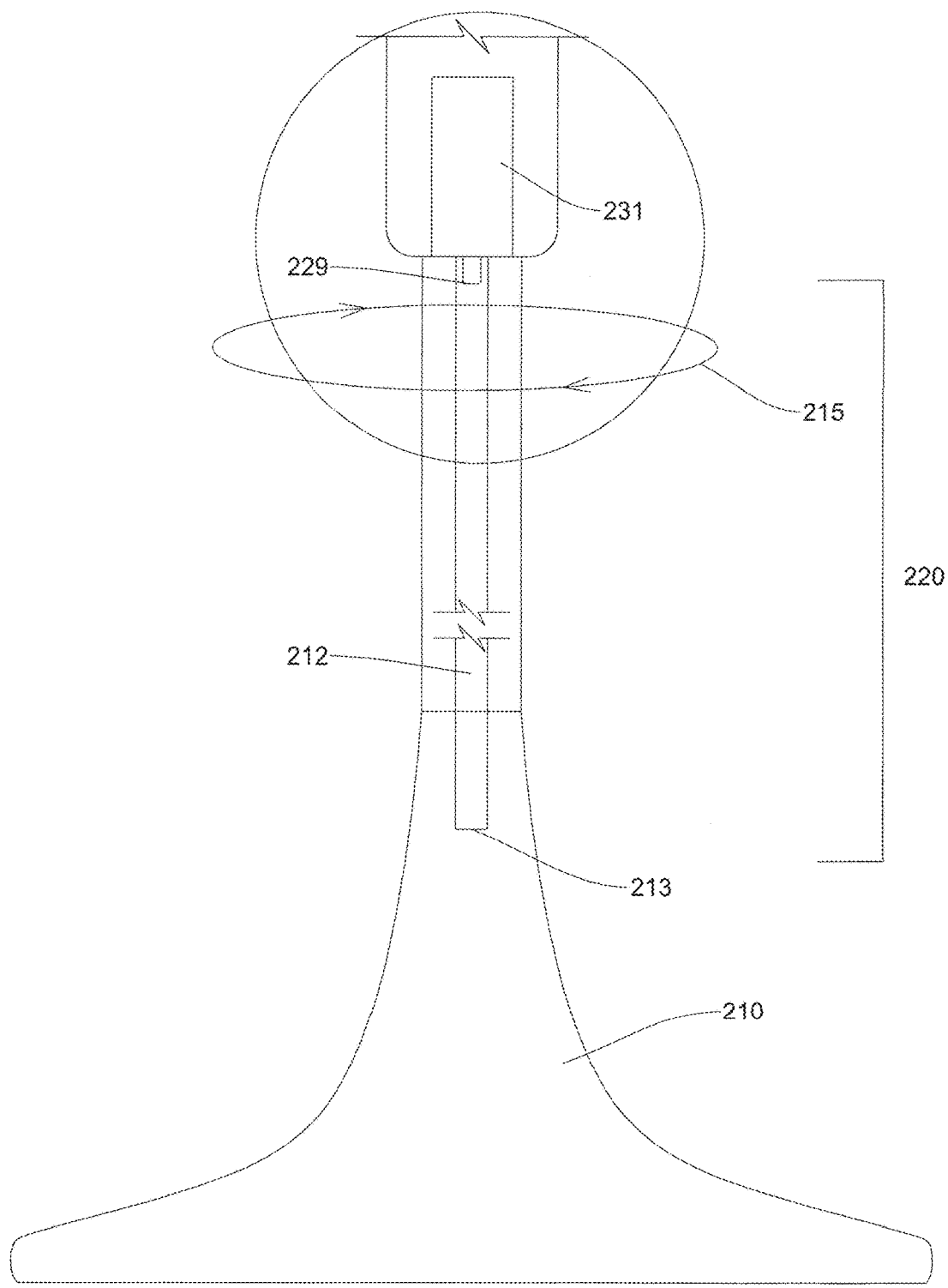

FIGS. 2A, 2B and 2C illustrate a cut-away drawing of mechanical assemblies in a modular umbrella system according to embodiments. In embodiments, a modular umbrella shading assembly 200 may comprise a base assembly 210, a first extension assembly 220, a core assembly or module 230, a base receptacle 213, a force transfer shaft 212, an azimuth motor 231, and/or an azimuth motor shaft 229. In embodiments, a first extension assembly 220 and a core assembly module 230 may rotate in a clockwise or counterclockwise manner direction (as illustrated by reference number 215) with respect to a base assembly 210. In embodiments, an azimuth motor 231 comprises an azimuth motor shaft 229 that may rotate in response to activation and/or utilization of an azimuth motor 231. In embodiments, an azimuth motor shaft 229 may be mechanically coupled (e.g., a gearing system, a friction-based system, etc.) to a force transfer shaft 212. In embodiments, an azimuth motor shaft 229 may rotate in a clockwise and/or counterclockwise direction and in response, a force transfer shaft 212 may rotate in a same and/or opposite direction. In embodiments, a force transfer shaft 212 may pass through a first extension assembly 220 and may be mechanically coupled to a base receptacle 213 in a base assembly 210. In response to, or due to, rotation of force transfer shaft 212 in a base receptacle 213, a first extension assembly 220 and/or a core assembly 230 may rotate with respect to the base assembly 210.

In embodiments, a modular umbrella system 200 may comprise a core assembly 230 which may comprise a lower core assembly 242 and an upper core assembly 240. In embodiments, a lower core assembly 242 may comprise an elevation motor 232, an elevation motor shaft 233, a worm gear 234, and/or a speed reducing gear 235. In embodiments, a speed reducing gear 235 may be connected with a connector to a connection plate 236. In embodiments, a lower core assembly 242 may be mechanically coupled to an upper core assembly 240 via a connection plate 236. In embodiments, a connection plate 236 may be connected to an upper core assembly 240 via a connector and/or fastener. In embodiments, an elevation motor 232 may cause rotation (e.g., clockwise or counterclockwise) of an elevation motor shaft 233, which may be mechanically coupled to a worm gear 234. In embodiments, rotation of an elevation motor shaft 233 may cause rotation (e.g., clockwise or counterclockwise) of a worm gear 234. In embodiments, a worm gear 234 may be mechanically coupled to a speed reducing gear 235. In embodiments, rotation of a worm gear 234 may cause rotation of a speed reducing gear 235 via engagement of channels of a worm gear 234 with teeth of a speed reducing gear 235. In embodiments, a sped reducing gear 235 may be mechanically coupled to a connection plate 236 to an upper core assembly 240 via a fastener or connector. In embodiments, rotation of a speed reducing gear 235 may cause a connection plate 236 (and/or an upper core assembly 240) to rotate with respect to a lower core assembly 242 in a clockwise or counterclockwise direction as is illustrated by reference number 217. In embodiments, an upper core assembly 240 may rotate with respect to the lower core assembly 242 approximately 90 degrees via movement of the connection plate. In embodiments, an upper core assembly 240 may rotate approximately 0 to 30 degrees with respect to the lower core assembly 242 via movement of the connection plate.

In embodiments, an upper core assembly 240 may comprise an extension expansion motor 233 and an extension expansion motor shaft 247. In embodiments, an expansion motor 233 may be activated and may rotate an extension expansion motor shaft 247. In embodiments, an expansion motor shaft 247 may be mechanically coupled to a threaded rod 246 which may be mechanically couple to a travel nut 248 (e.g., a nut may be screwed onto the threaded rod 246). In embodiments, an expansion motor shaft 247 may rotate a threaded rod 246 which may cause a travel nut 248 to move in a vertical direction (e.g., up or down). In embodiments, a travel nut 248 may be mechanically coupled to a connection rod 249. In embodiments, a travel nut 248 may move in vertical direction (e.g., up or down) which may cause a connection rod 249 to move in a vertical direction (e.g., up or down) as is illustrated by reference number 251. In embodiments, a connection rod 249 may be partially positioned and/or located within an upper core assembly 240 and may be partially positioned within a second extension assembly 250. In embodiments, a connection rod 249 and/or a second extension assembly 250 may have varying lengths based on a desired height of a modular umbrella system 200. In embodiments, a connection rod 249 may be mechanically coupled to an expansion assembly shaft 263.

In embodiments, an arm expansion sensor housing or module 260 may comprise an expansion assembly shaft 263, a rack gear 265, one or more spoke/arm expansion assemblies 262, and a sensor module 268. In embodiments, an expansion assembly shaft or hollow tube 263 may be mechanically coupled to a rack gear 265. In embodiments, movement of an expansion shaft or hollow tube 263 up or down in a vertical direction may move a rack gear 265 in a vertical direction (e.g., up or down). In embodiments, one or more spoke expansion assemblies 262 may be mechanically coupled to a rack gear 265. In embodiments, gears on one or more spoke/arm expansion assemblies 262 may engage channels in a rack gear 265. In embodiments, a rack gear 265 may move in a vertical direction (e.g., up or down) which may cause movement of one or more spoke/arm expansion assemblies 262 from an open position (as is illustrated in FIGS. 2A, 2B and 2C) to a closed position (or vice versa from a closed position to an open position). In embodiments, movement of one or more spoke/arm expansion assemblies 262 is illustrated by reference number 275 in FIGS. 2A, 2B and 2C. In embodiments, spokes/arms 264 may be mechanically coupled to spoke expansion assemblies 262. In embodiments, one or more spokes/arms 264 may be detachable from one or more spoke/arm expansion assemblies 262.

Prior art shading systems utilizing at the most one motor to move a shade into a desired position. Shading systems do not utilize more than one motor and this limits movement of a shade system to track the sun and provide protection to users of a shading system. Accordingly, utilizing of two or more motors in a shading system allow movement of a shading element (or multiple shading elements) to track the sun, to protect a user from other weather elements and/or to capture a large amount of solar energy. These are improvements other shading systems which cannot move and/or rotate about more than one axis. Although, FIGS. 1A, 1B, 1C, 2A, 2B, and 2C describe a shading system with three motors, additional motors may be utilized to, for example, rotate a shading system (utilizing a motor in a base system next to a surface), additional motors to deploy additional accessories within a shading system core assembly module (e.g., lighting assemblies, wind turbines, camera mounts), or additional motors to deploy accessories within an expansion and sensor assembly module (e.g., deploy sensors, deploy solar panels, move speakers to different positions or orientations and/or move lighting assemblies to different positions and/or orientations).

Figure 3:
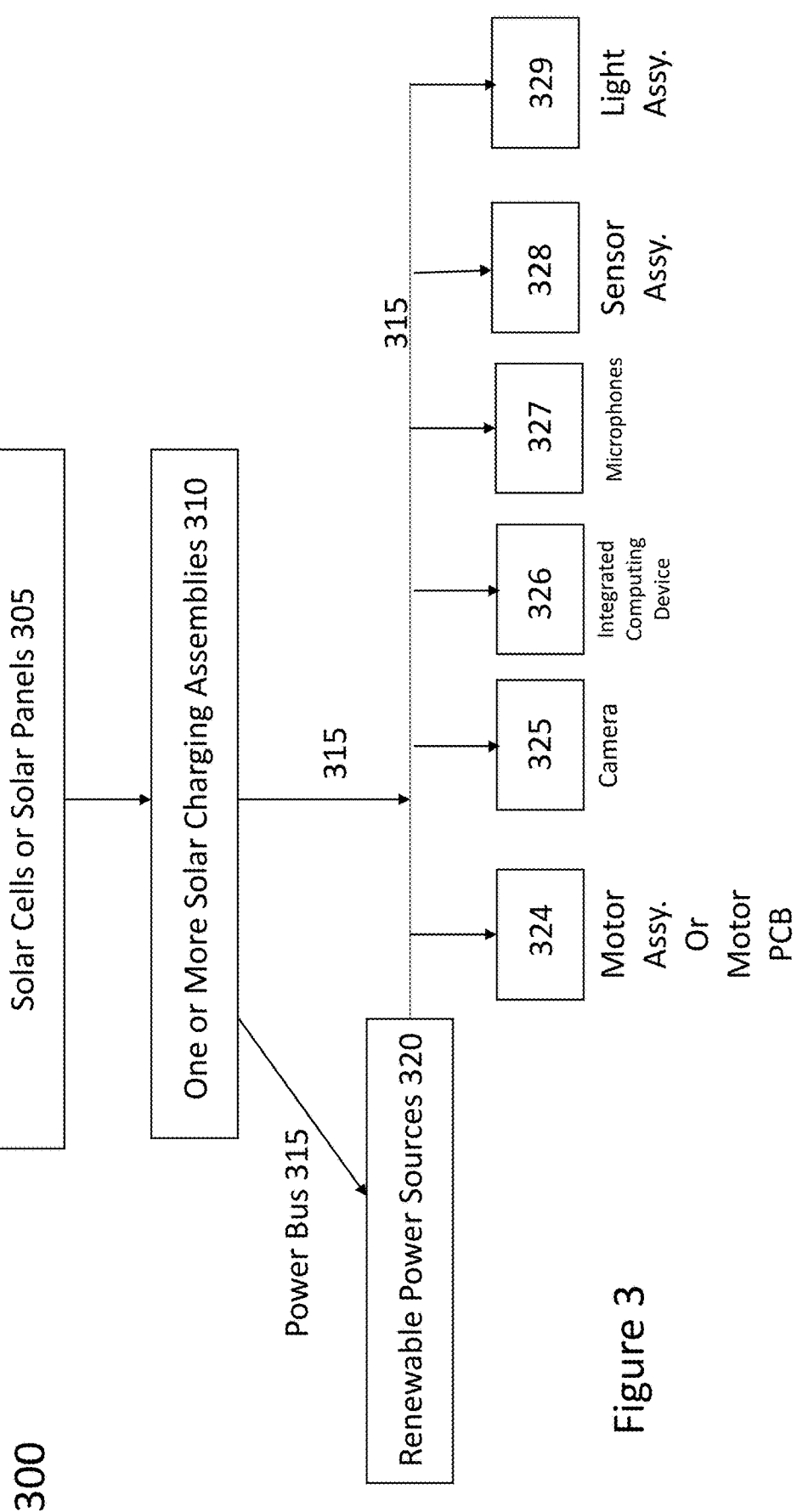
FIG. 3 illustrates a block diagram power subsystem of a parasol, umbrella or shading system according to embodiments.

FIG. 3 illustrates a block diagram power subsystem of a parasol, umbrella or shading system according to embodiments. In embodiments, a power subsystem 300 comprises one or more solar cells or solar cell panels 305, one or more solar charging assemblies 310, one or more power buses 315, one or more rechargeable batteries 320, and one or more electrical or electro-mechanical assemblies 324 325 326 327 328 and 329. In embodiments, one or more solar cells or solar cell panels 305 may generate electrical energy or electrical power from a light source (e.g., the sun). In embodiments, one or more solar cells or solar cell panels 305 may transfer power or electrical energy to one or more solar charging assemblies 310. In embodiments, one or more solar charging assemblies 310 may be solar charge controllers. In embodiments, one or more solar charging assemblies 310 may comprise computer interfaces that monitor and control power output from one or more solar cells or solar cell panels. In embodiments, indicators may monitor, control and/or display output power (e.g., one or more LED lighting assemblies may show that power is being supplied and that some power is being output via a solar charging assembly). In embodiments, one or more solar charging assemblies 310 may also display voltage and/or current being supplied from one or more solar panels or solar cell panels and/or may also display voltage and/or current being output by one or more solar charging assemblies 310 as well as displaying how much current is being pulled from a load terminal (and thus supplied to a rechargeable power source, components and/or assemblies).

In embodiments, one or more solar charging assemblies 310 may supply power to one or more rechargeable power sources (e.g., rechargeable batteries) 320. In embodiments, one or more solar charging assemblies 310 may supply power (e.g., voltage and/or current) to a power bus and/or power cables 315. In embodiments, the power supplied to a power bus and/or power cables 315 from one or more solar charging assemblies 310 may be at an approximate level of 12 volts (or between 11 to 17 volts). In embodiments, one or more solar charging assemblies 310 may provide power to a rechargeable power source 320 at a level between 11 and 17 volts (or at approximately 12 volts). In embodiments, a power bus and/or power cables 315 may supply power (e.g., voltage and/or current) to one or more components, assemblies or apparatuses (e.g., one or more electrical or electromechanical assemblies 324 325 326 327 328 and 329). For example, component 324 may be a motor control printed circuit board; reference number 325 may be a camera; reference number 326 may be an integrated computing device 326; reference number 327 may be one or more microphones; reference number 328 may be one or more sensor assemblies or sensors; and reference number 329 may be one or more lighting assemblies. In embodiments, components such as a motor control PCB 324, one or more cameras 325, one or more integrated computing devices 326, one or microphones 327, one or more sensors or sensor assemblies 328, and one or more lighting assemblies 329 may not utilize 12 volts and if not then these components and/or assemblies include a voltage regulate to provide a lower voltage, such as 3.3 Volts and/or 5 volts. In embodiments, one or more renewable power sources (e.g., rechargeable batteries) 320 may be placed in a battery housing. In embodiments, one or more battery housings may be placed around a center core assembly.

Figure 4A:
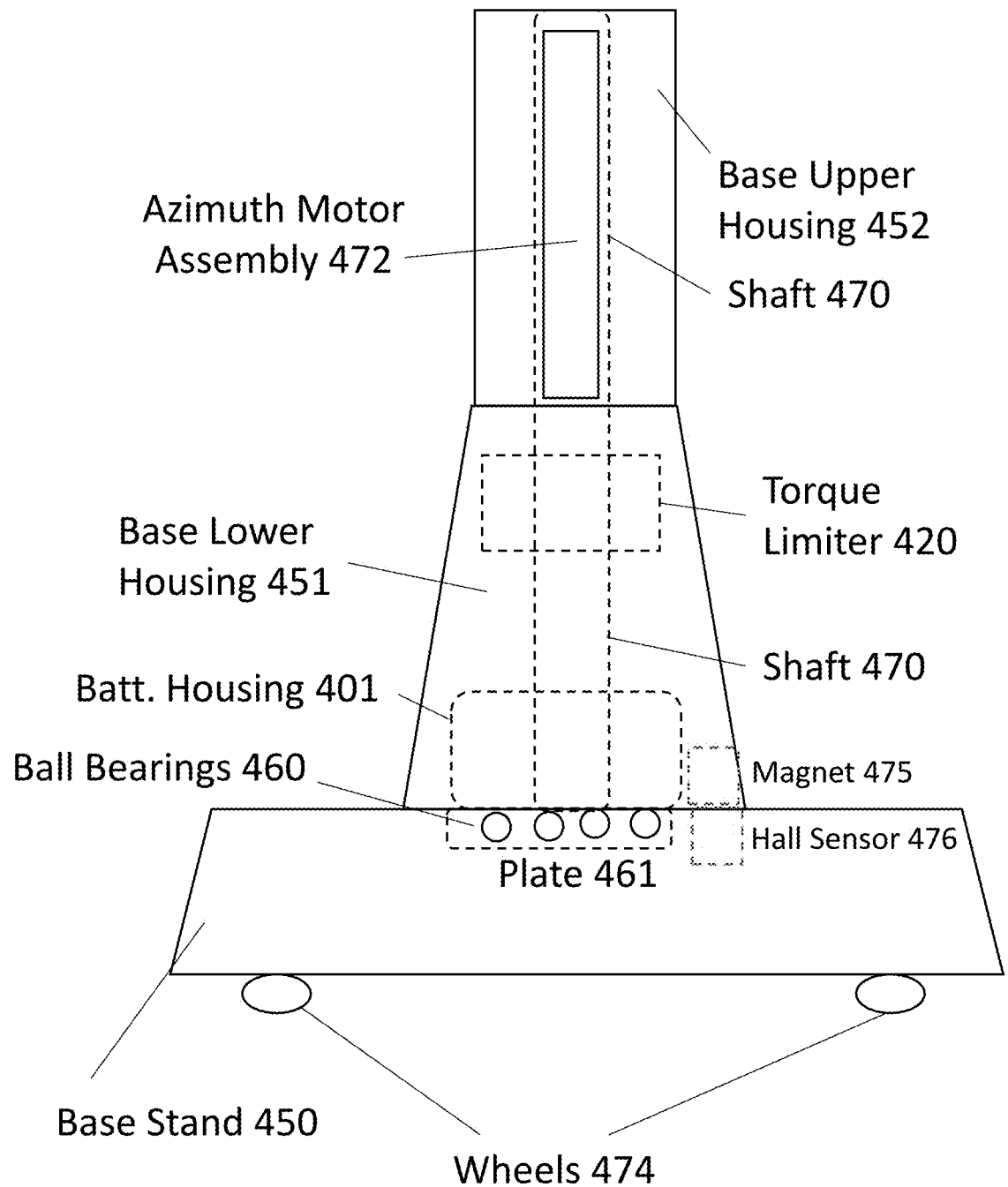
FIG. 4A illustrates a base assembly including a base stand, a base lower housing and base housing according to embodiments.

FIG. 4A illustrates a base assembly including a base stand, a base lower housing and base housing according to embodiments. In embodiments, a base assembly may comprise a base stand 450, a base lower housing 451 and a base upper housing 452. In embodiments, a base assembly may be movable. In embodiments, a base stand 450 may comprise one or more wheel assemblies 474, which allow a base stand 450 (and thus the base assembly and umbrella, parasol or shading system) to be able to move. In embodiments, a base stand may comprise one or more plates 461 and one or more ball bearings 460. In embodiments, one or more ball bearings may be inserted into grooves or channels or one or more plates 461. In embodiments, one or more plates 461 may be circular and/or may comprise one or more concentric circles. In embodiments, a base stand 450 may comprise a hall sensor 476 or magnetic detection sensor (although in other embodiments, a base stand 450 may comprise a magnetic or magnetic assembly 475). In embodiments, a base lower housing 451 may comprise a battery housing 401 or power source housing 401. In embodiments, a shaft 470 may run through a base lower housing 451 and a base upper housing 452. In embodiments, a base lower housing may comprise a torque limiter 420, which is connected and/or coupled to a shaft assembly 470. In embodiments, a torque limiter 420 may keep an umbrella and/or shading system from having base assemblies and/or core assemblies broken or malfunctioning during excessive twisting and/or torque from rotation, pulling or pushing of a core assembly (and/or remainder of umbrella, parasol). In embodiments, excessive torque conditions may be caused by motor malfunctioning or an individual grabbing a core assembly and trying to manually move or rotate a core assembly. In embodiments, if a normal amount of torque is placed on a base assembly, then a torque limiter 420 is not engaged and rotation is limited. If an excessive amount of torque is present, then a torque limiter 420 is engaged and a motor assembly is stopped or reduced. In embodiments, a torque limiter may be a clutch or clutch assembly.

In embodiments, a base upper housing 452 may comprise an amizuth motor assembly 472, which may operate in a similar fashion to the azimuth motor assembly 472 described in FIG. 1A, 1B, or 1C. In embodiments, an azimuth motor assembly 472 may be located in a shaft or tube and may cause a base lower housing 451 and base upper housing 452 (and remainder of an umbrella, parasol or shading system) to rotate in an azimuth direction around a base stand 450. In embodiments, ball bearings 460 in plate 461 allow for smooth rotation of a base lower housing 451 and base upper housing 452 with respect to a base stand. In embodiments, a bottom party or floor of a battery housing 401 may be connected or coupled or touch a plate 461 and/or one or more ball bearings 460. In embodiments, a lower base housing 451 may comprise a magnet or magnetic assembly 475 (although in other embodiments, the lower base housing 451 may comprise a magnetic field sensor of hall sensor 476). In embodiments, a magnet or magnetic assembly 475 and a hall sensor 476 may be utilized to verify that an umbrella's, parasol's or shading system's umbrella knows an orientation of a base stand 450 with respect to the rest of the umbrella, parasol or shading system. If the remainder of the umbrella is not aligned (including the base lower housing) with the base stand 450, then the umbrella, parasol or shading system may not know an orientation (e.g., what direction an umbrella is facing). This impacts many calculations made by the umbrella during initiation or configuration of the umbrella and throws off the sun tracking features of the umbrella, parasol or shading system. Accordingly, the hall sensor 476 is verifying that a magnet 475 is aligned with it and in a position that is known and therefore that the orientation of the umbrella or parasol is known.

Figure 4B:
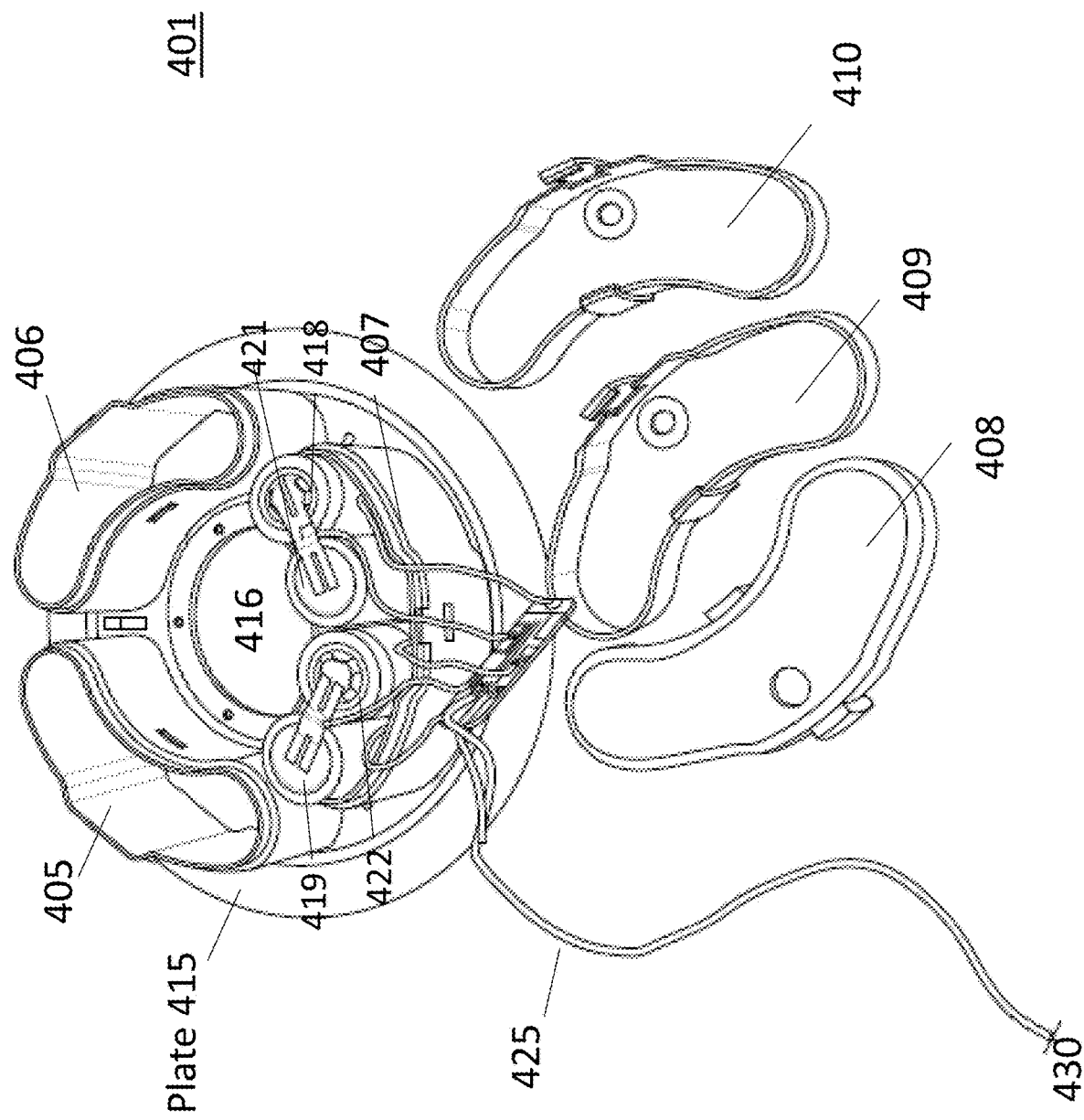
FIG. 4B illustrates a rechargeable power source housing according to embodiments.
Figure 4C:
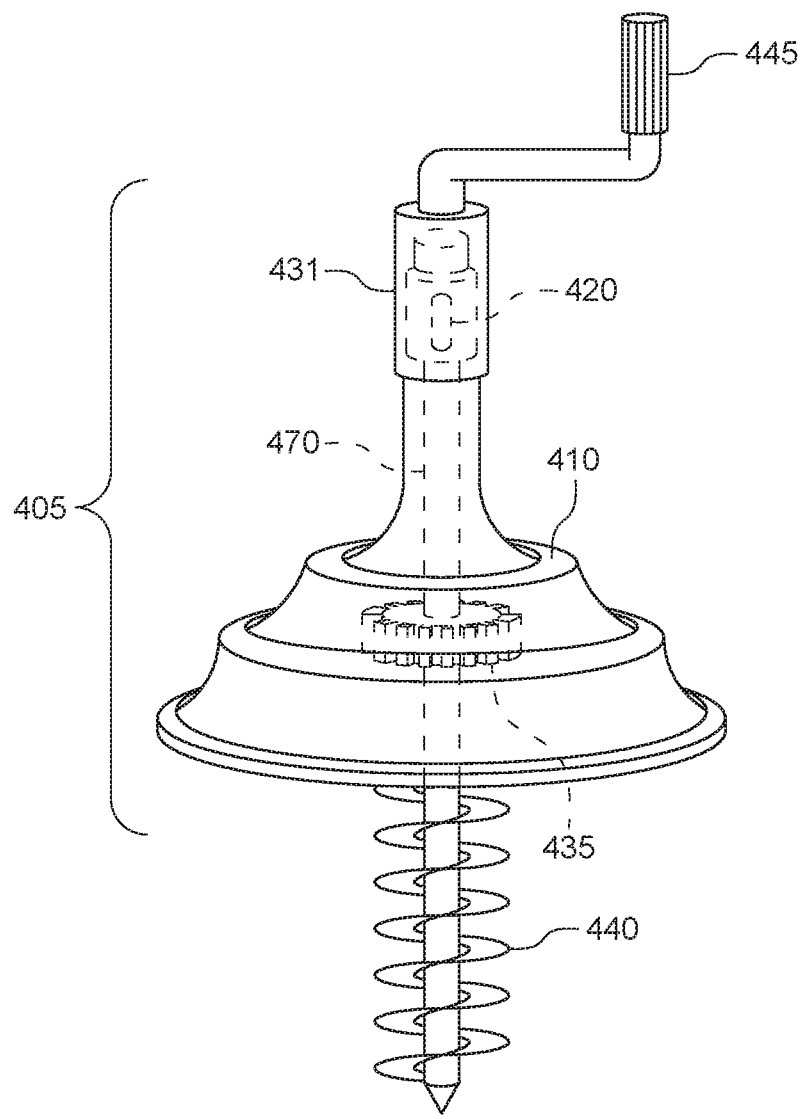
FIG. 4C illustrates a torque limiter and auger in a base assembly according to embodiments.

FIG. 4B illustrates a rechargeable power source housing according to embodiments. In embodiments, a rechargeable power source housing 401 may comprise one or more power source holders (e.g., battery holders) 405 406 407, one or more power source tops 408 409 410, a circular plate 415, one or more rechargeable power sources 418 419 422 421 and wiring 425 coupled to one or more power buses 430. In embodiments, each of the one or more power source holders 405 406 407 may hold one or more rechargeable power sources 418 419 422 421 (four may be shown in FIG. 4B), but any number of rechargeable batteries may be utilized. In embodiments, one or more rechargeable power sources 418 419 422 421 may be connected to wiring 425 which in turn may be coupled or connected to one or more power buses to provide + or −12 volts. In embodiments, one or more power source tops 408 409 410 may be connected to one or more corresponding power source holders 405 406 407 via a snap fit connector and/or tabs. In embodiments, a circular plate 415 may be adhered or connected to the one or more power source holders 405 406 407. In embodiments, a circular plate 415 and/or power source holders 405 406 407 may be an integrated piece and may be manufactured using additive manufacturing or 3D printing techniques. In embodiments, a circular plate 415 may have a hole 416 in a middle in order to let a tubular assembly (e.g., a shaft 470) to pass through a middle and be able to construct the remainder of the umbrella. In embodiments, a circular plate 415 may be connected, adhered or fastened to either a base assembly or a core assembly module. In embodiments, a rechargeable power source housing 401 may be located in a bottom base housing, although it may be located in any portion of a core assembly module (and potentially base assembly). In embodiments, a rechargeable power source housing 401 may be located in a section of a base assembly FIG. 4C illustrates a base assembly include a torque limiter and auger assembly according to embodiments. In embodiments, a base assembly 405 may comprise a base housing 410, one or more shafts 470, one or more torque limiters 420, one or more connecting assemblies 431, one or more gearing assemblies 435 and/or one or more augers 440. In embodiments, one or more base assemblies 405 may be detachable from a core assembly in order to allow for different assemblies to dig into or burrow into a loose surfaces such as turf, sand, grass, gravel or mud. In embodiments, FIG. 4C illustrates an auger to burrow into and/or connect to a grass or dirt surface; however different connection assemblies or driving assemblies may be utilized to drill into and/or burrow into the different surfaces. In embodiments, a base assembly 405 may be detached from a core assembly. In embodiments, a handle 445 and a connection assembly 431 may be attached and/or connected to the base assembly 405. In embodiments, a connection assembly 431 may be circular in shape and may fit within a channel of a base assembly 405 in order to make a fitted connection. In embodiments, friction and/or magnets may allow for better connection between connection assembly 431 and a base assembly 405. In embodiments, a handle 445 may be permanently attached to a connection assembly 431 via an adhesive, a connector, a magnetic connector and a screw. In embodiments, a handle 445 may be detachably attached to a connection assembly 431. In embodiments, a handle 445 may be rotated which may cause a shaft or shaft assembly 470 to rotate. In embodiments, a handle 445 may be connected directly to a shaft or shaft assembly 470 or there may be a gearing assembly or gears placed between the handle 445 and/or shaft or shaft assembly 470. In embodiments, a shaft or shaft assembly 470 may be connected and/or couple to one or more gearing assemblies 435. In embodiments, one or more gearing assemblies 435 may be coupled or connected to an auger or auger assembly 440. In embodiments, rotation of a shaft or shaft assembly 470 may cause rotation of the one or more gearing assemblies 435, which in turn may cause rotation of the auger or auger assembly 440. Rotation of the auger and/or auger assembly 440 causes the auger and/or auger assembly to burrow or drill into the ground surface. In embodiments, this means that the base assembly 405 may be connected into the ground surface. Then, the base assembly 405 may be attached to the core assembly and the shading system or umbrella may be provided more stability in loose ground surfaces such as sand, loose dirt, ground, and/or gravel.

In embodiments, a base assembly 405 may comprise a torque limiter 420. In embodiments, a torque limiter 420 may keep an umbrella and/or shading system from having base assemblies and/or core assemblies broken or malfunctioning during excessive twisting and/or torque from rotation of a core assembly (and remainder of umbrella). In embodiments, excessive torque conditions may be caused by motor malfunctioning or an individual grabbing a core assembly and trying to manually move or rotate a core assembly. In embodiments, if a normal amount of torque is placed on a base assembly, then a torque limiter 420 is not engaged and rotation is limited. If an excessive amount of torque is present, then a torque limiter 420 is engaged and a motor assembly is stopped or reduced.

Figure 5A:
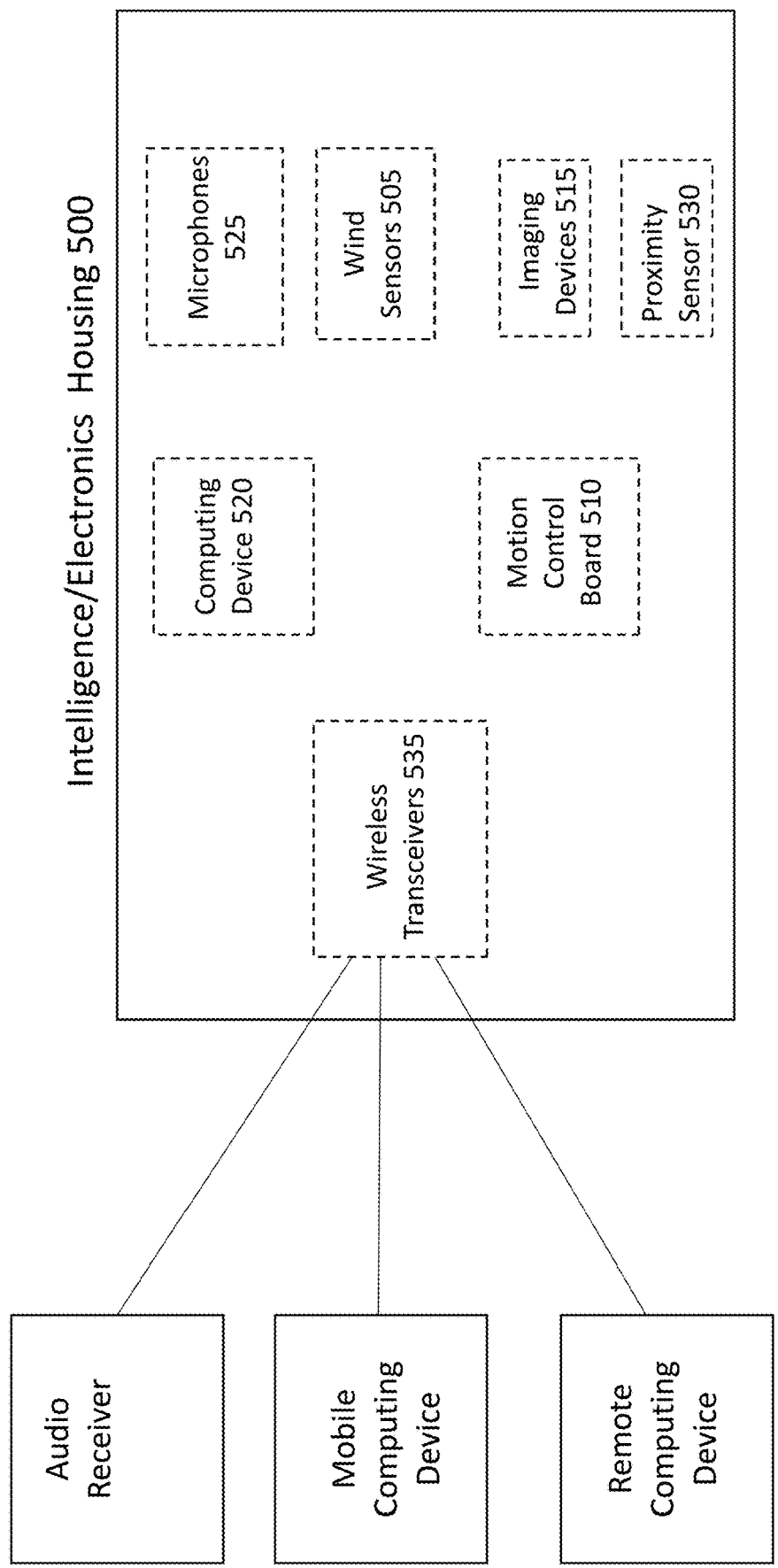
FIG. 5A illustrates a block diagram of an intelligence housing according to embodiments.

In embodiments, an umbrella, parasol and/or shading system may comprise an intelligence housing (e.g., a brain box) to control a number of functions and/or features of the umbrella, parasol or shading system. FIG. 5A illustrates a block diagram of an intelligence housing according to embodiments. In embodiments, an intelligence housing 500 may be manufactured utilizing additive manufacturing techniques (e.g., 3D printing) and may be comprised of plastic, composite materials or a combination thereof. In embodiments, an intelligent housing 500 may comprise one or more wind sensor assemblies 505, one or more motor control assemblies or motion control board 510, one or more imaging devices 515, one or more integrated computing devices (e.g., Raspberry Pi) 520, one or more microphones or line arrays 525 and one or more proximity sensors 530. In embodiments, an intelligence housing 500 may comprise one or more wireless communication transceivers 535. In embodiments, wireless communication transceivers 535 in an intelligence housing may communicate with a remote computing device (e.g., a server or a cloud-based server), a mobile computing device and/or an audio receiver.

Figure 5B:
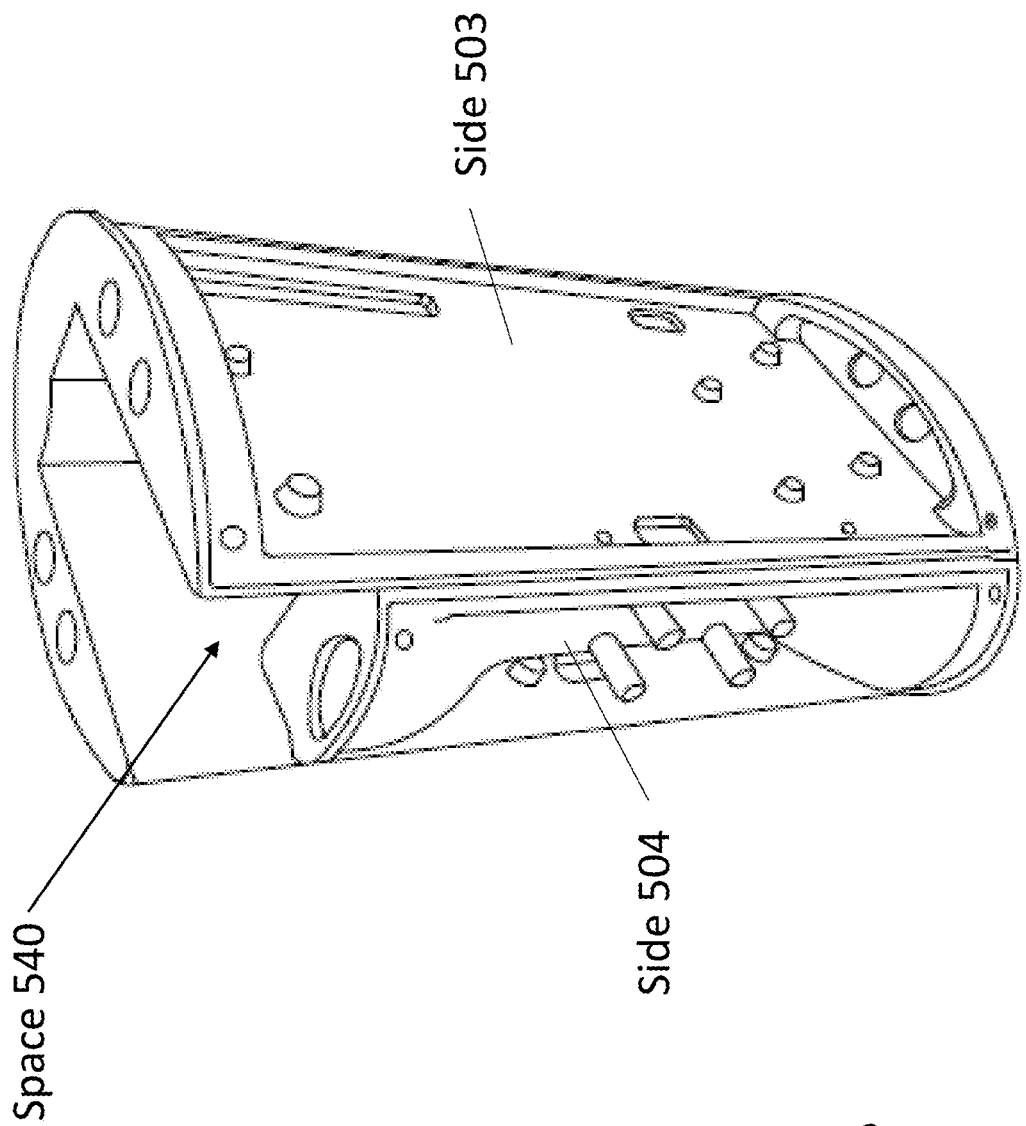
FIG. 5B illustrates a perspective view of an intelligence housing with one side removed according to embodiments.
Figure 5C:
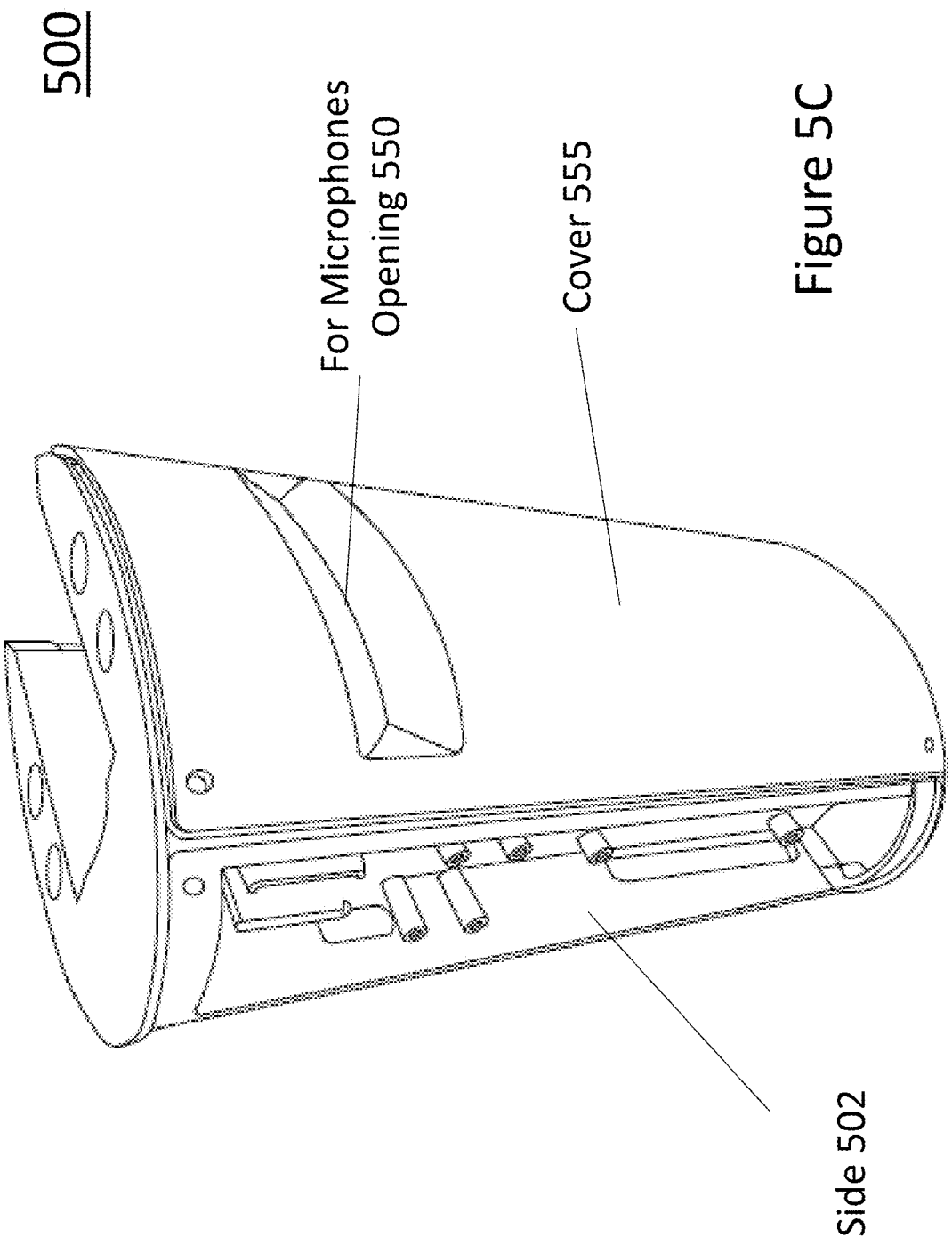
FIG. 5C illustrates a perspective view of an intelligence housing with covers attached according to embodiments.

FIG. 5B illustrates a perspective view of an intelligence housing with one side cover removed according to embodiments. FIG. 5C illustrates a perspective view of an intelligence housing with covers installed according to embodiments. In embodiments, an intelligence housing 500 may have four sides. In embodiments, one or more sides may have different thicknesses and/or may have a different shape (e.g., may be a rectangle having a specified thickness or may have different channels be formed therein). In embodiments, adjacent sides of the one or more sides of the intelligence housing may be connected to each other at approximately right angles (e.g., approximately 90 degrees) or from 70 degrees to 110 degrees with respect to each other. In embodiments, a space 540 may be formed or be present in an intelligence housing 500 (e.g., in a middle of an intelligence or electronics housing to allow for passage of a shaft and/or tubular assemblies of the umbrella, parasol or shading housing). In embodiments, a space 540 may be utilized to provide air cooling for printed circuit boards or other components of an intelligence housing by utilizing air movement through the space 540. In embodiments, one or more components, printed circuit boards or sensors (505, 510, 515, 520, 525 or 530—see FIG. 5A) may be mounted or installed on outside surfaces of one or more sides of the intelligence housing 500. FIG. 5B illustrates side 504 and side 503. Alternatively, some components or assemblies may be mounted on an inside surface of an intelligence housing 500. In embodiments, although a specific configuration may be shown in the drawings and discussed in specification below, one or more components and/or assemblies or devices may be installed on a different surfaces and/or sides of an intelligence housing 500. Placement of components, assemblies and/or devices may depend on space availability on sides of an intelligence housing 500, interference considerations (e.g., noise interference and/or spectrum interference), heat considerations and/or power requirement considerations. In embodiments, a first side of an intelligence housing 500 may comprise one or more wind sensor assemblies 505 and one or more proximity sensors 530 being mounted or installed thereon. In embodiments, a second side of an intelligence housing 500 may comprise one or more microphone arrays 525 and/or one or more motor control assemblies or motor control printed circuit boards 510. In embodiments, a third side of an intelligence housing 500 may comprise a single board computer 520 (e.g., Raspberry Pi—or an integrated computing device) comprising one or more memory devices, one or more processors, and computer-readable/executable instructions stored in the one or more memory devices). In embodiments, a third side of an intelligence housing 500 may further comprise one or more wireless communication transceivers 535. In embodiments, one or more wireless communication transceivers 535 may be installed on a printed circuit board which is installed on a third surface (or alternatively may be integrated into a chip or integrated circuit which is installed on a third surface of intelligence housing 500). In embodiments, a fourth side of an intelligence housing 500 may comprise one or more microphone arrays 525. In embodiments, a fourth side of an intelligence housing 500 may comprise one or more imaging devices 515 to capture video of an area surrounding an umbrella, parasol or shading system. In embodiments, one or more imaging devices 515 may be integrated into a chip or integrated circuit or alternatively, may be mounted onto a printed circuit board. In embodiments, the different one or more microphone arrays 515 may need to be installed on opposite sides of an intelligence housing 500 in order to have close to 360 degree coverage for picking up sounds and/or voice commands from a user and/or operator. FIG. 5C illustrates a cover 555 attached or connected to a side of an intelligence housing 500. In embodiments, cover 555 includes an opening for to allow for sound waves to reach one or more microphones or microphone arrays. FIG. 5C also illustrates another side 502 of an intelligence housing.

Figure 5D:
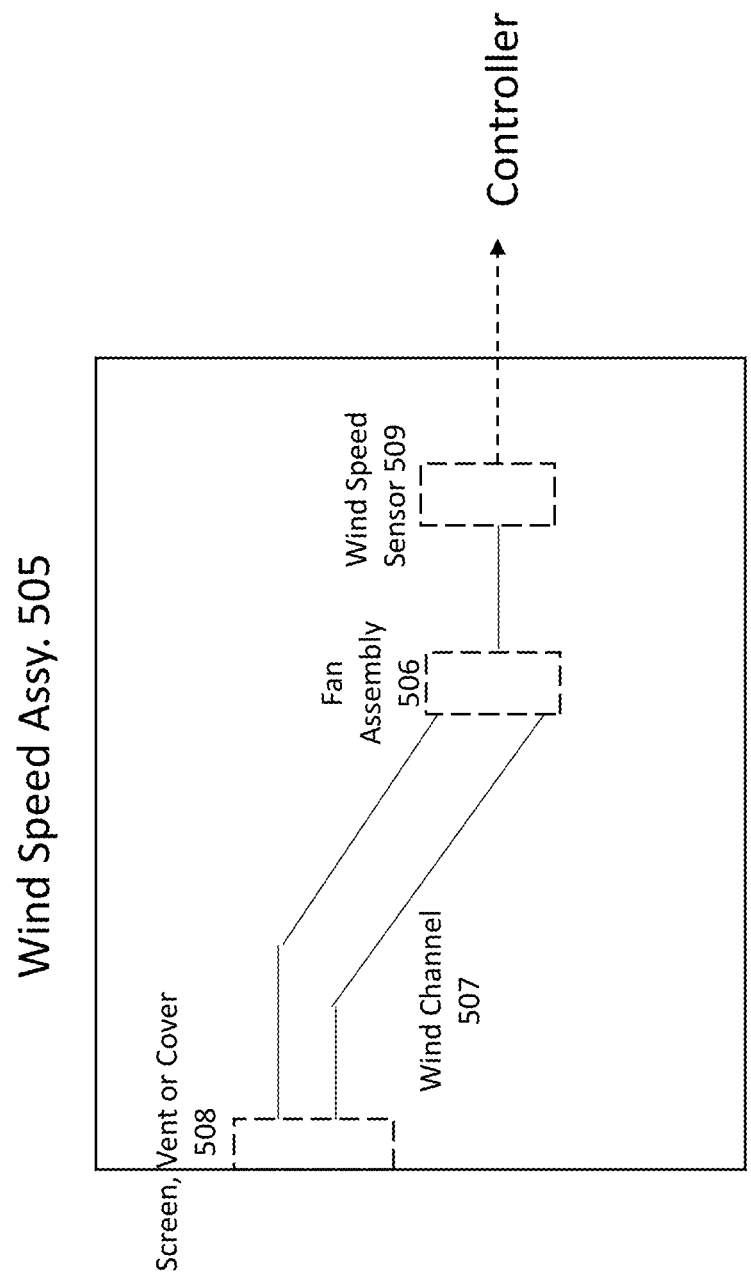
FIG. 5D illustrates a wind sensor assembly according to embodiments.

FIG. 5D illustrates a wind sensor assembly according to embodiments. In embodiments, an intelligence housing 500 may comprise a wind sensor assemblies 505. In embodiments, one or more wind sensor assemblies 505 may comprise one or more fan assemblies 506, one or more wind channels 507, one or more vents or screens 508 and/or one or more wind speed sensors 509. In embodiments, one or more vents or screens 508 may be placed over an opening on an intelligence housing 500. In embodiments, an opening may comprise a top portion of one or more wind channels 507. In embodiments, one or more covers, vents and/or screens 505 may prevent small or large objects from entering a wind channel 507 and damaging a wind sensor 509. In embodiments, wind entering wind channel may cause one or more fan assemblies 506 to turn or rotate in proportion to a wind speed. In embodiments, one or more fan assemblies 506 may be connected or coupled to one or more wind sensors 509. In embodiments, one or more wind sensors 509 may generate wind speed measurements in proportion (or based at least in part) on fan assembly 506 rotation or turning speed. In embodiments, one or more wind speed sensors 509 may be Hall or Hall-effect sensors. In embodiments, one or more wind sensors 509 may be coupled or connected to one or more processors or controllers. In embodiments, one or wind sensors 509 may communicate generated wind speed measurements to one or more processors or controllers (including but not limited to a processor or controller in a parasol, umbrella or shading system integrated computing device).

FIG. 6A illustrates a parasol, umbrella or shading system with a magnetic attachment connector or a POGO connector for attaching a drink holder according to embodiments. In embodiments, a bottle or cup cooling attachment may be connected to a body 605 of a parasol, umbrella or shading system via a magnetic connector 610. In embodiments, a bottle or cup cooling attachment may be connected to a body of a parasol, umbrella or shading system via a POGO pin connector 620 or other magnetic connectors. In embodiments, Spring-Loaded (Pogo Pin) connectors may provide a reliable electrical connection in the most rigorous environments like on a body of a parasol, umbrella or shading system where movement of a body may occur and/or weather or an environment may subject the drink holder 615 to challenging environmental conditions. In embodiments, POGO pins interconnects 620 may be used as a stationary unit (e.g., a portion of a body 605 of a parasol, umbrella or shading system) interface for coupling to assemblies, holders or components. In embodiments, a drink holder may have a magnet or magnetic assembly 625 to connect or couple to a Pogo pins 620 or other magnetic connectors and may also have a cooling assembly 625 to cool the can, bottle or cup placed in the drink holder. In embodiments, a body 605 of any section of an umbrella, parasol or shading system may comprise one or more magnets and/or magnetic connectors (e.g., pogo pins) so that various attachments with other functionality (e.g., music, lighting, sensors, AI) may be attached to an umbrella, parasol or shading system.

FIG. 6B illustrates an umbrella, parasol or shading system with a wireless charging assembly for mobile computing devices according to embodiments. In embodiments, a wireless charging assembly 630 may be attached, coupled or connected to a body 605 of an umbrella, shading system or parasol. In embodiments, a wireless charging assembly 630 may comprise a housing 631, an insertion area 632, or an induction plate 633. The mobile computing device 635 (e.g., tablet, mobile or smart phone, wearable computing device) may be inserted into an insertion area or space 632 and an induction coil 634 in a mobile computing device 635 should be placed to rest next to the induction coil or plate 633 of the wireless charging assembly 630. The mobile computing device 635 may then be powered via wireless charging using inductive charging techniques. In embodiments, an induction coil or plate 633 of a wireless charging assembly 630 may receive power either through electrical connectors or through an induction coil 636 in a body 605 of an umbrella, parasol or shading system. In embodiments, a body 605 of an umbrella, parasol or shading system may comprise an internal wireless charging assembly 650 which operates in the same fashion as discussed before.

Figure 7:
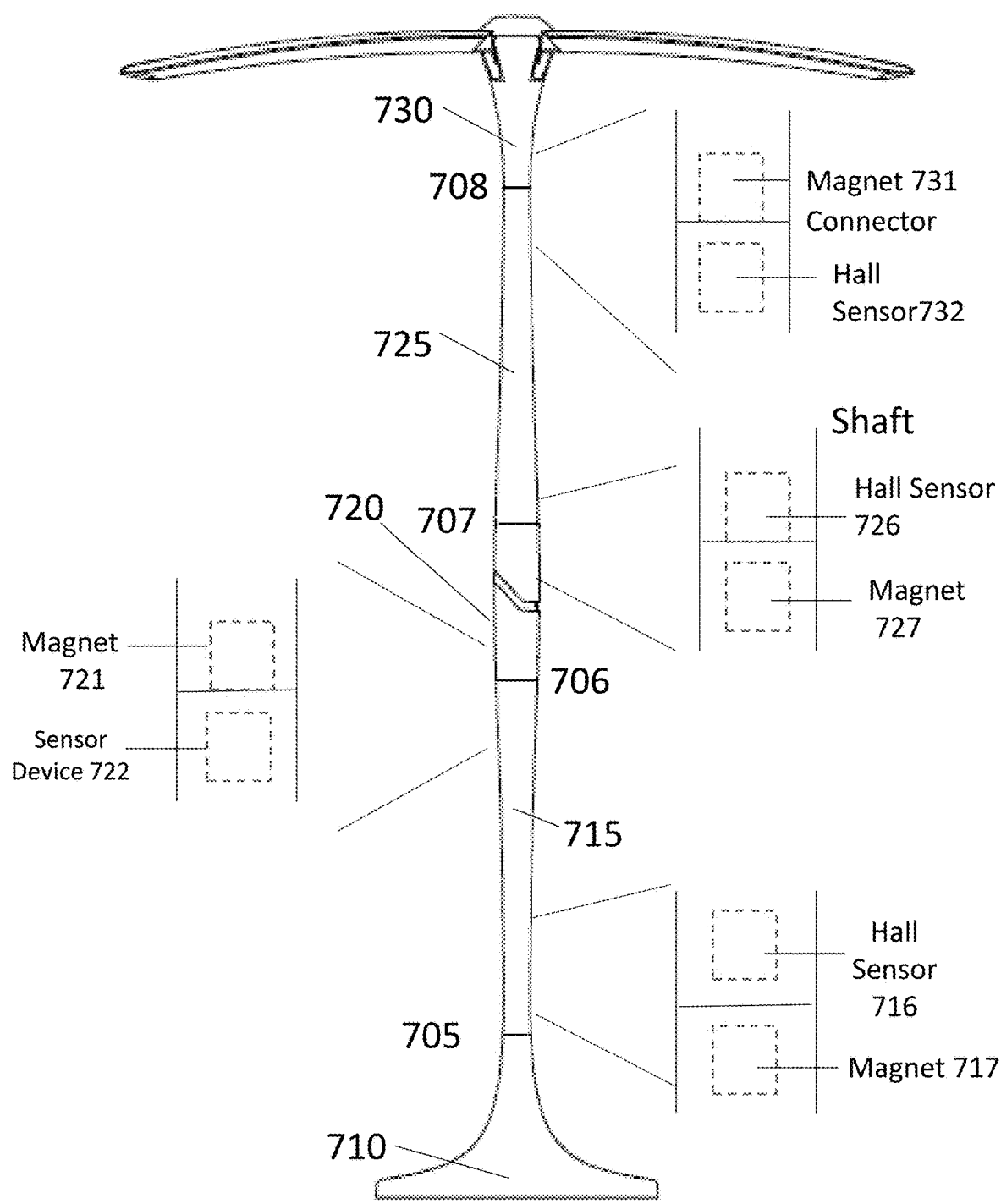
FIG. 7 illustrates an umbrella, parasol or shading system having more than one sections with magnetic sensing and detachment sensing according to embodiments.

In embodiments, an umbrella, parasol or shading system may have multiple sections. In embodiments, an umbrella, parasol or shading system may have a 1) base section or base assembly; 2) a middle section, support section/assembly or core assembly; and/or 3) a top section, an upper section, an arm expansion section or an expansion section. In embodiments, in order to store or disassemble an umbrella, parasol or shading system or to repair an umbrella, parasol or shading system, sections may need to be detached from one another. Accordingly, an umbrella, parasol or shading system may have detachable sections. Thus, umbrella or parasol sections may be detachably connected to other sections of the umbrella, parasol or shading system via magnetic connections, snap fit connections, clamp connections, channel and/or groove connections, and/or friction connections. In embodiments, however, an umbrella, parasol, or shading system may need to be made aware that sections have been detached. FIG. 7 illustrates an umbrella, parasol or shading system having more than one sections with magnetic sensing and detachment sensing according to embodiments. Although FIG. 7 illustrates an umbrella, parasol or shading system having five detachable sections, an umbrella, parasol or shading system may have one detachable sections, two detachable sections and/or more than four detachable sections. FIG. 7 illustrates an umbrella, parasol or shading system with four detachable points (e.g., detachable point 705, 706, 707 and 708. In embodiments, a first detachable point 705 may connect a first umbrella section 710 (e.g., a base section) to a second umbrella section 715 (e.g, a lower section of a core assembly or support assembly). In embodiments, a second detachable point 706 may connect a second umbrella section 715 to a third umbrella section 720. In embodiments, a third detachable point 707 may connect a third umbrella section 720 to a fourth umbrella section 725. In embodiments, a fourth detachable point 708 may connect a fourth umbrella section 725 to a fifth umbrella section 730. In embodiments, this allows easy upgrade or interchanging of assemblies and/or components for the different sections of the umbrella. For example, a fifth umbrella section 730 may be an expansion assembly.

In order to detect detachment of different sections of an umbrella, parasol or shading system, a combination of magnets or magnetic assemblies and magnetic sensors (e.g., magnetic field sensors or hall sensors) may be paired and aligned together at various detection points. Thus, if one section is detached from another section, a magnetic or magnetic field sensor may not detect a magnetic field from the magnet and a magnetic field sensor may generate an error condition and communicate an error condition to one or more processors or controllers in an umbrella, parasol or shading system. In In embodiments, for example, if a second umbrella section 715 is removed or detached from a first umbrella section 710, a hall sensor 716 may detect the lack of the magnetic field generated from the magnet or magnetic assembly 717, and the hall sensor 716 may generate a section detachment or error signal or message and communicate the section detachment or error signal or message to one or more controllers or processors in an umbrella, parasol or shading system. Similar operation can occur at the different detachment points (e.g., magnet 721 and magnetic field sensor 722 may detect detachment at connection point 706; magnet 727 and hall sensor 726 may detect detachment at connection point 707; magnetic assembly 731 and hall sensor or magnetic field sensor 732 may detect detachment at connection point 708). In embodiments, computer-readable instructions executable by one or more processors and/or controllers may receive the detachment or error signal or message and generate a notification message or signal. In embodiments, computer-readable instructions executable by one or more processors or controllers may communicate the notification message or signal to a sound reproduction device (e.g., a speaker); a mobile communication device (e.g., a display or speaker installed therein) and/or an external computing device (e.g., a display or speaker installed therein). In embodiments, a top section at a detachment point may have a magnet or magnetic assembly and a bottom section may have a hall sensor (or a magnetic field sensor) or vice versa (e.g., bottom section at a detachment has magnet or magnetic assembly and top section has hall sensor).

Figure 8B:
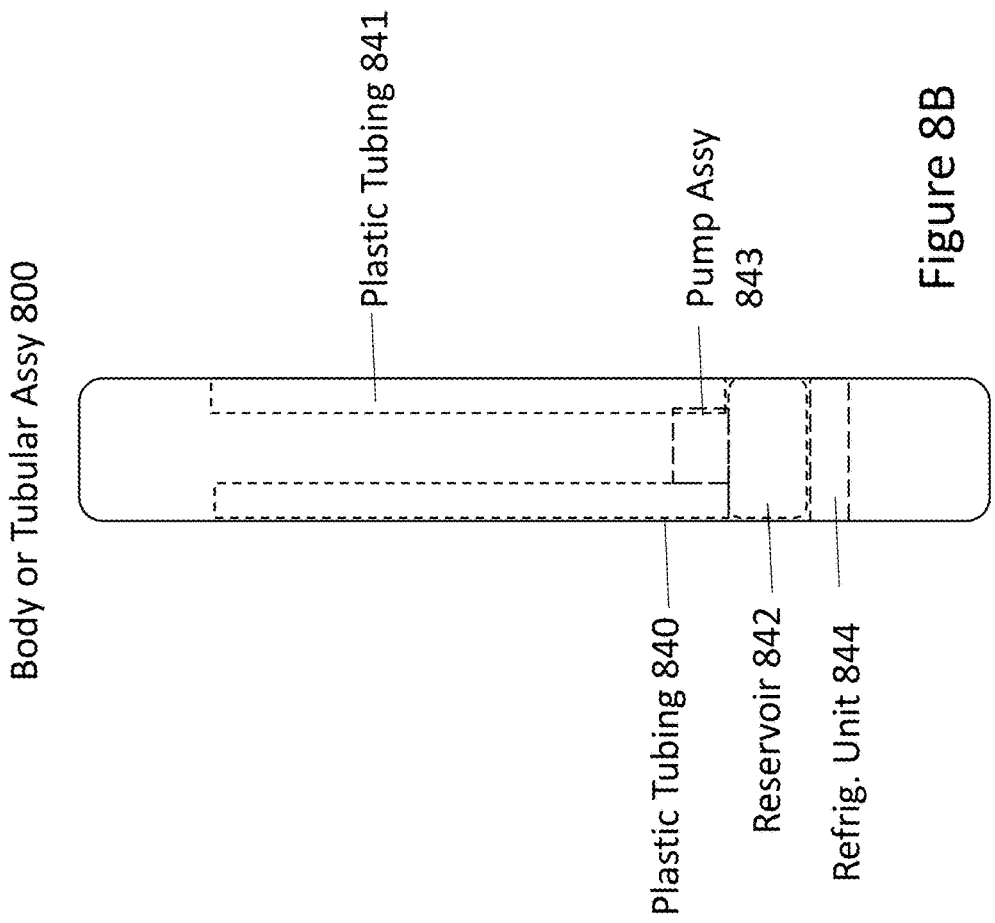
FIG. 8B illustrates a cross-section of a core assembly or support assembly of an umbrella, parasol or shading system according to embodiments.
Figure 8A:
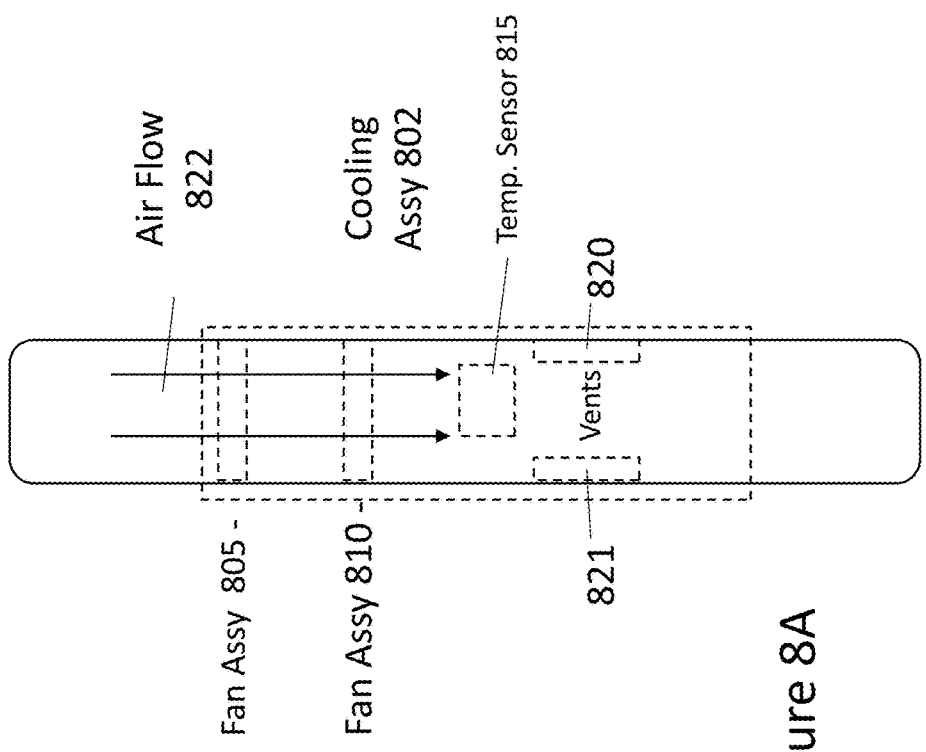
FIG. 8A illustrates a cross-section of a core assembly or support assembly of an umbrella, parasol or shading system including an interior fan assembly according to embodiments.

Fan on Top of Tubular Assembly—FIG. 8A illustrates a cross-section of a core assembly or support assembly of an umbrella, parasol or shading system including an interior fan assembly according to embodiments. FIG. 8B illustrates a cross-section of a core assembly or support assembly of an umbrella, parasol or shading system that includes a cooling system or apparatus of an umbrella, parasol or shading system according to embodiments. In embodiments, a section of an umbrella, parasol or shading system may comprise a cooling system. In embodiments, the section may be a core section or housing, an expansion section or housing, a support section or housing, or other umbrella, parasol or shading system sections. In embodiments, for example, as shown in FIG. 8A, a core assembly or support assembly 800 may comprise a cooling system 802. In embodiments, a cooling system 802 may comprise one or more fan assemblies 805 and 810, one or more internal temperature sensors 815 and/or one or more vents 820 821. In embodiments, this internal temperature sensor 815 may be in addition to a temperature sensor of an umbrella, parasol or shading system measuring external temperatures. In embodiments, an umbrella, parasol or shading system may comprise a core assembly, wherein a core assembly or support assembly 800 comprises a circular or cylindrical tubular assembly (or circular tube) in which components and/or assemblies are positioned or installed (e.g., intelligence housing or motor assembly). In embodiments, because these components may comprise integrated computing devices and/or motor assemblies or other printed circuit boards, heat may be generated inside a tubular assembly (or tube). In order for umbrellas, parasols or shading systems to operate efficiently or effectively, an intelligent umbrella, parasol or shading system may monitor temperatures inside a tubular assembly utilizing one or more internal temperature sensors 815 and generate internal temperature measurements. In embodiments, one or more internal temperature sensors 815 may communicate generate internal temperature measurements to one or more controllers or processors. In embodiments, computer-readable instructions executable by one or more controllers or processors may generate and communicate commands, instructions, messages or signals to one or more fan blades of fan assemblies 805 or 810. In embodiments, one or more fan assemblies 805 and/or 810 may be positioned inside a tubular assembly (e.g., coupled, adhered or connected to sides or inside surfaces of the tubular assemblies with an umbrella body, shading system or parasol). In embodiments, one or more fan assemblies 805 or 810 may be positioned or installed near a top portion of a tubular assembly. In embodiments, a top portion of a tubular assembly may have an opening (e.g., an outside surface may have an opening or a top surface of a tubular assembly may have an opening or a vent (e.g., intake vent 807) may be present in a top portion of a tubular assembly and/or body of an umbrella). In embodiments, air may be drawn into a tubular assembly or tube via spinning and/or rotation of one or more fan assemblies 805 or 810. In embodiments, rotation of one or more fan assemblies 805 and/or 810 may comprise air to move through a tubular assembly (e.g., from top to bottom) as illustrated by air flow reference number 822. In embodiments, a bottom portion of a tubular assembly may comprise one or more vents 820 and/or 821 to allow moved air to exit a tubular assembly. In embodiments, this may reduce an internal temperature of a tubular assembly. In embodiments, fan assemblies 805 and/or 810 may be placed at different or discrete vertical levels in a tubular assembly to improve air movement internally within the tubular assembly. In embodiments, as illustrated by FIG. 8B, a cooling assembly may comprise a liquid cooling assembly that may run down an inside surface and/or an outside surface of one or more tubular assemblies 800. In embodiments, a liquid cooling assembly may comprise tubing 840 or 841, a liquid reservoir 842, a liquid pump 843 and/or a refrigeration unit 844. In embodiments, a liquid may be present in a reservoir 843 and a refrigeration unit 844 may cool liquid within a reservoir 842 (or may cool liquid as it enters a tubing assembly 800). In embodiments, a liquid pump 843 may draw liquid out of the reservoir 842 and pump the liquid (which has been cooled by the refrigeration unit 844) through one or more plastic tubing hoses 840 or 841 which are running down an inside surface of a tubular assembly. In embodiments, the cooled temperature of the liquid may cause a surface of the plastic tubing to be reduced in temperature and thus reduce a temperature of a tubular assembly. In embodiments, a liquid cooling assembly may be continuously running in order to cool a tubular assembly. In embodiments, one or more temperature sensors 815 (as described above) may monitor internal temperatures in a tubular assembly and a refrigeration unit 844 and/or a pump assembly 843 may be activated when a temperature measurement reaches a temperature threshold value (as is discussed above with respect to the fan assembly).

Figure 9A:
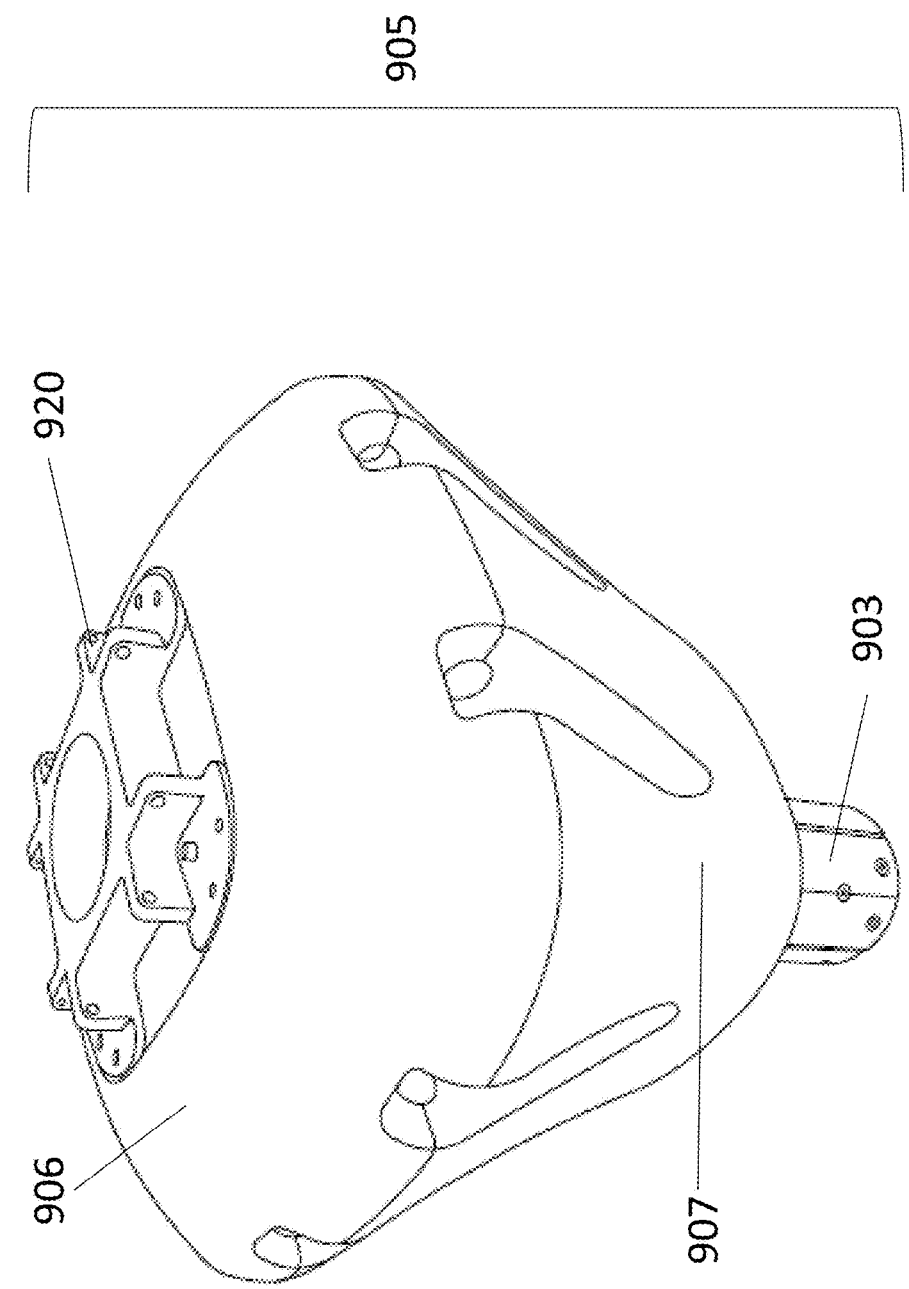
FIG. 9A illustrates a protective housing or shielding for one or more arm support assemblies and/or linking assemblies according to embodiments.
Figure 9B:
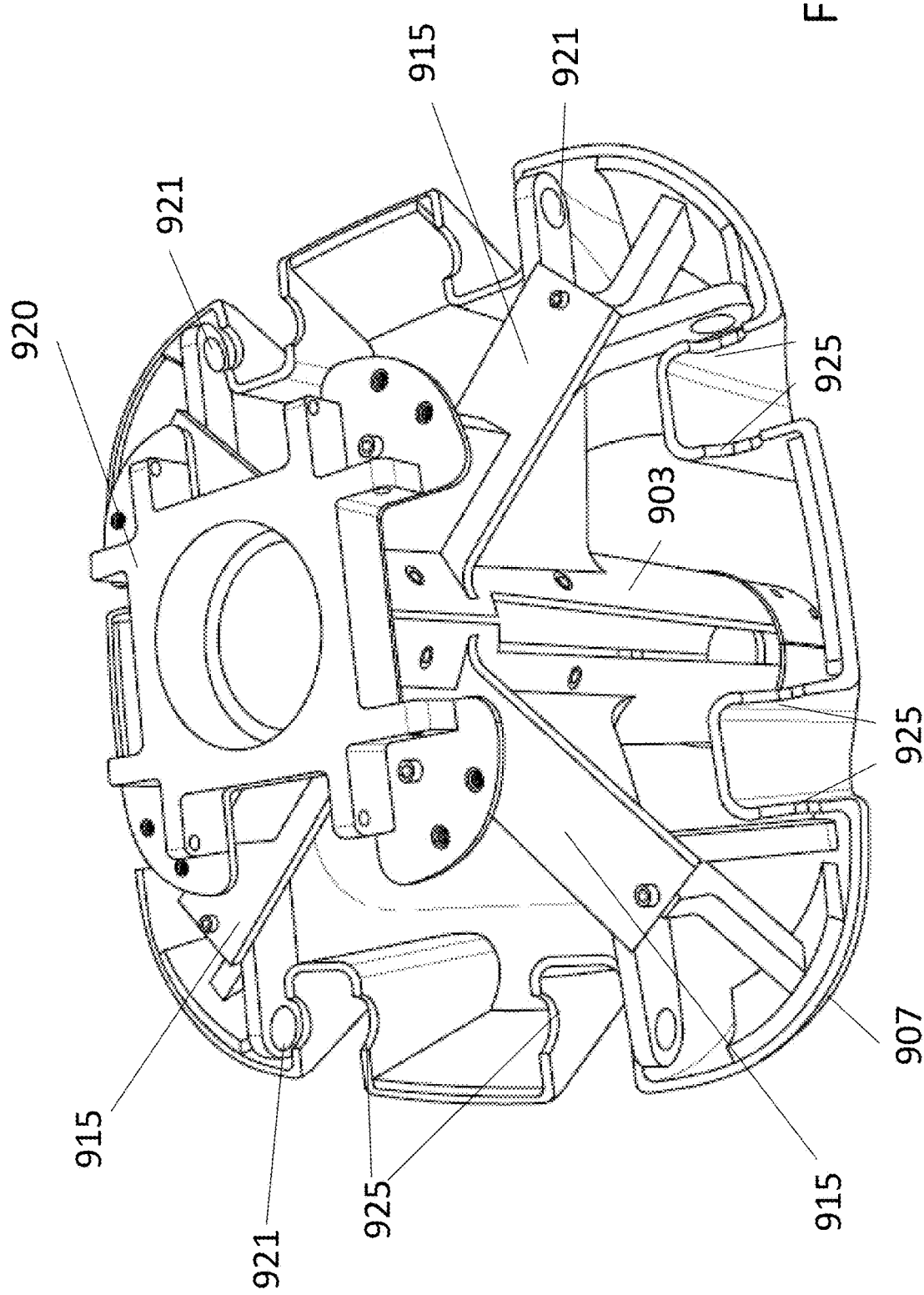
FIG. 9B illustrates a linkage protective housing with a top housing remove according to embodiments.

FIG. 9A illustrates a protective housing or shielding for one or more arm support assemblies and/or linking assemblies according to embodiments. In embodiments, an umbrella, parasol or shading system may comprise a linkage protective housing 905 to hide and/or protect one or more arm support assemblies, linking assemblies, or shading frames from view and/or from damage from an environment. In embodiments, a linkage protective housing 905 may also prevent operators or users (or their clothing) from getting caught in the one or more arm support assemblies, linking assemblies and/or shading frames. In embodiments, a linkage protecting housing 905 may comprise an upper housing 906 and/or lower housing 907. In embodiments, portions of arms or blades may reside outside of linkage protective housing 905 and may rest on outside surfaces of the linkage protective housing. In embodiments, an upper housing 906 may be connected via to a lower housing 907 via a fastener, screw, connector or an adhesive or combination thereof. In embodiments, a linkage protective housing 905 may be made or manufactured by additive manufacturing techniques (or 3D printing). In embodiments, a linkage protective housing 905 may be coupled, connected or adhered to an expansion assembly, tubular assembly and/or shaft 903. FIG. 9B illustrates a linkage protective housing with a top housing removed according to embodiments. In embodiments, a sensor housing frame or 920 may be connected to one or more arm support assembly, arm support assembly frame or linking assembly 915. In embodiments, a sensor housing frame 920 may be connected to a linkage protective housing 905 (e.g., an upper housing 906). In embodiments, one or more arm support assemblies or frames or linking assemblies 915 may be coupled to an actuator, tubular assembly, shaft and/or or hinging assembly 903 in order to deploy the arms or blades to an expanded, deployed or open position. In embodiments, one or more arm support assemblies or linking assembly 915 may comprise one or more arm connectors 921 (e.g., holes or slots. In embodiments, one or more associated arms may be connected to one or more arm support assemblies x15 utilizing one or more arm connectors 921 (e.g., may be holes or slots). In embodiments, a bottom housing 907 may comprise one or more arm/blades rests or recesses 925. In embodiments, an end portion of an arm/blade may be connected through two arm connectors 921 (e.g., inserted through holes or slots) and may be installed in or positioned in one or more (e.g., four in FIG. 9B) arm/blade rests or recesses 925. In embodiments, the linkage protective housing 905 prevents the linking assemblies and even portions of the arms/blades from being seen from user or operators, which presents a sleeker design and provides safety benefits. In embodiments, one or more speaker assemblies may be installed onto an outside surface of a linkage protective housing 905. In embodiments, four speaker assemblies may be installed on an outside surface of a linkage protective housing 905 or may be integrated into an outside surface of a linkage protective housing 905.

Many umbrellas, parasols and shading systems do not include detachable or separate arms or blades. Instead, they utilize frame systems and/or interconnected ribs, where a shading fabric, such as nylon may be attached and/or connected to various points on the frame systems and/or interconnected ribs. This leads to issues when a shading area needs to be modified or changed and a user or operator is hindered by having a preexisting and non-modifiable umbrella, parasol or shading system. FIG. 10A illustrates an umbrella, parasol or shading system with multiple arms or blades and/or one or more shading fabrics according to embodiments. FIG. 10B illustrates a side cross-section view of one of the arms or blades according to embodiments.

FIG. 10A illustrates a top view of an umbrella, parasol or shading system with arms/blades and shading fabric according to embodiments. FIG. 10A illustrates a top view of an umbrella, parasol or shading system with four arms or blades assemblies (e.g., four arm/blade connectors 1007 and four arms/blades), one or more shading fabrics or shading fabric pieces 1010 and a center support assembly, linking assembly or expansion support assembly 1015. In embodiments, one or more shading fabrics or fabric pieces 1010 are connected or adhered between two arms or blades assemblies (e.g., arm/blade connectors 1007 and arm/blades 1005). In embodiments, one or more arms or blade assemblies (e.g., arm/blade connectors 1007 and arm/blades 1005) are connected and/or coupled to a center support assembly or expansion support assembly 1015 through a linking assembly or hinging assembly.

FIG. 10B illustrates a block diagram of components in an arm or blade assemblies according to embodiments. Prior art umbrellas, parasols and/or shading systems may have lights or lighting assemblies hanging from ribs and/or frames and/or jutting out from umbrella ribs and/or frames. This may present a safety hazard if a tall person is underneath the umbrella, parasol or shading system and lights or light assemblies are positioned too low. In addition, in many cases, when folding an umbrella, parasol or shading system, lights may have to be detached from a frame or rib, which is inconvenient. In addition, there is a risk of light assemblies being damaged during installation or during movement of the umbrella, parasol or shading system. In embodiments, one or more lights or lighting assemblies 1020 may be integrated into an arm or blade assemblies (e.g., arm/blades 1005, although one or more lighting elements may be present in an arm/blade connector 1007). In embodiments, one or more lights or lighting assemblies 1020 may be integrated into a bottom surface of an arm or blade assembly (e.g., arm/blades 1005). In embodiments, one or more lighting assemblies 1020 may receive power from one or more cables or wires 1030 from a solar charging assembly and/or rechargeable power source located within an umbrella, parasol or shading system. In embodiments, one or more solar cells or solar panel assemblies may be integrated into an arm or blade assembly (e.g., arm/blades 1005, although solar cells or solar panel assemblies may be integrated into a top surface of an arm/blade connector 1007). In embodiments, one or more solar cells or solar panel assemblies 1025 may be adhered and/or fastened to a top surface of an arm or blade assembly (e.g., arm/blades 1005). In embodiments, one or more solar cells or solar panel assemblies 1025 may provide power to one or more lighting assemblies 1020. In embodiments, a battery 1040 may provide power to one or more lighting assemblies 1020. In embodiments, one or more wireless communication transceivers 1035 may receive commands and/or instructions from one or more controllers or processors in an umbrella, parasol or shading system to activate one or more lighting assemblies 1020. In embodiments, upon receipt of commands and/or instructions, one or more wireless communication transceivers 1035 may communicate a signal or command to one or lighting assemblies 1020 to activate and/or deactivate the one or more lighting assemblies 1020. In embodiments, a controller/processor in an umbrella, parasol, shading system may communicate a command, instruction and/or signal a lighting assembly or lighting elements 1020 in an arm or blade assembly (e.g., arm/blades 1005) via one or more cables and/or wires 1030.

In embodiments, umbrellas, parasols and/or shading systems may be in various states of operation. In many cases, it may not be apparent whether or not certain components or electrical assemblies are operational or may be malfunctioning. In many cases, it may not be possible for an umbrella, parasol or shading system to audibly identify that certain assemblies are malfunctioning because the umbrellas, parasols, and/or shading systems may be outdoor and located in a noisy environment. In embodiments, an umbrella, parasol and/or shading system may utilize LED lighting assemblies to identify operating conditions of the device and/or operating conditions of components or assemblies within the umbrella, parasol and/or shading system. In addition, LED lighting assemblies may be synchronized with an audio system so that music playback may be coordinated with lighting assemblies. In embodiments, for example, a certain LED (or LED assembly) lighting up or activating may indicate that a specific component is malfunctioning. In embodiments, a certain LED color may represent operational status of specific components (e.g., blue—component being initialized and/or calibrated; green—component being operational; orange—component reaching a dangerous operating range or condition; red—component malfunctioning). In embodiments, LED assemblies may be located on various portions of an umbrella, parasol and/or shading system.

FIG. 11A illustrates a power button with a lighting element encircling the power button according to embodiments. FIG. 11B illustrates a lighting element in a core assembly or support, where the lighting element goes around or encircles a core assembly or central support according to embodiments. FIG. 11C illustrates a plurality of lighting elements for an umbrella, parasol or shading system according to embodiments. In embodiments, a parasol, umbrella or shading system may comprise a power button 1110 and one or more lighting elements 1105, as illustrated in FIG. 11A. In embodiments, when a parasol, umbrella or shading system is turned off, for example, one or more lighting elements 1105 may be turned off. In embodiments, when a parasol, umbrella or shading system is turned off but in a sleep or low power mode, for example, one or more lighting elements 1105 may have a muted intensity to indicate non-operation, but that the parasol, umbrella or shading system may be in a ready-to-go mode or sleep mode, where an umbrella, parasol or shading system may have certain components or assemblies powered and operational but other components and/or assemblies in a non-operational state. In embodiments, one or lighting elements 1105 may have a higher intensity indicating that an umbrella, parasol or shading system is operational and/or ready to do. Similarly, in FIG. 11B, one or more lighting elements 1120 that encircles a core assembly 1122 may also be turned off, have a muted intensity, or be lit to full intensity to illustrate operational status of different components and/or assemblies. In embodiments, once a parasol, umbrella or shading system has been activated, one or more lighting elements 1105 (FIG. 11A) or lighting element 1120 (FIG. 11B) may illuminate but appear to have the lighting element or light ray circling the power button 1110 (e.g., in a clockwise or counterclockwise direction) or circling the core assembly 1122 (e.g., in a clockwise or counterclockwise direction) to indicate that 1) a shading system or umbrella is initiating operation (e.g., turning on) or 2) performing an operation (e.g., executing voice recognition, executing an artificial intelligence process, activating one or more motor assemblies (e.g., azimuth motor, elevation motor, expansion motor). In embodiments, the one or more lighting elements 1105 (FIG. 11A) or 1120 (FIG. 11B) may emit different colors of lights to indicate an operational status of an umbrella, parasol, and/or shading system (e.g., initiating, configuring, operational, warning stage or malfunctioning). In embodiments, the one or more lighting elements 1105 (FIG. 11A) or 1120 (FIG. 11B) may emit different colors of lights to indicate certain components or assemblies or being utilized, configured or initiated (e.g., blue indicates that AI or voice recognition is being utilized; green indicates that wireless communication transceivers are being utilized; red indicates one or more motor assemblies are being utilized) and thus a user or operator should be cautious because a parasol, umbrella and shading system may be in the process of moving.

FIG. 11C illustrates a logo that includes one or more lighting elements that may be utilized to indicate operational states of components or assemblies of an umbrella, parasol, and/or shading system. In embodiments, a core assembly, support assembly or other section of an umbrella, parasol or shading system may comprise a number of lighting elements 1111, 1112, 1113, 1114, 1115, 1116, 1117 and/or 1118 formed in a logo, for example. In embodiments, this logo may be SHADECRAFT's SUNFLOWER logo. In embodiments, for example, lighting elements 1111, 1112, 1113, 1114, 1115, 1116, 1117 and/or 1118 may be illuminated in a staggered, timed, and/or delayed manner in a clockwise or counterclockwise direction to identify operational states (e.g., turning on and/or performing an operation) of an umbrella, shading system or parasol. In embodiments, lighting elements 1111, 1112, 1113, 1114, 1115, 1116, 1117 and/or 1118 may indicate that certain components, assemblies and/or devices are being utilized, are operational or are malfunctioning. In embodiments, for example, lighting elements may be illuminated in a sequence (e.g., in a clockwise direction) from 1111 to 1112 to 1113 to 1114 to 1115 to 1116 to 1117 to 1118 and continue until an umbrella, parasol, or shading system is powered on, an operational state has changed, and/or an operation has completed. One or more colors may be utilized in such sequence. For example, once an umbrella system, parasol or shading system is turned on, the one or more lighting elements 1111, 1112, 1113, 1114, 1115, 1116, 1117 and/or 1118 may be illuminated sequentially in a clockwise direction until the umbrella, parasol or shading system is operational and ready. In embodiments, one or more lighting elements 1111, 1112, 1113, 1114, 1115, 1116, 1117 and/or 1118 may also be illuminated in a counterclockwise direction. In embodiments, one or more lighting elements 1111, 1112, 1113, 1114, 1115, 1116, 1117 and/or 1118 may be illuminated when an umbrella, parasol system is being powered down. FIG. 11D illustrates one or more arms/blades comprising one or more lighting elements or assemblies according to embodiments. In embodiments, similarly, one or more lighting elements 1140 or 1141-1144 and 1147-1148 in one or more arms or blades 1145 (see FIG. 11D) may also be illuminated (at once or in a sequence) to identify that an umbrella, parasol and/or shading system is being activated or turned on and/or is completing an operation (as discussed above or below). In embodiments, illumination of one or more lighting assemblies 1140 or lighting elements 1141-1144 and 1147-1148 in one or more arms or blades 1145 may occur in addition to and/or alternatively to illumination of one or more lighting elements in a logo (see FIG. 11C), around a power button (see FIG. 11A) or around a core assembly or support assembly (see FIG. 11B).

In embodiments, one or more lighting elements may have different colors and/or intensities in order to indicate information about one or more assemblies, components or devices in an umbrella, parasol or shading system. In embodiments, this information may be operational states or status of a component, assembly or device and/or whether components, assemblies or devices of an umbrella, parasol or shading system are being utilized. In embodiments, for example as illustrated in FIG. 11C, one or more lighting elements may emit a blue light (e.g., 1113) to indicate that one or more PAN transceivers (or other wireless communication transceivers) are being utilized. In embodiments, one or light elements (e.g., 1116) may emit a red light to indicate that a proximity sensor is malfunctioning or generating an error reading. In embodiments, one or more light elements (e.g., 1115) may emit an orange light to indicate that artificial intelligence and/or voice recognition is up and operational and/or being utilized. In embodiments, one or more lighting elements (e.g., 1117) may emit a green light to identify that an imaging device is operational and/or being utilized. In embodiments, one or more lighting elements (e.g., 1112) may emit that a red light or yellow light to identify that motor assemblies are operational and/or being utilized in order to visually warn that these devices are being utilized. In embodiments, one or more lighting elements (e.g., 1111) may emit a yellow light identifying that an integrated computing device is operational and/or being utilized. In embodiments, a user or operator may set up different lighting elements 1111-1118 to identify operational status for different components or assemblies of an umbrella, a parasol and/or a shading system. In embodiments, for example, lighting elements 1111-1118 may be preassigned to different assemblies and/or components or devices in an umbrella, parasol and/or shading system. In embodiments, for example, lighting element 1111 may be assigned to display operational status of an integrated computing device; lighting element 1112 may be assigned to display operational status of artificial intelligence or voice recognition in an umbrella, parasol and/or shading system; lighting element 1113 may be assigned to display operational status of a personal area network transceiver; lighting element 1114 may be assigned to display operational status of a local area network transceiver (or WiFi transceiver); lighting element 1115 may be assigned to display operational status of a cellular transceiver; lighting element 1116 may be assigned to display operational status of one or more motor assemblies; lighting element 1117 may be assigned to display operational status of one or more imaging devices; and/or lighting element 1118 may be assigned to display operational status of proximity sensors.

In embodiments, as shown in FIG. 11C, a parasol, umbrella and/or shading system may have eight lighting elements 1111-1118. However, the inventions equally apply to parasols, umbrellas or shading systems that have more or less lighting elements (e.g., 2, 4, 15, 16, 24 or 30), each which can be assigned to different individual components and/or assemblies, so that operational status may be displayed and/or shown for any number of individual components or assemblies. In embodiments, an attachment may be mechanically and/or magnetically connected to a core assembly, a support assembly and/or a base assembly according to embodiments. FIG. 11B illustrates an attachment comprising one or more lighting elements. In embodiments, an attachment 1130 may comprise one or more lighting elements 1135. In embodiment, FIG. 11B illustrates two lighting elements 1135, however, as discussed above, one or more lighting elements may be utilized in an attachment 1130. In embodiments, pogo pins may allow attachment or connection of an attachment 1130 to a core assembly or support assembly 1122, expansion assembly, cover or protection assembly and/or base assembly. In embodiments, an attachment 1130 may be connected, adhered, fastened, and/or coupled to a core assembly or support assembly 1122, expansion assembly, cover or protection assembly and/or base assembly. In embodiments, the attachment 1130 may thus be attached and/or detached at a number of locations on an umbrella, parasol or shading system to allow a user to visually see operational status of a number of functions, or components and/or assemblies from a different number of views. In embodiments, a user can initiate visual indication processes or methods via voice commands. In embodiments, voice recognition and AI engines may receive voice commands and as described in SHADECRAFT patent applications, may communicate with necessary components and/or assemblies to cause a lighting sequence or display to be initiated, started and/or stopping. Thus, in embodiments, an umbrella, parasol or shading system may have three or four connection areas and may utilized connectors and/or fasteners (e.g., pogo pins, magnets, fasteners, snaps) and thus an attachment 1130 may be moved to different areas based on positions of users and/or operators. In embodiments, although lighting elements are discussed therein, LED numeral assemblies or display assemblies may also be attached to different areas of an umbrella, parasol or shading system and visually display operational status of many components and/or assemblies (utilizing numeral displays and/or alphanumeric displays).

Figure 11E:
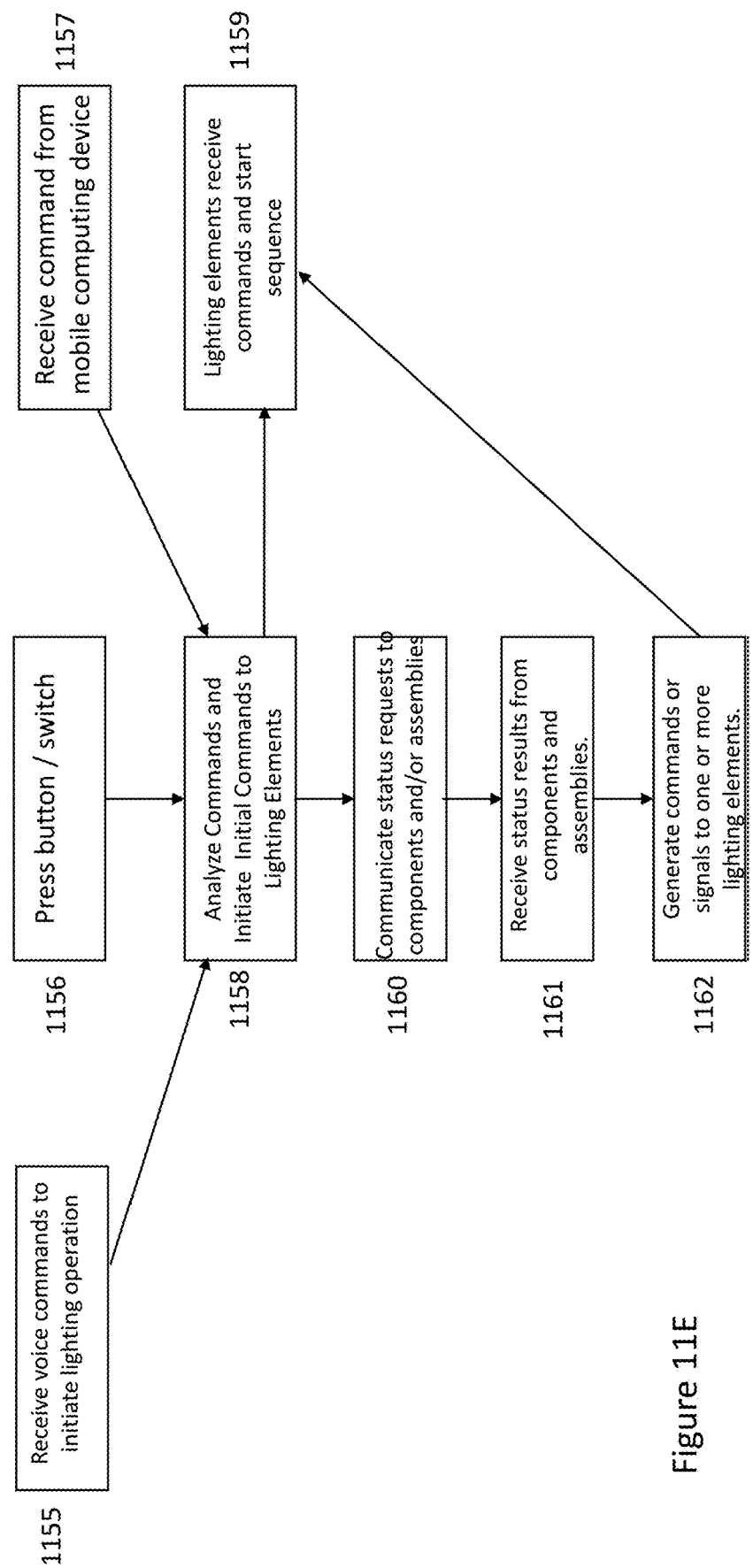
FIG. 11E illustrates a flowchart of initiating operation of one or more lighting assemblies in an umbrella, parasol or shading system according to embodiments.

FIG. 11E illustrates a flowchart of initiating operation of one or more lighting assemblies in an umbrella, parasol or shading system according to embodiments. In embodiments, an umbrella, parasol or shading system may comprise a computing device. In embodiments, a computing device may comprise one or more processors, one or more memory devices and computer-readable instructions executable stored in the one or more memory devices. In embodiments, the computer-readable instructions may be executed by the one or more processors to perform actions or steps such as those detailed below in FIG. 11E. In embodiments, the steps or actions may be performed in different sequences than those set forth in FIG. 11E. In embodiments, a method of initiating an umbrella, parasol or shading system operational status may be started in a variety of fashions. In embodiments, a user may speak a command into one or more microphones and voice recognition software may analyze 1155 the voice command and generate a corresponding command or instruction based at least in part on the received voice command. Alternatively, in embodiments, a user or operator may press a button or switch 1156 on an umbrella, parasol or shading system in order to activate a lighting element operational status process. Alternatively, or in addition to, in embodiments, an umbrella, parasol or shading system may receive a command from an external computing device (e.g., a mobile computing device, such as a smartphone) that requests 1157 that a lighting element operational status be initiated. In embodiments, computer-readable instructions executable by one or more processors may receive 1158 voice commands, a start command from a button or switch or external computing device commands and may analyze these commands or instructions, and may generate initial lighting element commands, instructions, signals or messages. In embodiments, computer-readable instructions executable by one or more processors may communicate the generated initial lighting element commands, instructions, signals or messages to one or more lighting elements in an umbrella, parasol or shading system. In embodiments, the one or more lighting elements may receive 1159 the initial lighting element commands, instructions, signals or messages and may illuminate the one or more lighting elements based at least in part on the received initial lighting element commands, instructions, signals or messages. In embodiments, as discussed previously, the one or more lighting elements may be illuminated in different intensities, different colors, to project a certain pattern or a certain effect. In embodiments, computer-readable instructions executable by one or more processors may communicate status requests 1160 to components of an umbrella, parasol or shading system (e.g., computing device, sensors, cameras, detectors, solar panels or solar chargers) and/or assemblies of an umbrella, parasol or shading system (e.g., an elevation motor assembly, an azimuth motor assembly, and/or an expansion motor assembly) to determine operational stats of the components and/or assemblies. In embodiments, components and/or assemblies of the umbrella, parasol or shading system may generate status indicators, messages or results and may communicate the status indicators, messages or results. In embodiments, computer-readable instructions executable by one or more processors may receive and analyze 1161 the status results, indicators and/or messages from the umbrella, parasol, or shading system components or assemblies. In embodiments, computer-readable instructions executable by one or more processors may generate and communicate 1162 updated or revised lighting element commands, instructions, signals or messages, based at least in part on the received status results, indicators or messages. In embodiments, the one or more lighting elements may receive updated or revised lighting element commands, instructions, signals or messages and may illuminate the one or more lighting elements based at least in part on the revised lighting element commands, instructions, signals or messages. In embodiments, this process may continue to occur until an operator requests that the lighting element operational status be stopped, a start-up sequence has ended, the umbrella, parasol or shading system is turned off, or computer-readable instructions executed by a processors receives a command from an external computing device. In the lighting element operational status continues to operate, computer-readable instructions executable by one or more processors may communicate status requests 1160 to components and/or assemblies of the umbrella, parasol or shading system at predetermined timeframes (e.g., every minute, every 10 minutes and/or every hour) although any timing is possible. In embodiments, as illustrated in FIG. 11E, the process may return to step 1160 (e.g., communicating status requests). In embodiments, a lighting element operational status process may also be automatically invoked at certain periods of the day or when certain environmental conditions occur. In embodiments, for example, if environmental sensor thresholds are reached, commands and/or instructions may be communicated to begin execution of computer-readable instructions by the processor to initiate determination of operational status or an umbrella, parasol or shading system and to visually provide status indicators through the one or more lighting elements by communicating light element commands, signals, instructions or messages to the one or more lighting elements. In embodiments, lighting elements may be light bulbs, LED lights, fluorescent lights, light tape, light layers of material and/or light paint.

In embodiments, an umbrella includes one or more lighting elements, one or more motor assemblies, one or more electrical components and an integrated computing device. In embodiments, the integrated computing device includes one or more processors, one or more physical memory devices, and computer-readable instructions stored in the one or more physical memory devices. The computer-readable instructions executed by the one or more processors may receive status message or signals from the one or more motor assemblies or the one or more electrical components; 2) generate light element commands, instructions, messages or signals based, at least in part, on the received status messages or signals; and 3) communicate the generated light elements commands, instructions, messages or signals to the one or more lighting elements to indicate status of the one or more motor assemblies or one or more electrical components. The computer-readable instructions executed by the one or more processors may receive status messages from the integrated computing device identifying operational status of the integrated computing device and generate light element commands, instructions, messages or signals based, at least in part, on the received status messages or signals; and communicate the generated light elements commands, instructions, messages or signals to the one or more lighting elements to indicate status of the integrated computing device. In embodiments, the one or more motor assemblies comprising azimuth motor assembly, an elevation motor assembly or an expansion motor assembly. In embodiments, the status messages may indicate whether the one or more electrical components or the computing device is turned off, initializing, activated or malfunctioning. In embodiments, the one or more electrical components may comprise one or more wireless transceivers, one or more environmental sensors, an audio transceiver, one or more proximity sensors, one or more cameras, or one or more directional sensors. In embodiments, the computer-readable instructions may be executable by the one or more processors to 1) receive status messages from an artificial intelligence process identifying operational of the artificial intelligence process; 2) generate light element commands, instructions, messages or signals based, at least in part, on the received status messages or signals regarding the artificial intelligence process; and 3) communicate the generated light elements commands, instructions, messages or signals to the one or more lighting elements to indicate status of the artificial intelligence In embodiments, an umbrella may include one or more lighting elements; and an integrated computing device, where the integrated computing device includes one or more processors, one or more physical memory devices, and computer-readable instructions stored in the one or more physical memory devices. In embodiments, the computer-readable instructions may be executable by the one or more processors to 1) receive audio files, the received audio files based at least in part on voice commands received by one or more microphones, 2) perform an artificial intelligence process based at least in part on the received audio files, 3) monitor status of the artificial intelligence process and receive status messages with respect to the artificial intelligence process, 4) generate light element messages, commands or instructions regarding the status of the artificial intelligence processor; and 5) communicate the light element messages, commands or instructions to the one or more lighting elements.

In embodiments, an umbrella may include a first lighting element, a second lighting element, a first electrical component where the first lighting element is associated with a status of the first electrical component, a second electrical component where the second lighting element associated with a status of the second electrical component; and an integrated computing device. The integrated computing device may include one or more processors, one or more physical memory devices, and computer-readable instructions stored in the one or more physical memory devices, the computer-readable instructions being executable by the one or more processors. The computer-readable instructions may be executable by the one or more processors to 1) receive first status message or signals from the first electrical component; 2) receive second status message or signals from the second electrical component; 3) generate first light element commands, instructions, messages or signals based, at least in part, on the received first status messages or signals and communicate the generated first light element commands, instructions, messages or signals to the first light element; and 4) generate second light element commands, instructions, messages or signals based, at least in part, on the received second status messages or signals and communicate the generated second light element commands, instructions, messages or signals to the second light element. In embodiments, the umbrella further includes a third lighting element, and a first motor assembly, the third lighting element associated with a status of the first motor assembly, wherein the computer-readable instructions are executable by the one or more processors to receive third status message or signals from the first motor assembly and generate third light element commands, instructions, messages or signals based, at least in part, on the received third status messages or signals and communicate the generated third light element commands, instructions, messages or signals to the third light element. In embodiments, the umbrella, parasol and shading system further includes a third lighting element, the third lighting element associated with a status of the integrated computing device, wherein the computer-readable instructions are further executable by the one or more processors to 1) receive third status message or signals from the integrated computing device; and 2) generate third light element commands, instructions, messages or signals based, at least in part, on the received third status messages or signals from the integrated computing device, and communicate the generated third light element commands, instructions, messages or signals to the third light element. In embodiments, one electrical component may be a wireless transceiver and a second electrical component may be a sensor. In embodiments, the first motor assembly may an azimuth motor assembly, an elevation motor assembly or an expansion motor assembly. In embodiments, the status message received from the first electrical component or mechanical assembly indicates an operational status of powered-off, initiating, activated or malfunctioning. In embodiments, the first light element may illuminate in more than one color or more than one intensity, the more than one color corresponding to an operational state of the first electrical component, wherein the computer-readable instructions are further executable by the one or more processors to generate the first light element commands, instructions, messages or signals, based, at least in part on the operational status of the first electrical component, wherein the first light element commands, instructions, messages or signals cause the first light element to illuminate in a color or illumination intensity corresponding to the received operational status.

In embodiments, one or more speakers or sound reproduction devices may be placed at different areas of an umbrella, parasol or shading system and may audibly communicate operational status of functions, components and/or assemblies to users and/or operators. In embodiments, for example, a speaker and/or sound reproduction device may identify that artificial intelligence is being utilized and/or is operational, that an integrated computing device is available for use, that WiFi connectivity is available and that one or more imaging devices may be operational and/or transmitting images. Thus, lighting elements may be placed on an attachment and the attachment's lighting element may show operational status of an umbrella, parasol or shading system.

Figure 12:
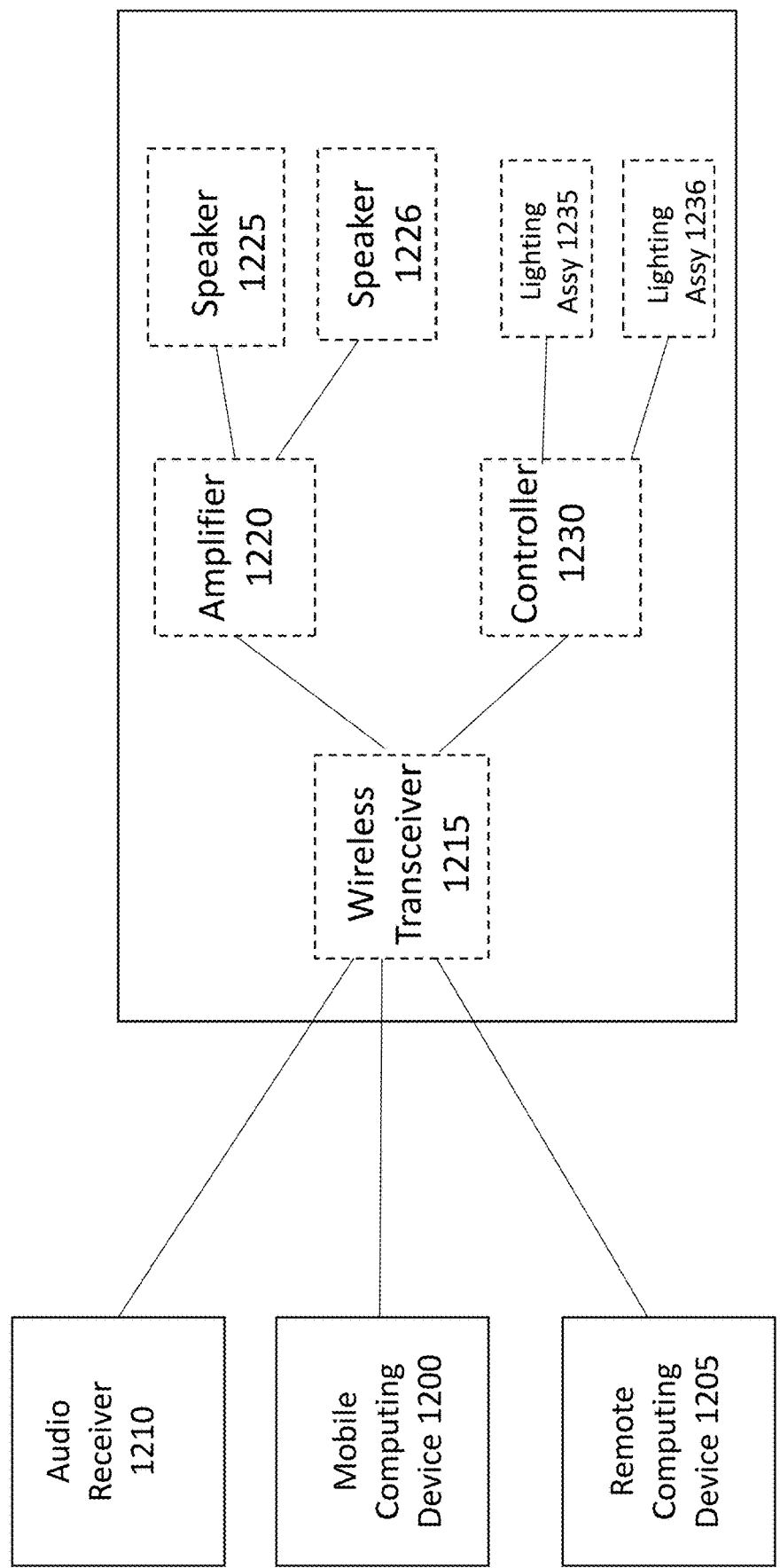
FIG. 12 illustrates a block diagram of an umbrella, parasol or shading system playing coordinated music and lighting element according to embodiments.

FIG. 12 illustrates a block diagram of an umbrella, parasol or shading system playing coordinated music and lighting element according to embodiments. In embodiments, a synchronized music playing system in an umbrella, parasol, or shading system may comprise one or more wireless transceivers 1215, one or more amplifiers 1220, one or more speakers 1225 1226, one or more controllers/processors 1230 and one or more lighting elements or lighting assemblies 1235 1236. In embodiments, a digital music source may communicate digital music files to a parasol, umbrella or shading system comprising a synchronized music playing system. In embodiments, a digital music source may comprise a mobile communications device 1200, an audio receiver 1210 and a remote computing device 1205. In embodiments, the digital music source 1200, 1205 or 1210 may communicate digital music files to a wireless transceiver 1215 (e.g., a PAN transceiver such as a Bluetooth or Zigbee transceiver; a WiFi transceiver or a cellular transceiver). In embodiments, a wireless transceiver 1215 may also comprise a ULE or DECT transceiver. In embodiments, a wireless transceiver 1215 may communicate digital music files to one or more amplifiers 1220. In embodiments, the one or more amplifiers 1220 may communicate or transfer the received digital music files to the one or more speakers 1225 or 1226. Simultaneously to the transfer of digital music files to the one or more amplifiers, the wireless transceiver 1215 communicates the digital music files and/or music characteristics (e.g., frequency and/or intensity characteristics) to one or more processors or controllers 1230. In embodiments, computer-readable instructions executable by the one or more controller or processors 1230 may i) analyze the digital music files and/or music characteristics, ii) determine light sequencing characteristics, light frequency characteristics, light intensity characteristics and/or light color characteristics; and iii) communicate lighting sequencing characteristics, light frequency characteristics, and light intensity characteristics to the one or light assemblies 1235 and 1236 to control illumination of the one or more lighting assemblies or lighting elements 1235 (and specifically intensity, frequency, sequencing or color characteristics). In embodiments, this results in music playing via speakers which is coordinated with the illumination and activation of lighting elements in a synchronized manner.

FIGS. 13A and 13B illustrates a block diagram of a modular umbrella system according to embodiments. In embodiments, as is illustrated in FIG. 13A, a modular umbrella shading system 1300 may comprise a telemetry printed circuit board (PCB) comprising a processor 1305, a weather variable PCB comprising a processor 1310, a voice recognition PCB and/or engine 1315, a rechargeable battery 1320, and one or more solar panels and/or solar panel arrays 1325. In embodiments, a modular umbrella shading system 1300 may comprise a power tracking solar charger 1330, a power input or power source (e.g., AC adapter assembly) 1335, a lighting assembly 1370, an audio system 1375 and/or a computing device 1360. In embodiments, a modular umbrella shading system may include an obstacle detection module 1355, a motion sensor 1345, a proximity sensor 1340, a tilt sensor 1355, a personal area network communications module or transceiver 1365, a first motor controller and motor (azimuth motor and controller) 1380, a second motor controller and motor (elevation motor and controller) 1385, and a third motor controller and motor (an actuator motor and controller) 1390. In embodiments, a weather variable PCB 1310 may be coupled and/or connected to one or more air quality sensors 1311, UV radiation sensors 1312, a digital barometer sensor 1313, a temperature sensor 1314, a humidity sensor 1316, and/or a wind speed sensor 1317. In embodiments, a wind sensor 1317 may be a thermistor. In embodiments, a telemetry PCB 1305 may be coupled and/or connected to a GPS/GNSS sensor 1307 and/or a digital compass 1308. Although at times a modular umbrella shading system, shading object, intelligent umbrella and/or shading charging system may singularly be mentioned, the disclosure herein may be implemented in any of the above-mentioned devices and/or apparatus.

In embodiments, a modular umbrella shading system may comprise one or more printed circuit boards. Although a description may reference a specific printed circuit board, many of features or functions of a modular umbrella shading system may be implemented utilizing components mounted on a single, two or three circuit boards. In addition, one or more components may be mounted on printed circuit boards, which results in a large number of circuit boards within a modular umbrella shading system. In other words, a number of circuit boards may be utilized to provide features and/or functions of a shading object and/or umbrella although embodiments described herein may only describe a specific number. Although the term "circuit board" or "printed circuit board" is utilized, any electronic device allowing installation on and communicate with components may be utilized along with circuit board. As used in this specification, the terms "printed circuit board" and "PCB" are intended to refer generally to any structure used to mechanically support and electrically connect electronic components using conductive pathways, tracks, or signal traces etched from (e.g., copper) sheets laminated onto a non-conductive substrate. Synonyms for printed circuit boards include printed wiring boards and etched wiring boards.

In embodiments, a shading object, umbrella and/or shading charging system may comprise one or more printed circuit boards. In embodiments, a shading object or umbrella 1300 may comprise a movement control PCB 1395, a shading object computing device or computing device PCB 1360, a first motor PCB (azimuth control) 1380, a second motor PCB (elevation control) 1385, a third motor PCB (actuation/deployment control) 1390, a telemetry PCB (location and orientation data/information collection) 1305, and/or a weather variable PCB (environmental sensor data/information collection) 1310. Descriptions of the various components, boards, assemblies, computing devices, devices listed above may be found in application Ser. No. 15/394,080, filed Dec. 29, 2016, filed Dec. 29, 2016, entitled "Modular Umbrella Shading System," and application Ser. No. 15/418,380, filed Jan. 27, 2017, entitled "Shading System with Artificial Intelligence Application Programming Interface, the disclosures of which is hereby incorporated by reference.

Figure 14:
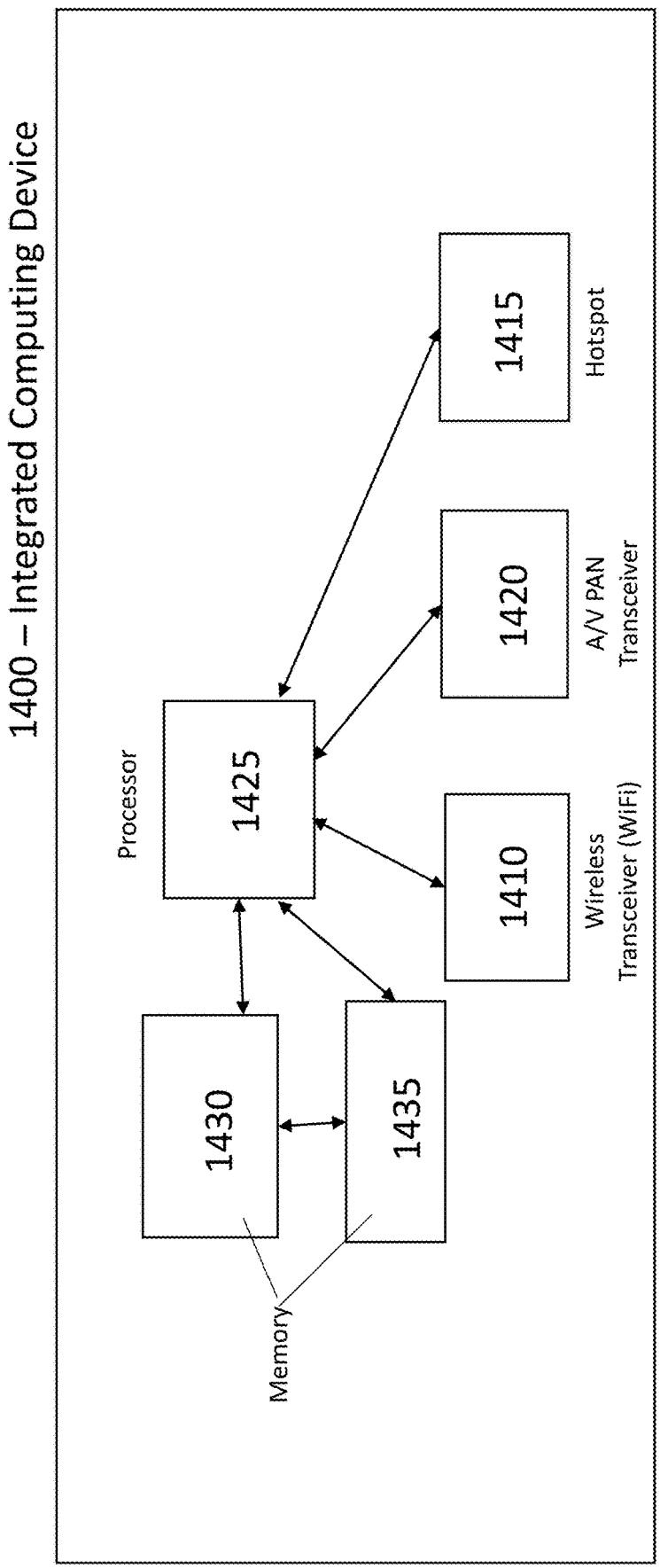
FIG. 14 illustrates a shading object or umbrella integrated computing device in a modular umbrella system according to embodiments.

FIG. 14 illustrates a shading object or umbrella integrated computing device in a modular umbrella system according to embodiments. In embodiments, an integrated computing device PCB 1400 may comprise a wireless WiFi or LAN wireless transceiver 1410 (which may or may not operate as a wireless hotspot and/or router), a separate wireless hotspot device 1415, one or more audio/video transceivers 1420 (e.g., PAN transceivers), one or more processors 1425, one or more non-volatile memories 1430 and one or more memory components 1435. In embodiments, many of the components may reside on a computing device PCB. In embodiments, a separate PCB may house or have some of the above-listed components (e.g., local area network or WiFi transceiver 1410, wireless hotspot device 1415) mounted thereon and a shading object computing device may comprise non-volatile memory 1430 (e.g., a flash drive, a hard drive, a removable disk drive), and a volatile memory 1435 such as RAM, and on or more processors 1425. Descriptions of the various components, boards, assemblies, computing devices, devices listed above may be found in application Ser. No. 15/394,080, filed Dec. 29, 2016, filed Dec. 29, 2016, entitled "Modular Umbrella Shading System," and application Ser. No. 15/418,380, filed Jan. 27, 2017, entitled "Shading System with Artificial Intelligence Application Programming Interface, the disclosures of which is hereby incorporated by reference.

In embodiments, an integrated computing device 1400 may store and/or execute shading object or umbrella application software, which may be referred to as SMART-SHADE and/or SHADECRAFT application software. In embodiments, shading object or umbrella application software may be run and/or executed on a variety of computing devices including a computing device integrated within a shading object or umbrella. In embodiments, for example, shading object or modular umbrella application software may include computer-readable instructions being stored in non-volatile memories of a computing device, a portable electronic device (e.g., a smart phone and/or a tablet), an application server, and/or a web application server, all which interact and communicate with each other. In embodiments, computer-readable instructions may be retrieved from memories (e.g., non-volatile memories) of these above-identified computing devices, loaded into volatile memories and executed by processors in the computing device, portable electronic device, application server, and/or mobile application server. In embodiments, a user interface (and/or graphical user interface) for a modular umbrella software application may be presented on a portable electronic device, although other computing devices could also execute instructions and present a graphical user interface (e.g., dashboard) to an individual. In embodiments, modular umbrella application software may generate and/or display a dashboard with different application (e.g., process) selections (e.g., weather, health, storage, energy, security processes and/or application processes). In embodiments, modular umbrella application software may control operation of a modular umbrella, communicate with and receive communications from modular umbrella assemblies and/or components, analyze information obtained by assemblies and/or components of a modular umbrella, integrate with existing home and/or commercial software systems, and/or store personal data generated by the modular umbrella, and communicate with external devices.

In embodiments, a portable electronic device may also comprise a mobile application stored in a non-volatile memory. In embodiments, a mobile application may be referred to as a SHADECRAFT or a SMARTSHADE mobile application. In embodiments, a mobile application (mobile app) may comprise instructions stored in a non-volatile memory of a portable electronic device, which can be executed by a processor of a portable electronic device to perform specific functionality. In embodiments, this functionality may be controlling of, interacting with, and/or communicating with a shading object. In embodiments, mobile apps may provide users with similar services to those accessed and may be individual software units with limited or specific function. In embodiments, applications may be available for download from mobile application stores, such as Apple's App Store. In embodiments, mobile apps may be known as an app, a Web app, an online app, an iPhone app or a smartphone app. In embodiments, a sensor device (or other IoT device) may communicate to a server computing device via a cellular communications network, a wireless communication network, a wired communication network and/or other communication network. In embodiments, a sensor device and/or assembly device may capture sensor measurements, data and/or conditions and may communicate sensor measurements, data and/or conditions to an IoT enabled server, which may analyze, store, route, process and/or communicate such sensor measurements, data and/or conditions. In embodiments, an Internet of Things (IoT) may be a network of physical objects—sensors, devices, vehicles, buildings, and other electronic devices. In embodiments, the IoT may sense and/or control objects across existing wireless communication network infrastructure, an existing cellular communication network, and/or a global communications network infrastructure. In embodiments, integrating of devices via IoT may create opportunities for more direct integration of a physical world into computer-based systems, which may result in improved efficiency, accuracy and economic benefit. In addition, when an IoT device or server is augmented with sensors and actuators, IoT may be integrated or enabled with a more general class of cyber-physical systems, e.g., smart grids, smart homes, intelligent transportation and smart cities. In embodiments, in IoT, for example, may be uniquely identifiable through its embedded computing system but is able to interoperate within the existing Internet infrastructure. In embodiments, a device may have a specific IP address in order to be addressed by other IoT enabled systems and/or devices. In embodiments, an IP address may be provided and/or established by routers and/or Internet service providers. For example, a modular umbrella enabled with IoT capability, because it may incorporate cameras, may be able to communicate with or be integrated into a home or office security system. Further, if an individual has a smart home, an individual may be able to control operation of, or communicate with a modular umbrella shading system as part of an existing smart home software application (either via a smart phone, mobile communication device, tablet, and/or computer). In addition, a modular umbrella shading system, if part of IoT, may be able to interface with, communicate with and interact with an existing home security system. Likewise, a modular umbrella shading system may be able to be an additional sound reproduction device (e.g., via speaker (s)) for a home audio and/or video system that is also on the IoT. In addition, a modular umbrella system may be able to integrate itself with an electronic calendar (stored on a computing device) and become part of a notification or alarm system because it will identify when upcoming meetings are occurring.

In embodiments, a modular umbrella system may be a device on an Internet of Things (IoT). In embodiments, an IoT-enabled device may be one or more cameras, one or more environmental sensors, one or more directional sensors, one or more movement sensors, one or more motor assemblies, one or more lighting assemblies and/or one or more solar panels or cells. These objects and/or IoT-enabled devices may comprise items and/or device may be embedded with electronics, software, sensors, and network connectivity, which enables these physical objects to detect, collect, process and/or exchange data with each other and/or with computing devices, Shadecraft IoT-enabled servers, and/or third-party IoT enabled servers connected to a modular umbrella system via a global communications network (e.g., an Internet).

In embodiments, IoT devices (e.g., servers, sensors, appliances, motor assemblies, outdoor shading systems, cameras, lighting assemblies, microphones, computing devices, etc.) may communicate with each other utilizing an Internet Protocol Suite. In embodiments, IoT devices may be assigned an IP address and may utilize IPv6 communication protocol. In embodiments where security is important, authentication may be established utilizing OAUTH (e.g., version 2.0) and Open ID Connect protocols (e.g., version 1.0). In addition, in embodiments, the IEEE 802.15.4 radio standard may allow for reduction in power consumption by IoT devices utilizing RF communications. In embodiments where power consumption may need to be decreased, e.g., as in sensors, modular umbrella shading systems, shading systems, cameras, processors), communication with IoT devices may utilize Message Queuing Telemetry Transport (MQTT) which utilizes TCP for its transport layer and utilizes a central MQTT broker to manage and/or route messages among a MQTT network's nodes. In embodiments, communication with IoT devices may utilize Constrained Application Protocol (CoAP) which utilizes UDP as its transport protocol. In embodiments, CoAP may be a client/server protocol and allows a one-to-one report/request instruction model. In embodiments, CoAP also may have accommodations for multi-cast transmission of messages (e.g., one-to-many report/request instruction model).

Non-volatile storage medium/media is a computer readable storage medium(s) that can be used to store software and data, e.g., an operating system, system programs, device drivers, and one or more application programs, in a computing device or one or more memory devices of a balcony shading and power system processor, controller and/or computing device. Persistent storage medium/media also be used to store device drivers, (such as one or more of a digital camera driver, motor drivers, speaker drivers, scanner driver, or other hardware device drivers), web pages, content files, metadata, playlists, data captured from one or more assemblies or components (e.g., sensors, cameras, motor assemblies, microphones, audio and/or video reproduction systems) and other files. Non-volatile storage medium/media can further include program modules/program logic in accordance with embodiments described herein and data files used to implement one or more embodiments of the present disclosure.

A computing device or a processor or controller may include or may execute a variety of operating systems, including a personal computer operating system, such as a Windows, iOS or Linux, or a mobile operating system, such as iOS, Android, or Windows Mobile, Windows Phone, Google Phone, Amazon Phone, or the like. A computing device, or a processor or controller in a balcony shading and power system controller may include or may execute a variety of possible applications, such as a software applications enabling communication with other devices, such as communicating one or more messages such as via email, short message service (SMS), or multimedia message service (MMS), FTP, or other file sharing programs, including via a network, such as a social network, including, for example, Facebook, LinkedIn, Twitter, Flickr, or Google+ and/or Instagram provide only a few possible examples. A computing device or a processor or controller in a balcony shading and power system may also include or execute an application to communicate content, such as, for example, textual content, multimedia content, or the like. A computing device or a processor or controller in a balcony shading and power system may also include or execute an application to perform a variety of possible tasks, such as browsing, searching, playing various forms of content, including locally stored or streamed content. The foregoing is provided to illustrate that claimed subject matter is intended to include a wide range of possible features or capabilities. A computing device or a processor or controller in a balcony shading and power system and/or mobile computing device may also include imaging software applications for capturing, processing, modifying and transmitting image, video and/or sound files utilizing the optical device (e.g., camera, scanner, optical reader) within a mobile computing device and/or a balcony shading and power system.

For the purposes of this disclosure a computer readable medium stores computer data, which data can include computer program code that is executable by a computer, in machine-readable form. By way of example, and not limitation, a computer-readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, DRAM, DDRAM, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

The invention claimed is:

1. An umbrella, comprising:
one or more lighting elements;
one or more motor assemblies;
one or more electrical components;
an integrated computing device, the integrated computing device comprising:
one or more processors;
one or more physical memory devices,
computer-readable instructions stored in the one or more physical memory devices, the computer-readable instructions being executable by the one or more processors to:
receive status message or signals from the one or more motor assemblies or the one or more electrical components and from an artificial intelligence process identifying operational status of the artificial intelligence process;
generate light element commands, instructions, messages or signals based, at least in part, on the received status messages or signals regarding the artificial intelligence process; and
communicate the generated light elements commands, instructions, messages or signals to the one or more lighting elements to indicate status of the one or more motor assemblies or one or more electrical components and the artificial intelligence process.

2. An umbrella, comprising:
one or more lighting elements; and
an integrated computing device, the integrated computing device comprising:
one or more processors;
one or more physical memory devices,
computer-readable instructions stored in the one or more physical memory devices, the computer-readable instructions being executable by the one or more processors to:
receive audio files, the received audio files based at least in part on voice commands received by one or more microphones;
perform an artificial intelligence process based at least in part on the received audio files;
monitor status of the artificial intelligence process and receive status messages with respect to the artificial intelligence process;
generate light element messages, commands or instructions regarding the status of the artificial intelligence process; and
communicate the light element messages, commands or instructions to the one or more lighting elements.

3. An umbrella, comprising:
a first lighting element;
a second lighting element;
a first electrical component, the first lighting element associated with a status of the first electrical component;

a second electrical component, the second lighting element associated with a status of the second electrical component; and an integrated computing device, the integrated computing device comprising:
  one or more processors;
  one or more physical memory devices,
  computer-readable instructions stored in the one or more physical memory devices, the computer-readable instructions being executable by the one or more processors to:
    receive first status message or signals from the first electrical component;
    receive second status message or signals from the second electrical component;
    generate first light element commands, instructions, messages or signals based, at least in part, on the received first status messages or signals and communicate the generated first light element commands, instructions, messages or signals to the first light element; and
    generate second light element commands, instructions, messages or signals based, at least in part, on the received second status messages or signals and communicate the generated second light element commands, instructions, messages or signals to the second light element.

4. The umbrella of claim 3, further comprising:
a third lighting element; and
a first motor assembly, the third lighting element associated with a status of the first motor assembly;
wherein the computer-readable instructions are further executable by the one or more processors to:
receive third status message or signals from the first motor assembly; and
generate third light element commands, instructions, messages or signals based, at least in part, on the received third status messages or signals and communicate the generated third light element commands, instructions, messages or signals to the third light element.

5. The umbrella of claim 3, further comprising:
a third lighting element, the third lighting element associated with a status of the integrated computing device,
wherein the computer-readable instructions are further executable by the one or more processors to:
receive third status message or signals from the integrated computing device; and
generate third light element commands, instructions, messages or signals based, at least in part, on the received third status messages or signals from the integrated computing device, and communicate the generated third light element commands, instructions, messages or signals to the third light element.

6. The umbrella of claim 3, wherein the first electrical component is a wireless transceiver and the second electrical component is a sensor.

7. The umbrella of claim 4, wherein the first motor assembly is an azimuth motor assembly, an elevation motor assembly or an expansion motor assembly.

8. The umbrella of claim 3, wherein the status message received from the first electrical component indicates an operational status of the first electrical component, the operational status being not activated, initiating, activated or malfunctioning.

9. The umbrella of claim 8, wherein the first light element may illuminate in more than one color, the more than one colors corresponding to an operational state of the first electrical component, and wherein the computer-readable instructions are further executable by the one or more processors to:
generate the first light element commands, instructions, messages or signals, based, at least in part on the operational status of the first electrical component, wherein the first light element commands, instructions, messages or signals cause the first light element to illuminate in a color corresponding to the received operational status.

10. The umbrella of claim 8, wherein the first light element may illuminate in more than one intensity, the more than one intensity corresponding to an operational status of the first electrical component, and wherein the computer-readable instructions are further executable by the one or more processors to:
generate the first light element commands, instructions, messages or signals, based, at least in part on the operational status of the first electrical component, wherein the first light element commands, instructions, messages or signals cause the first light element to illuminate in an intensity corresponding to the received operational status.

11. The umbrella of claim 4, wherein the status message received from the first motor assembly indicates an operational status of the first motor assembly, the operational status being either turned off, activated or malfunctioning.

12. The umbrella of claim 11, wherein the first light element may illuminate in more than one color, the more than one colors corresponding to an operational status of the first motor assembly, and wherein the computer-readable instructions are further executable by the one or more processors to:
generate the first light element commands, instructions, messages or signals, based, at least in part on the operational status of the first motor assembly, wherein the first light element commands, instructions, messages or signals cause the first light element to illuminate in a color corresponding to the received operational status of the first motor assembly.

13. The umbrella of claim 11, wherein the first light element may illuminate in more than one intensity, the more than one intensity corresponding to an operational status of the first motor assembly, and wherein the computer-readable instructions are further executable by the one or more processors to:
generate the first light element commands, instructions, messages or signals, based, at least in part on the operational status of the first motor assembly, wherein the first light element commands, instructions, messages or signals cause the first light element to illuminate in an intensity corresponding to the received operational status of the first motor assembly.

\* \* \* \* \*